(12) United States Patent
Körner

(10) Patent No.: US 10,866,088 B2
(45) Date of Patent: Dec. 15, 2020

(54) METHOD AND ARRANGEMENT FOR ROBUST, DEPTH-SCANNING/FOCUSING STRIP TRIANGULATION BY MEANS OF A PLURALITY OF WAVELETS

(71) Applicant: Universität Stuttgart, Stuttgart (DE)

(72) Inventor: Klaus Körner, Berlin (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 16/612,273

(22) PCT Filed: Apr. 16, 2018

(86) PCT No.: PCT/EP2018/059647
§ 371 (c)(1),
(2) Date: Dec. 11, 2019

(87) PCT Pub. No.: WO2018/206233
PCT Pub. Date: Nov. 15, 2018

(65) Prior Publication Data
US 2020/0141722 A1 May 7, 2020

(30) Foreign Application Priority Data
May 8, 2017 (DE) .......... 10 2017 004 428

(51) Int. Cl.
G01B 11/25 (2006.01)
G01C 11/30 (2006.01)

(52) U.S. Cl.
CPC ...... *G01B 11/2522* (2013.01); *G01B 11/2513* (2013.01); *G01C 11/30* (2013.01)

(58) Field of Classification Search
CPC .. G01B 11/2513; G01B 11/2522; G01C 11/30
USPC ................................. 356/600–640
See application file for complete search history.

(56) References Cited

U.S. PATENT DOCUMENTS

2004/0246496 A1 12/2004 Yoshida
2010/0295941 A1 11/2010 Jeong et al.

FOREIGN PATENT DOCUMENTS

DE 19749435 A1 5/1999
DE 19846145 A1 4/2000
(Continued)

OTHER PUBLICATIONS

International Search Report and Written Opinion dated Jul. 20, 2018 in International Patent Application No. PCT/EP2018/059647, 16 pages.

(Continued)

*Primary Examiner* — Tri T Ton
(74) *Attorney, Agent, or Firm* — Shook, Hardy & Bacon L.L.P.

(57) ABSTRACT

Proposed are an arrangement and a method for depth-scanning strip triangulation with internal or external depth scan, particularly also for the 3D shape measurement in microscopy and mesoscopy. The robustness of the measurement with wavelet signal generation from an image stack is to be increased. The occurrence of the known and very undesirable 2Pi phase jumps in the phase map is to be avoided as much as possible. To do this, with a measurement instead of a wavelet at least two wavelets with contrast envelope are generated. This is done by a concurrent—then preferably with spectral separation—or by a sequential projection of two strip images with different triangulation wavelengths on the measured object.

19 Claims, 35 Drawing Sheets

(56) References Cited

FOREIGN PATENT DOCUMENTS

| DE | 19919584 A1 | 11/2000 |
| DE | 10056073 A1 | 6/2002 |
| DE | 10321883 A1 | 12/2004 |
| DE | 10321888 A1 | 12/2004 |

OTHER PUBLICATIONS

Körner, Klaus, and Robert Windecker. "Absolute macroscopic 3-D measurements with the innovative depth-scanning fringe projection technique (DSFP)." Optik 112, No. 9 (2001): 433-441.

Koerner, Klaus, Robert Windecker, Matthias Fleischer, and Hans J. Tiziani. "One-grating projection for absolute three-dimensional profiling." Optical Engineering 40, No. 8 (2001): 1653-1661.

Koerner, Klaus, Ulrich Droste, Robert Windecker, Matthias Fleischer, Hans J. Tiziani, Thorsten Bothe, and Wolfgang Osten. "Projection of structured light in object planes of varying depths for absolute 3D profiling in a triangulation setup." In Optical Measurement Systems for Industrial Inspection II: Application in Industrial Design, vol. 4398, pp. 23-34. International Society for Optics and Photonics, 2001.

Schwab, X., C. Kohler, K. Körner, N. Eichhorn, and W. Osten. "Improved micro topography measurement by LCoS-based fringe projection and z-stitching." In Optical Micro-and Nanometrology in Microsystems Technology II, vol. 6995, p. 69950Q. International Society for Optics and Photonics, 2008.

Windecker, Robert, Matthias Fleischer, and Hans J. Tiziani. "Three-dimensional topometry with stereo microscopes." Optical Engineering 36 (1997).

International Preliminary Report on Patentability dated Nov. 21, 2019 in International Patent Application No. PCT/EO2018059647, 8 pages.

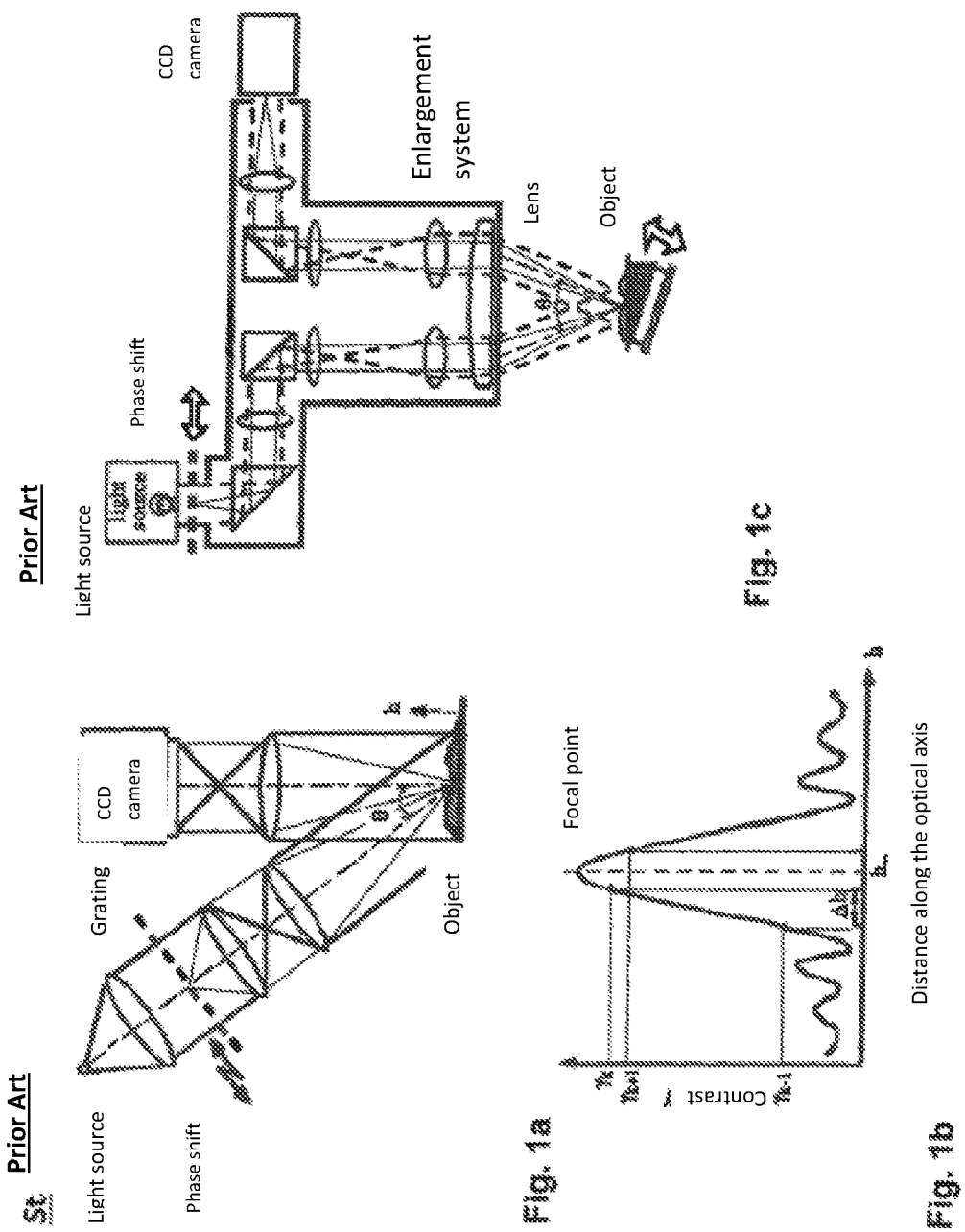

Prior Art

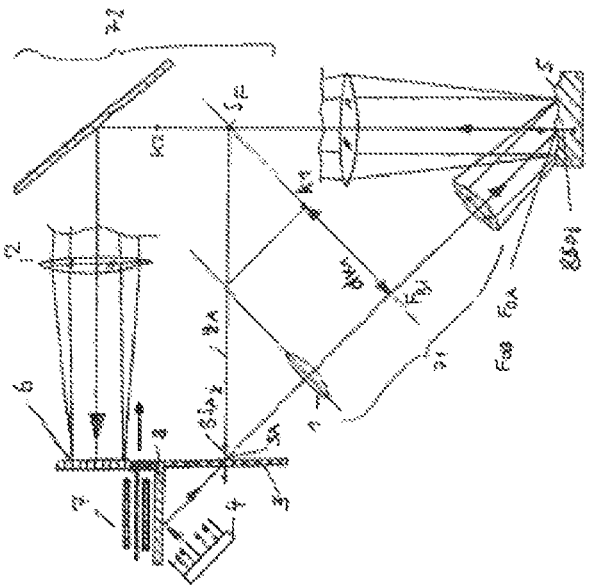

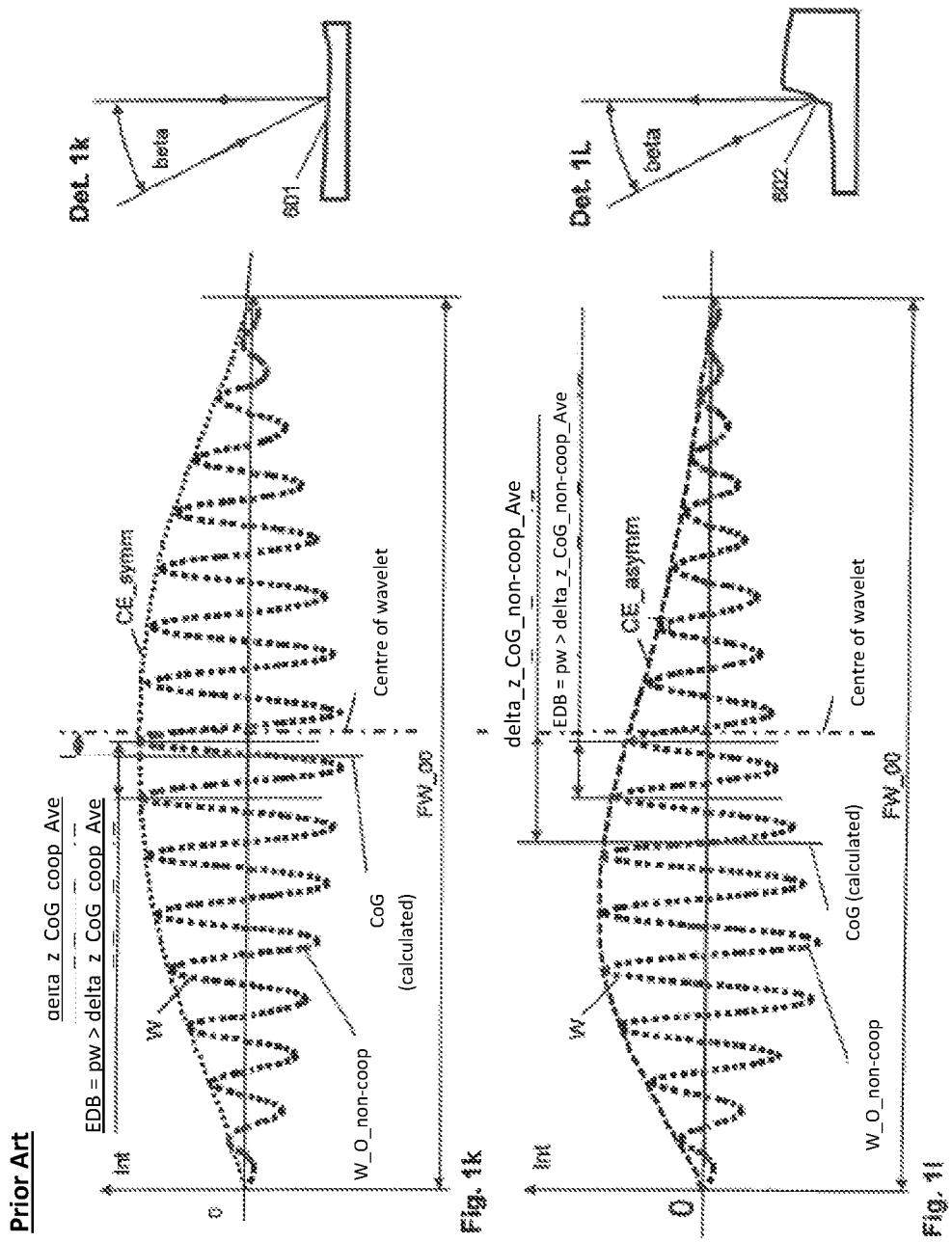

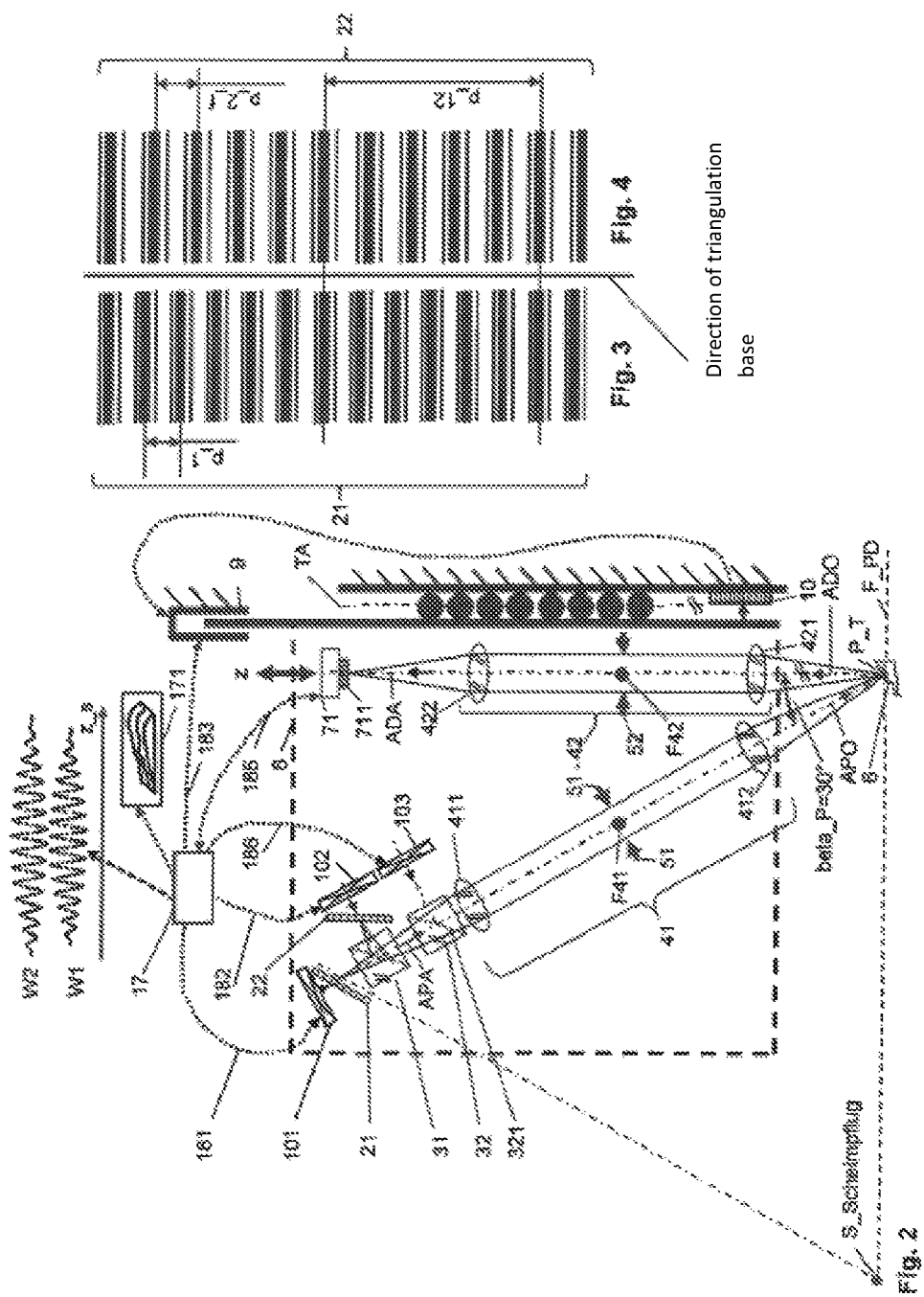

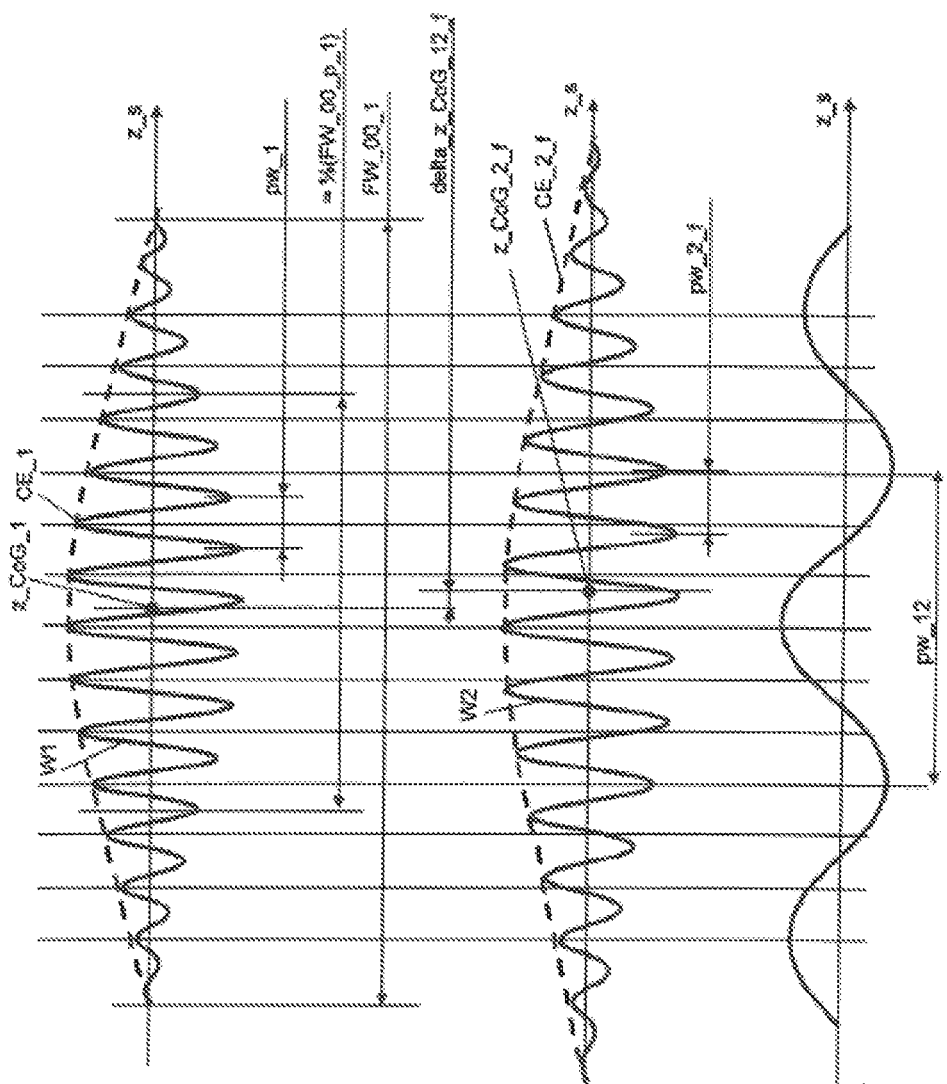

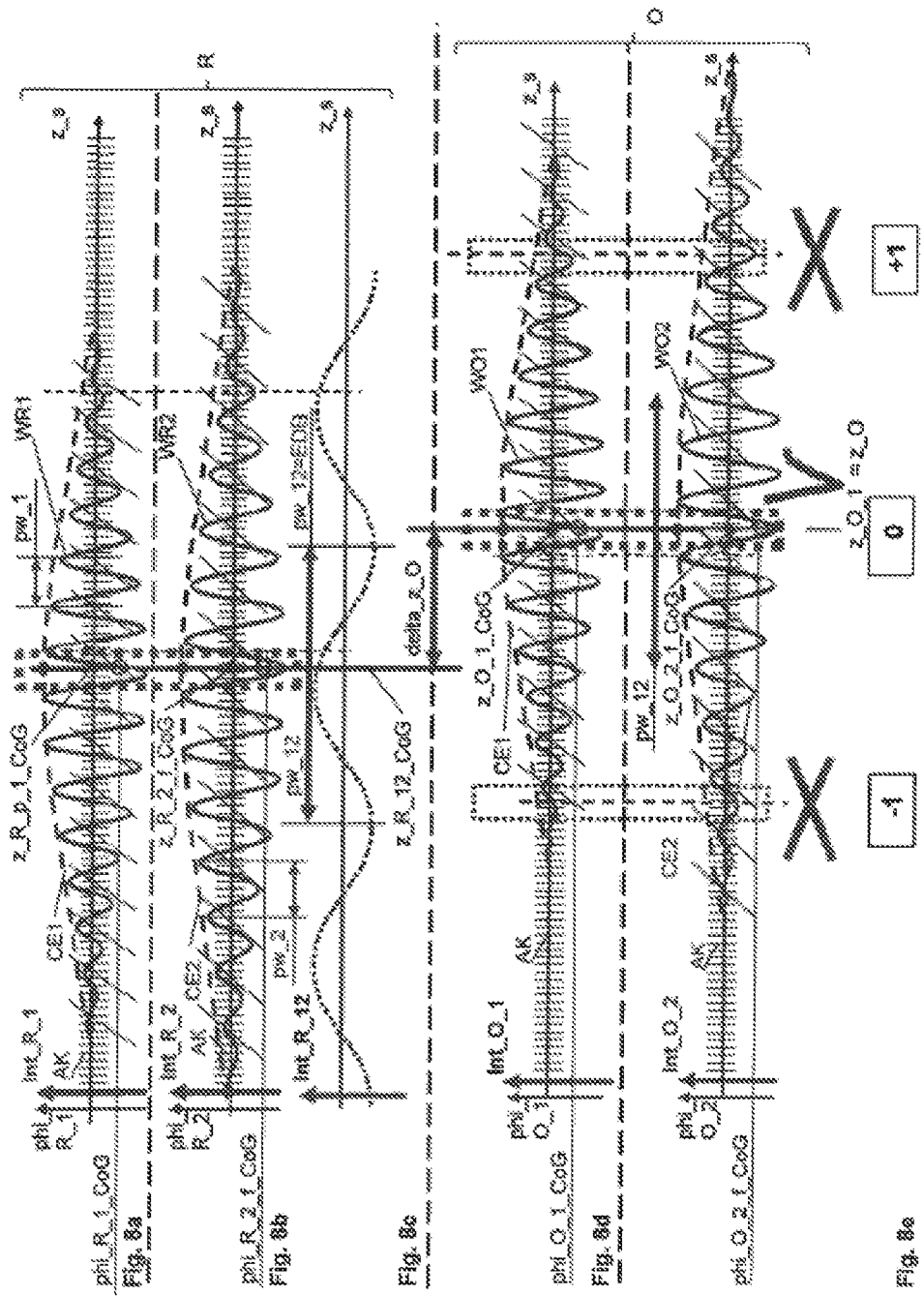

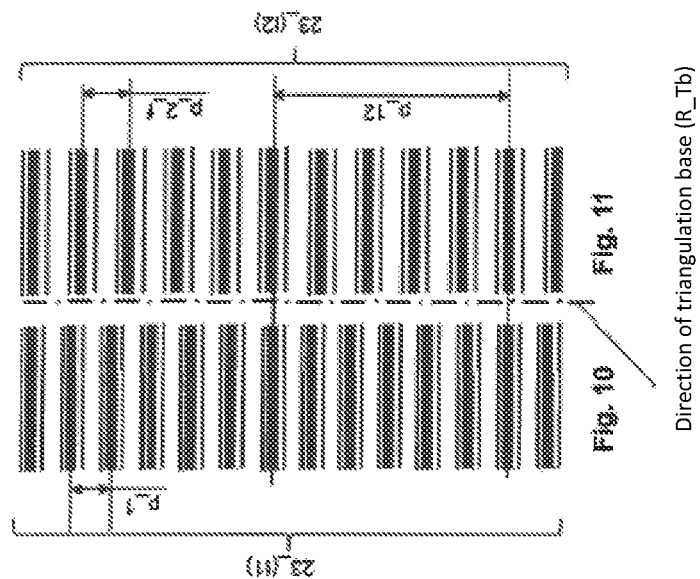
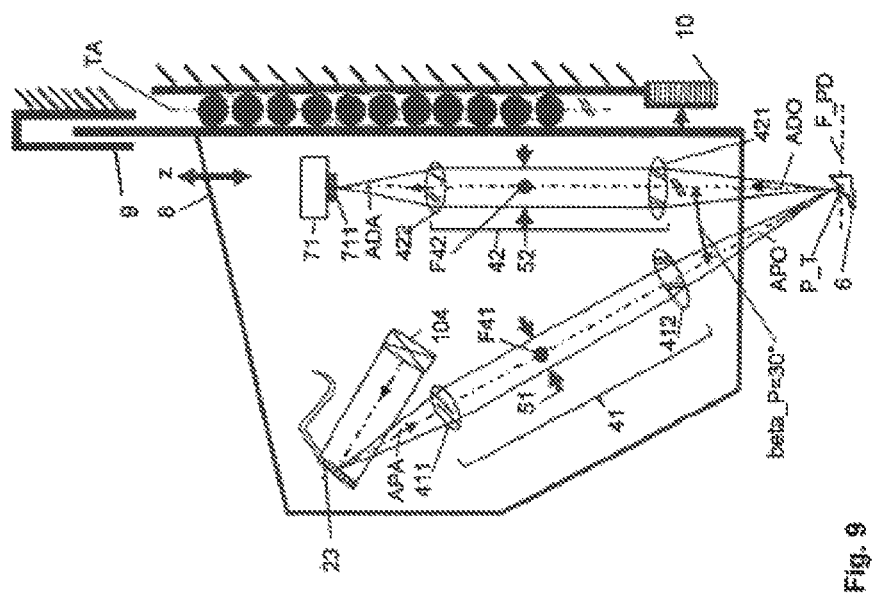

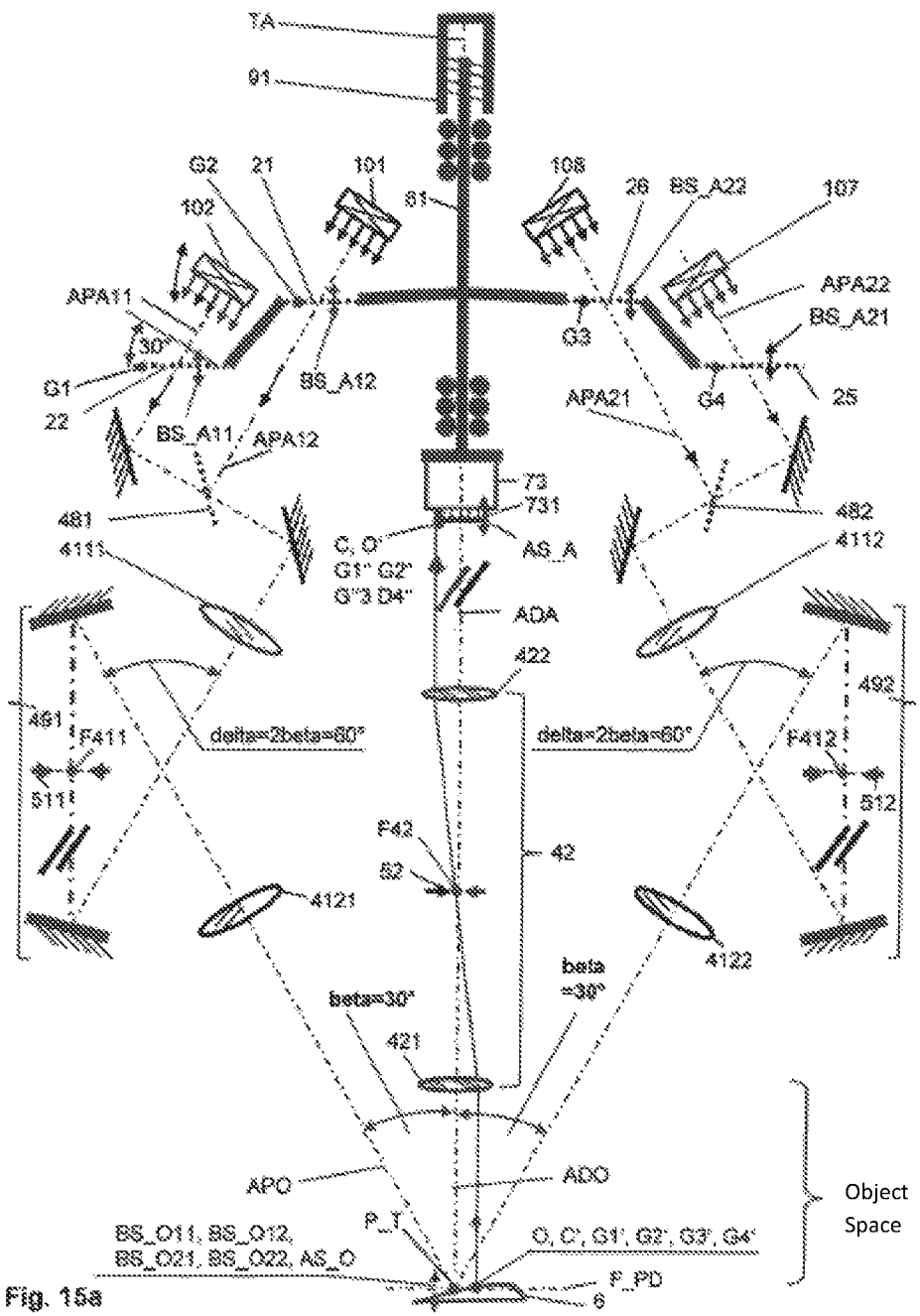

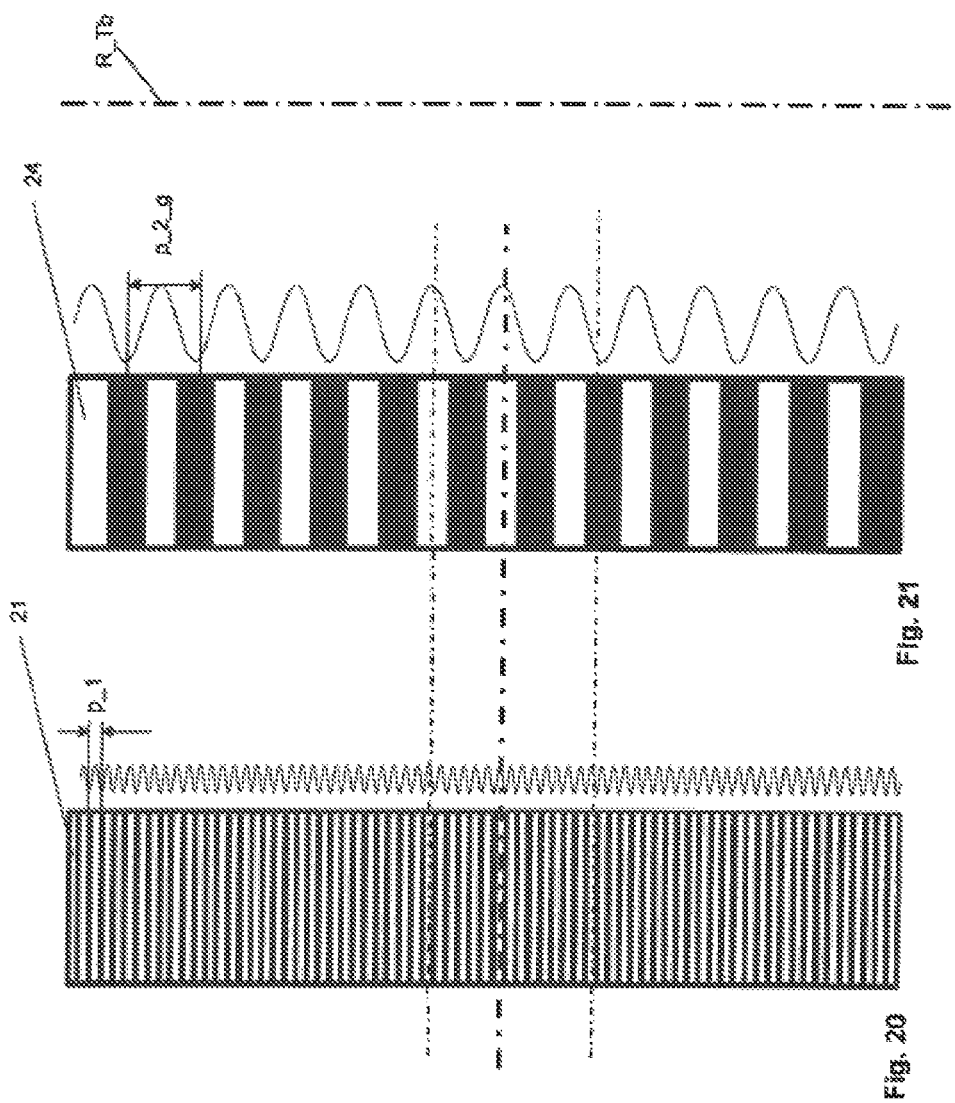

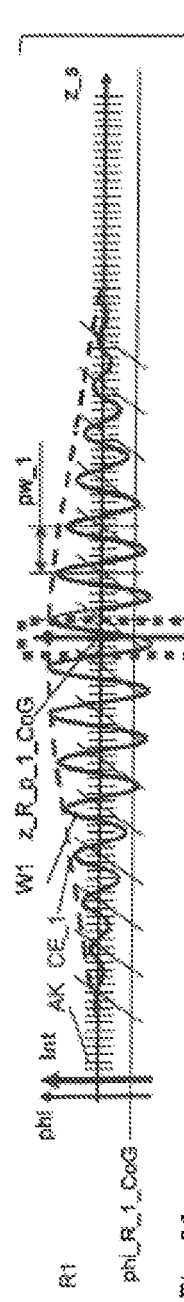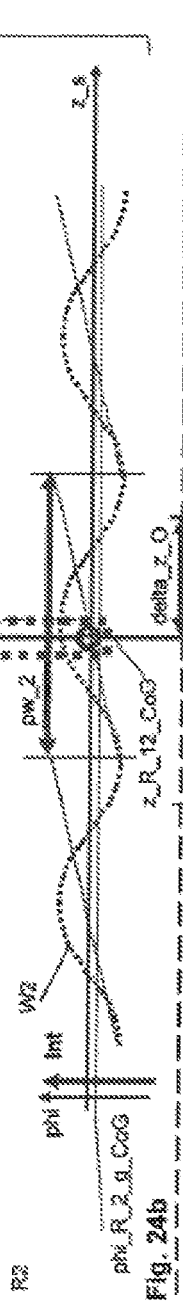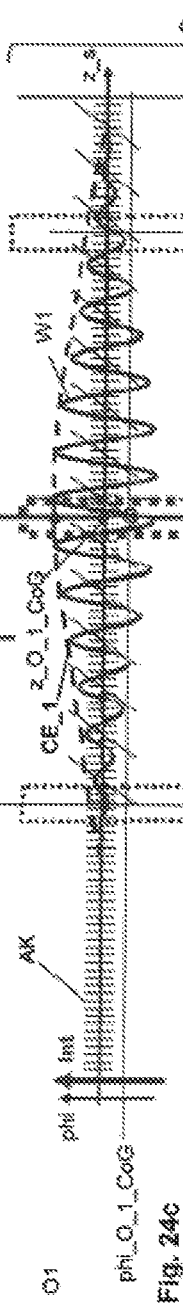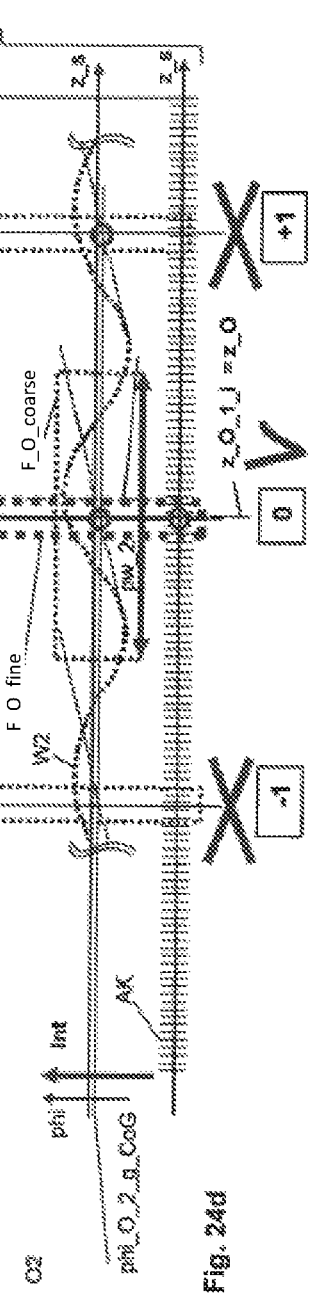

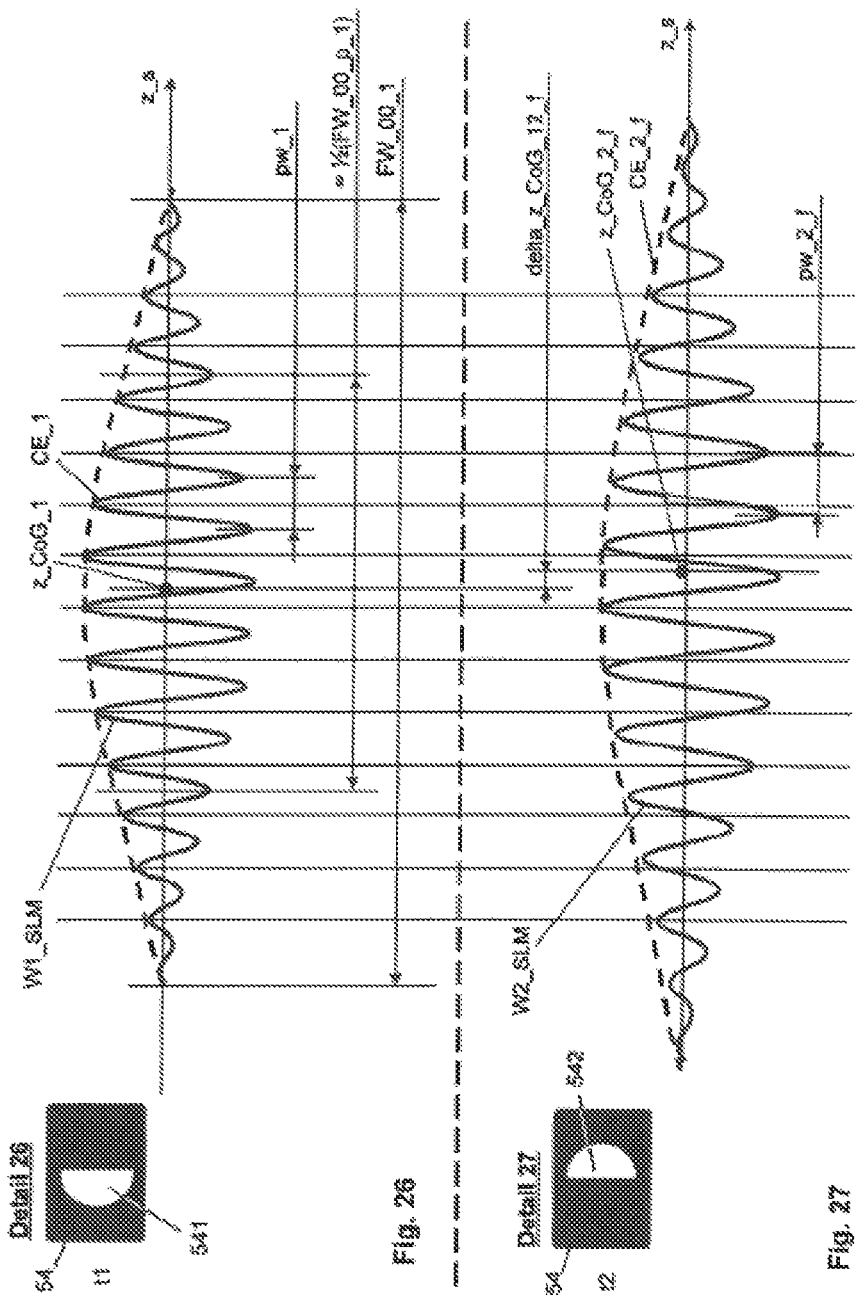

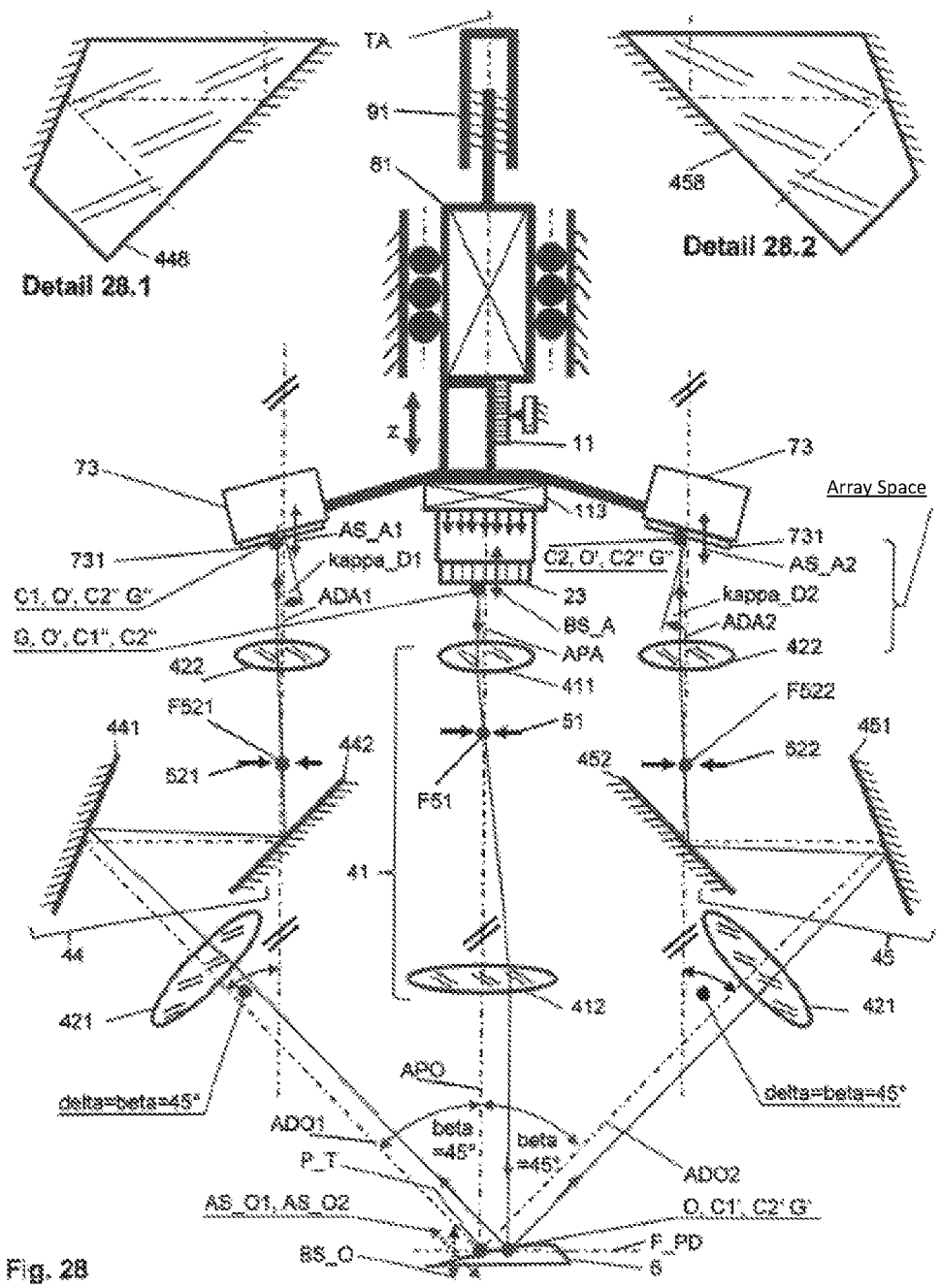

METHOD AND ARRANGEMENT FOR ROBUST, DEPTH-SCANNING/FOCUSING STRIP TRIANGULATION BY MEANS OF A PLURALITY OF WAVELETS

CROSS-REFERENCE TO RELATED APPLICATIONS AND PRIORITY CLAIM

This Non-Provisional Patent Application, submitted under 35 U.S.C. 371, claims priority to co-pending PCT App. No. PCT/EP2018/059647, filed Apr. 16, 2018, and titled "METHOD AND ARRANGEMENT FOR ROBUST, DEPTH-SCANNING/FOCUS STRIP TRIANGULATION BY MEANS OF A PLURALITY OF WAVELETS," which claims priority to German Patent App. No. 102017004428.7, filed May 8, 2017, and titled "VERFAHREN UND ANORDNUNG ZUR ROBUSTEN, TIEFENSCANNENDEN FOKUSSIERENDEN STREIFEN-TRIANGULATION MIT MEHREREN WAVELETS," both of which are incorporated herein by reference in the entirety.

The present application relates to an arrangement and a method for depth-scanning strip triangulation, in particular for the 3D shape measurement in microscopy and mesoscopy.

In particular, the present application relates to 3D measuring methods with structured planar illumination using the strip triangulation principle with focus variation by a depth scan, therefore by means of a focus scan in the sense of a depth scan. Strip triangulation in this method particularly relates to a continuous depth scan and there is always a triangulation angle. This means that for each measurement point in the object space, there is an angle between the main projection beam and the main detection beam.

This 3D measuring method may be designed both as a predetermined triangulation angle set by the apparatus of at least 2° (1°=1 degree) and with focusing by a given mechanical motion scan or by variable a refractive power optical device, such as a liquid lens. Focusing is done here in sense of a geometric shift of at least one focal surface in the object space. The approach is independent of where the mechanical motion scan or the refractive power variation occurs in the optical system. The focal surface may also be inclined to the optical axis of a detection lens.

The present application thus relates to planar measuring, focusing strip triangulation measuring methods and/or focus-scanning or depth-scanning measuring methods on the basis of a focusing strip triangulation measurement arrangement.

In a strip triangulation measurement arrangement and/or a depth-scanning triangulation measurement arrangement focused through, thus in the presence of a triangulation angle, this motion scan already mentioned above may on the one hand be an external mechanical scan where the entire compact measurement arrangement is moved relative the measured object—or even the measured object itself is moved. On the other hand, it may also be an internal mechanical scan. In this case, the motion occurs with a depth component of a linear grating or a spatial light modulator (SLM)—also in the formation in the form of a liquid crystal display—therefore within the triangulation measurement arrangement. This internal mechanical scan then shifts the focal surface in the object space, also with depth component which represents a focusing through the object space with an image of the linear grating. A combination of an internal and an external mechanical motion scan, so that there are two synchronised motion scans, is also possible.

For measurement arrangements according to the prior art, the triangulation angle beta is typically around 22.5° to 45°, but very rarely greater than 60° and also very rarely less than 6°. Here, the triangulation angle beta must be, by definition, determined by the angle of vignetting of the illumination beam path to the angle of vignetting of the mapping beam path for each recorded point of the measured object and is therefore completely independent of the measured object and only conditioned in terms of the apparatus by the geometric-optical structure.

An external motion scan is considered as a relative motion between the 3D triangulation measurement arrangement as a compact unit and the measured object. The designation "internal motion scan" is used to describe that the 3D triangulation measurement arrangement and the measured object remain mutually externally at rest while measuring, but in the 3D triangulation measurement arrangement at least one component moves mechanically in depth or also with a depth component, so that focusing in the optical arrangement changes to triangulation. The moved component may, in the simplest case, present an illuminated, rasterised structure such as a linear grating, also known as a Ronchi grating. The rasterised structure may also be designated as a structured transmission pattern array. The moved component may also be a rasterised and/or structured receiver. The rasterised receiver may also be designated as a receiver array.

Consequently, the focusing triangulation approach includes both the depth measurement of the rasterised receiver and also the motion of a transmission pattern array in depth or with depth component. The structured transmission pattern array formed as a transmission linear grating in the simplest case, is moved in the illumination beam path with depth component. Such an approach is described in DE 198 46 145 A1, where an illuminated linear transmission linear grating and motion components to undertake a movement on an inclined path are arranged. The movement on an inclined path exists in relation to the optical axis of the illumination lens and occurs parallel to a special straight line $g_A$, on which lie the array-side focal point of the projection lens and the array-side principal point of the detection lens. This special movement also exhibits a depth component for focusing through and also a lateral component for phase shifting. As a result, the projected strips move in the object space in the 3D measurement laterally as well and run through a depth of field region in which object and measurement arrangement as a whole remain without a relative mutually approaching movement. In each pixel thus illuminated of a rasterised receiver, with object detection, a wavelet with a contrast envelope can be detected.

This represents an approach to a 3D triangulation measurement method which generates wavelet signals with a contrast envelope, the phase of which in the signal generates a piece of information about the depth or the distance of recorded object points. These wavelet signals have a high similarity to the known white-light interference signals, even if the origination process is of a geometric-optical nature. The generation of white-light interference signals of very similar signal shapes by means of strip triangulation has been described in DE 197 49 974 C2. This already refers to the possibility of using phase information for determining depth. The wavelet signals generated by means of through-focused strip triangulation have a contrast envelope and may be evaluated comparably with white-light interference signals if the problem of the unknown starting phase is solved. With a phase evaluation, the starting phase in each pixel must, however, be included in the calibration, as this is ideally not zero—as with white-light interferometry—at the centre of gravity of the contrast envelope. So a 3D point cloud of the object can be generated. The source of inspiration in this case for also using the phase of wavelet signals with a contrast envelope also for strip triangulation with depth scan or focusing through, was the situation with signal evaluation in white-light interferometry.

The approach to the internal depth scan is also illustrated in a general way in DE 199 19 584 A1 and in WO 2000/066972 A1. In this case, an internal motion scan of a transmission pattern array, therefore, for example, an illuminated linear grating is described, also with motion scan with a lateral component to generate wavelet signals. This describes that in the scan of the grating with lateral and depth components—therefore with an internal depth scan along a straight line gA—the movement paths of the illuminating image points of the grating in the object space target the centre of the pupil of the observation beam path. Precisely then, the movement paths coincide with the visible rays. That gives the advantage that, with ideal mapping ratios the phase at the centre of gravity of a wavelet is independent of the depth position of an object point, which considerably simplifies determining the depth position by means of wavelet evaluation, as the phase at the contrast centre of gravity does not change depending on the depth position of an object point with ideal telecentric optics in the array space and can be determined by a previously taken reference measurement by means of a level plate for each object point, thus for each pixel. That was also able to be confirmed experimentally in a restrict depth measurement range, although the telecentricity of the mapping optics in the array space was not perfect, for a description of the method see also the specialist article by K. Korner and R. Windecker, "Absolute macroscopic 3-D measurement with the innovative depth-scanning fringe projection technique (DSFP)" Optik 112, 433-411 (2001) [1]. For the three-dimensional recording of an object in the microscopic or mesoscopic scale, the approach with parallel optical axes in the object space is not very suitable or has only limited suitability, however, as there is no geometric overlapping of projection and detection beam path in the near range. An arrangement corresponding to the mapping scale factor, which is advantageous for small-scale measured objects, can only be manufactured with this optical configuration with some difficulty.

In the earlier noughties of the 21st century, no economic evaluation of the strip triangulation approach was produced with focusing through by using the internal depth scan. Firstly described was a successful implementation of this approach to focused through strip triangulation with internal mechanical scan also with lateral component in [1]. In that case, in the triangulation arrangement, optical axes arranged strictly in parallel were used with approximate telecentricity in the array space, that represents the location of the grating and the camera chip and where the scan is done.

The calibration of a depth-scanning 3D triangulation measurement arrangement with internal scan was illustrated in the specialist article by J.-M. Nivet, K. Korner, U. Droste, M. Fleischer, H. Tiziani, W. Osten with the title "Depth-scanning fringe projection technique (DSFP) with 3-D calibration", in Proceedings of SPIE Vol. 5144, p. 443-449 (2003) [2]. Finally, the limitation of the available, affordable, low-light lenses led to the task of this approach, due to implementability that was not promising economically. With the state of the art in 2000, the available low-light lenses still exhibited considerable telecentricity errors in the image space (array space) and therefore also the distortions in depth. The moving camera chip was always located in the array space.

In parallel to the depth-scanning approaches with internal scan for the 3D triangulation measurement method with wavelet signal generation, 3D triangulation measurement processes with external depth-scanning come into the focus of the specialist world, for example, illustrated in the specialist article by M. Ishihara, Y. Nakazato, H. Sasaki, M. Tonooka, M. Yamamoto, Y. Otani, T. Yoshizawa with the title "Three-dimensional surface measurement using grating projection method by detecting phase and contrast", in Proc. SPIE Vol. 3740, pp. 114-117(1999) [3]. This illustrates the first described experiment with an external motion scan. A Leica stereo microscope was used for the triangulation measurement arrangement, wherein one optical channel was used for illumination and the other for recording the image. In this case, two translation movements occur, namely one for focusing (depth scan) and another one for phase shifting on the grating. However, no wavelet is formed as, in various depth positions, therefore at a standstill, several intensity values are recorded for determining contrast and phase. In the specialist article [3] mentioned above, a step-by-step depth scan of the entire stereo microscope is described. The phase is adjusted on the linear grating at the various depths, wherein strip contrast and phase are evaluated separately. Due to the discontinuous movement, this relates to a comparatively slow measurement method, even in comparison with the confocal approach.

Approaches with an external depth scan can also be found in DE 100 560 73 A1, wherein, in this case, the depth scan of a complete stereo microscope is done at least quasi-continuously. In this case, firstly for the strip triangulation, the origination of a wavelet during an external depth scan is described.

The explicit demonstration of a continuous external mechanical depth scan was illustrated for the first time—by using a Leica stereo microscope—by evaluation of quasi-continuously measured strip images in the specialist article by K. Korner, R. Windecker, M. Fleischer, H. Tiziani, "One-grating projection for absolute three-dimensional profiling", Optical Engineering, Vol. 40 No. 8, p. 1653-1660 (August 2001) [4].

From the image stack recorded in the depth scan, pixel-by-pixel wavelets are extracted with contrast envelope and evaluated on the basis of an adapted lock-in algorithm. The lock-in algorithm has been developed at the Institute for Technical Optics of the University of Stuttgart for white-light interferometry and first adapted with the focusing triangulation with structured lighting by means of a 12.5× Leica stereo microscope. FIG. 7b of the specialist article [4] shows 2 to 3 dominant oscillations under the contrast envelope. For triangulation arrangements using a stereo microscope with original pupil size, therefore, wavelets with a rather narrow-band contrast envelope are always produced, therefore with very few oscillations, for example, less than a total of 6 oscillations, under the contrast envelope.

The pupil distance in the arrangement of the stereo microscope does represent the triangulation basis of the triangulation arrangement given for the apparatus. With a contrast envelope that is relatively narrow, therefore, in relation to the number of detectable oscillations which a normally obtainable stereo microscope always delivers independently of the strip period used, no uncertainties therefore arise at all in the determination of a contrast centre of gravity in relation to the oscillations under the contrast envelope. Finding an oscillation of zero order and, therefore, finding a strip of zero order are therefore easily feasible. A lock-in evaluation with usage of phase information for determining the 3D shape therefore functions, however, markedly better with around five dominant oscillations under the contrast envelope than with only two dominant oscillations. On this, see also the specialist article by R. Windecker, M. Fleischer, K. Korner H. Tiziani "Testing micro devices with fringe projection and white-light interferometry" in Optics and Lasers in Engineering 36, p. 141-154 (2001) [5].

On the other hand, with a 3D triangulation measurement arrangement with an internal mechanical motion scan, for example, for the macroscopic 3D shape recording of objects and two separate objectives, completely different behaviours are produced. This was first illustrated in specialist article [1]. With such a 3D triangulation measurement arrangement, the illuminated Ronchi grating and the camera are shifted synchronously in depth, so experience a combined motion scan. In addition, the Ronchi grating is shifted laterally. Even with low-light lenses of the same construction for illumination and image capture in parallel arrangement and direct mechanical contact of the mechanical fastenings of the lens, the ratio of pupil distance and pupil diameter in this case can be hardly brought to less than 6. A typical value of the ratios was found with 9 for a focal ratio of 1.4 and at least approximately image-side telecentricity for real lenses developed for the fixed object distance of 750 mm with distortions of around 0.1% by the company Jenoptik. In so doing, the triangulation angle for this setting is still rather small. With an object distance of 750 mm, this is about 6°, which is still to be considered to be rather small for a macroscopic strip triangulation measurement arrangement. Already with this triangulation angle, so many oscillations can be seen, therefore, periods below the contrast envelope of the wavelet, for example, by more than 20, that is only possible to be sure to find a zero order for very cooperative, steady, measured objects that scatter light well and when using suitable evaluation algorithms. That is the case if the wavelet exhibits a symmetrical contrast envelope.

Furthermore, due to the imperfect, image-side telecentricity of available low-light lenses, the calibration itself when measuring objects that scatter light well on surfaces with larger gradients is very difficult compared with a non-scanning macroscopic strip triangulation arrangement. In the near range of 200 mm, the distortion of a high-quality low-light lens is already in the lower single figure percentage range, if this lens, for example, has been designed for an object distance of 750 mm, where the minimum distortion exists at values of much less than 1 percent.

The calibration for depth-scanning triangulation with lenses with considerable deviation from telecentricity, where the motion scan therefore occurs, is not satisfactory for usage in industrial metrology. In particular, considerable measurement errors occur, such a deviations from the 3D shape, for objects with considerable surface gradients of, for example, 30°, even if these surfaces scatter light well.

In surveying real three-dimensional objects with the approach of 3D strip triangulation with external depth scan, with a skew of the contrast envelope of the wavelet induced by the measured object during the evaluation, frequently the known effect of 2-Pi jumps arising in the calculated phase map occurs. Also 4-Pi and 6-Pi jumps may occur with a sufficiently large number of oscillations under the envelope on corners of objects in the calculated phase map. These 2n*Pi jumps (wherein n is a whole number or integer) are very undesirable, particularly as these jumps cannot be eliminated by the known unwrapping, because the surface of the object is rather unsteady, therefore it may be discontinuous.

The approach with continuously moving measured object and object tracking with a virtual pixel in a triangulation arrangement, where wavelet-shaped signals are generated with a contrast envelope has been illustrated in the document DE 103 21 888 A1. Even the case of the triangulation angle zero—therefore structure illumination microscopy (SIM) is presented in FIG. 7 of document DE 103 21 888 A1 with pixel tracking on a moving measured object.

Since the early 1990s, around the world multiple usage of white-light interferometry (WLI)—generally in the formation of the measurement arrangement as a planar measuring white-light interference microscope has been undertaken. The multiple usage of depth-scanning, planar measuring confocal microscopy (CM), which goes back to M. Minski with U.S. Pat. No. 3,013,467, already started in the 1980s and represents an as yet unbroken trend. The depth motion scan used in the normal measurement arrangements of white-light and confocal microscopy are technically mastered rather persuasively. This scan, in principle, is absolutely necessary and mostly represents an external depth motion scan in the relationship between measurement arrangement and measured object.

Technically very persuasive are also the computer-controlled translation sleds used for this with continuous movement with respect to the stopping lateral guidance error in the sub-micrometer range and this is also with sub-micrometer increments. The movement occurs by a control system or even by means of regulating in realtime measurement. This is also possible at the costs that are, in the meantime, largely accepted by the measurement equipment market—at least in the area of research and development.

In this planar measuring method, mostly the 3D measurement arrangement or components themselves are moved in depth for focusing through the object space, rather more rarely the measurement object. That generally applies to all universal 3D measurement devices on the market.

Special 3D measurement arrangements for inline industrial measurement tasks, however, increasingly do move the object and not the measurement arrangement, particularly if it relates to a narrowly-defined object class, e.g. for well-known, low-mass measured objects of a very high number and low variety and short measurement times. The approach already published in 2004 in the patent application DE 103 21 888 A1 represents an example of such a solution for a focusing 3D triangulation measurement method with lateral movement of a measured object.

The German patent DE 10 2007 056 207 B4 also illustrates this solution with moving measured objects and fixed measurement arrangement and the generation of signals that are know from white-light interferometry (WLI). In both documents DE 10 2007 56 207 B4 and DE 103 21 888 A1, the focal surface, or the focal plane is inclined, in the arrangement, to the optical axis of detection and there is a relative movement between the measured object and the measuring head, which is designated as an external depth scan.

The specialist article [6] by R. Windecker, M. Fleischer and H. Tiziani with the title "Three-dimensional topometry with stereo microscopes" in the specialist journal Optical Engineering 36, (12) p. 3372-7777 (1997) describes the usage of two linear gratings in beat frequency in a triangulation arrangement on the basis of a stereo microscope, to increase the unambiguity range of the measurement. In this case, however, there is no reference to a depth scan.

In the specialist article [7] by T. Bothe, W. Osten, A. Gesierich, W. Jüptner with the title "Compact 3D Camera", Proc. of SPIE 4778, p. 48-59 (2002), for macroscopic applications, a 3D camera with parallel optical axes is described. Two object-side central perspective lenses are used in the triangulation arrangement. This 3D camera exhibits a liquid crystal display as a spatial light modulator, which can be shifted in depth together with a CCD camera for focusing by means of a piezo-translator (internal depth scan). Measurements are taken step-by-step at various focal depths in discrete steps, therefore discontinuously. Therefore, there is no continuous or quasi-continuous scan. At each focal depth, for example, in five selected discrete focal depths, at a standstill fine linear gratings are projected by means of a liquid crystal display that is offset in phase respectively by 90°, so that it deals with a classic multi-wavelength phase shift approach, in which no wavelets are generated from an image stack for 3D measurements. This method is therefore quite time-consuming due to the relevant stationary nature when recording a plurality of images at a single depth position. With this measurement approach, no small objects, for example, with dimensions of 10 mm×10 mm×10 mm, can be measured with depth resolutions in the single-figure micrometer range, for example, 3D-printed products, as there is no geometrical overlapping of projection and detection beam path in the near range of the measurement arrangement. This is produced from the approach with parallel optical axes in the object space. A depth resolution of 0.1 mm is specified in the specialist article. However, this is completely insufficient for objects with small parts. The same applies to the lateral resolution which is also in the order of magnitude of greater than/equal to 0.1 mm and is therefore much too coarse. An arrangement corresponding to the mapping scale factor, which is advantageous for small-scale measured objects can only be manufactured in this case with some difficulty.

In the specialist article by X. Schwab, C. Kohler, K. Korner, N. Eichhorn, W. Osten with the title "Improved micro topography measurement by LCoS-based fringe projection and z-stitching" Proc. SPIE 6995, 69950Q, doi: 10.1117/12.781822, a discontinuous depth-scanning stereo microscope (external depth scan) is described, to overcome the depth of field problem. The Gray code algorithm is used in connection with a phase-shift approach.

In document DE 103 21 888, the approach with a grating with sub-harmonics coded in for a triangulation arrangement with an internal depth scan is described. Furthermore, the usage of stochastic gratings are proposed, which require using cross-correlation algorithms. That leads to a comparatively high amount of computation.

In document U.S. Pat. No. 7,286,246 B2, an arrangement and a method for depth-scanning triangulation with structured lighting for 3D measurement is described.

In documents DE 699 14 886 T2 and WO 99/52416 and WO 98/45745, arrangements on the basis of a microscope are illustrated, to obtain three-dimensional information. In this case, illumination and detection are done using the same optical device. The projection system and detection system are therefore, always united spatially opposite an object, as coaxiality exists for the optical axes of the beam paths towards the object.

The present invention is based on the task of providing improved methods and arrangements for focus-varying triangulation with structured illumination, particularly also for 3D shape measurement in the microscopy range, exhibiting rather low enlargements which are also suitable for the mesoscopic range.

In particular, a 3D shape measurement in the mesoscopic range, also on objects with surface discontinuities, such as recesses, is to be enabled, wherein compared with weakly enlarging confocal microscopy on light-scattering surfaces, a 3D point cloud can be measured more quickly and with lower measurement uncertainty, therefore with high measurement accuracy.

Furthermore, comparatively large measurement fields than with the confocal microscopy and microscopy on the basis of commercially available optical devices can be measured.

Preferably, furthermore one or more of the following special tasks are to be solved:

A special task is an extensive reduction or even complete avoidance of $2n*Pi$ jumps with $n=1, 2, 3$ in the phase evaluation of signals in wavelet form with contrast envelope, which has been achieved by means of an arrangement of depth-scanning and/or focus-scanning triangulation with structured illumination, also particularly for 3D shape measurement in the microscopic and mesoscopic range.

Further preferably, only one individual translation system is to be arranged for the projection beam path and also for the detection beam path and the focal planes of projection and detection are to remain in coincidence in the same depth scan, thus, always coincide. Furthermore, the mass of the measurement equipment moved with the translation system is to be reduced. Furthermore, the effect of the lateral guidance error of a translation system with an internal depth scan is to be reduced. The optical path length in the optical beam path is to be increased, without the footprint of the arrangement being considerably increased, to enable a good approximation to the case of perfect telecentrics in the optical design.

The task(s) is/are solved by a method and an arrangement for depth-scanning strip triangulation with the characteristics specified in the independent claims. Preferred embodiments are the object of the sub-claims.

A first aspect of the invention relates to a method for depth-scanning strip triangulation with wavelet signal generation with a strip triangulation arrangement for structured illumination of at least one measured object.

The strip triangulation arrangement (also arrangement for depth-scanning strip triangulation in the following) comprises:

A projection beam path,
A detection beam path separated from the projection beam path,
At least one rasterised light detector with pixels,
At least one computer system, and
Computer-controlled scanning device for the depth scan of the measured object.

The strip triangulation arrangement may exhibit a triangulation angle of at least 2°, for example, between 6° and 80°, between 10° and 75° or between 20° and 60°.

The method comprises:

Running a depth scan of a measured object, comprising:
(i) Generating concurrently or sequentially at least two grating patterns with differing grating periods $p\_1$ and $p\_2$, wherein the grating periods fulfil the relationships $$p\_2 \geq 1.01*p\_1 \text{ and } p\_2 \leq 100*p\_1;$$

Projecting through the same projection beam path of the grating pattern onto the measured object, so that a measured object illuminated in a structured manner exists, and
Recording with the rasterised light detector and by using the detection beam path of at least two sets of images, that respectively correspond to the grating patterns, wherein each set of images comprises a sequence of images of the measured object illuminated in a structured manner with a certain grating pattern, or (ii) Generating a grating pattern with a period p and projecting the grating pattern onto the measured object through a projection beam path, so that a measured object illuminated in a structured manner exists; Altering the triangulation angle of the strip triangulation arrangement so that at least two different effective triangulation angles beta_1 and beta_2 sequentially exist in the strip triangulation arrangement, which fulfil the relationships beta_2≥1.01*beta_1 and beta_2≤1.25*beta_1, and Recording with the rasterised light detector and by using the detection beam path of at least two sets of images, that respectively correspond to the different triangulation angles, wherein each set of images comprises a sequence of images of the measured object structured in an illuminated manner at a given triangulation angle;

Producing at least two wavelets W1 and W2 with respectively different wavelet periods pw_1 and pw_2 from the at least two image sets, wherein the at least two wavelets W1 and W2 respectively exhibit a contrast envelope;

Determining, by means of the computer system, the depth position of a measured measurement point i of the measured object from the at least two wavelets W1 and W2 and considering reference phase values specified by pixel (phi_R_1, phi_R_2) of the at least two wavelet periods pw_1 and pw_2, comprising:

By-pixel evaluations of the centre of gravity of at least one of the contrast envelopes;

By-pixel phase evaluations of both the wavelet period pw_1, which provides a phase value phi_1 modulo 2 Pi, and the wavelet period pw_2, which provides a phase value phi_2 modulo 2 Pi;

Calculating the phase value phi_O_1_i and phi_O_2_i modulo 2 Pi for a pixel i, which in the pixel i both the reference phase value phi_R_1_i modulo 2 Pi of the wavelet period pw_1 and the phase value phi_R_2_i modulo 2 Pi of the wavelet period pw_2 in the surroundings of the calculated centre of gravity of the contrast envelope of the first wavelet W1 and/or the calculated centre of gravity of the contrast envelope of the second wavelet W2 correspond at least approximately; and Calculating the depth position for the measurement point i of the measured object from the calculated phase values phi_O_1_i and phi_O_2_i modulo 2 Pi for the pixel i.

In the method according to aspect 1 at least two wavelets are produced with contrast envelope. This is done by a concurrent projection—then preferably with spectral separation—or by a sequential projection of two strip images with respectively different triangulation wavelength on the measured object.

The method particularly provides the opportunity, using the shape of the contrast envelope of the relevant wavelet, of obtaining indications of the measurement uncertainty of the measured point. So, for each measurement point, the control of the known nominal half value width of the wavelet of the arrangement or the skew of the wavelet for determined wavelets can be monitored and with significant deviations from the half value width or symmetry of the envelope this measurement can be rejected. Measurements of great uncertainty often exhibit a dip in the contrast envelope or a marked skew, therefore an asymmetry, of the contrast envelope.

The recorded sets of images that correspond respectively to the various grating patterns or the various triangulation angles, may be stored in the form of different or separate image stacks. It is also possible to nest the images of the individual sets into each other and store in the form of an image stack, wherein the image stack comprises interchangeable or alternating images of the measured object illuminated with the different grating patterns or at different triangulation angles. The at least two wavelets may then be determined by reading the images from the separate image stacks or by alternately reading the images from a common image stage. The at least two wavelets W1 and W2 may be stored separately in a digital memory. The reference phase value phi_R_1 modulo 2 Pi, phi_R_2 modulo 2 Pi may be determined by a previously taken reference measurement by means of a reference measured object by-pixel and stored in a data medium.

Preferably, both grating periods p_1 and p_2 fulfil the following relationships:

$p\_2 \geq 1.01*p\_1$ and $p\_2 \leq 10*p\_1$.

The grating periods p_1 and p_2 (or p_2_f) may, for example, fulfil the condition p_2<2*p_1 and/or p_2_f<2*p_1, and the at least two wavelets W1 and W2 may exhibit a mutual beat frequency with at least one beat frequency period pw_12, which is twice as large as the wavelet period pw_1 of the wavelet W1. In so doing, the beat frequency period (beat frequency wavelet period) pw_12 specifies the unambiguity range EDB.

The grating periods p_1 and p_2 and/or p_2_g may also fulfil the condition p_2>2*p_1 and/or p_2_g>2*p_1, and the wavelet period pw_2 of the second wavelet W2 may be at least twice as large as wavelet period pw_1 of the first wavelet W1. In this case, the second wavelet W2 is formed more coarsely than the first wavelet W1. The wavelet period pw_2 in this case specifies the unambiguity range EDB.

In the depth scan, furthermore a telecentric illumination of the measured object and/or a telecentric mapping of the measured object can be done. The telecentric illumination may be done by means of a telecentric aperture and/or a telecentric mapping stage in the projection beam path on one side or on both sides. The telecentric mapping may be done by means of a telecentric aperture and/or a telecentric mapping stage in the detection beam path on one side or on both sides.

The depth scan may be a continuous or a discontinuous and/or stop-and-go scan. Preferably the depth scan is a continuous depth scan which, for example, is undertaken by:

A continuous relative movement between the measured object and the triangulation arrangement; or A continuous relative movement between the measured object and the focal plane of at least one grating image in the object space; or A continuous variation of the refraction power in the projection beam path.

The depth scan may be an external depth scan, an internal depth scan or a combination of the two. The depth scan may be, for example Either of the entire strip triangulation arrangement in relation to the measured object (external scan), Or of components of the strip triangulation arrangement in relation to the measured object (internal scan), Or of the measured object (external scan);

Or at least of one pattern-generating component of the triangulation arrangement, such as a linear grating, for example (internal scan).

Both with the external and also with the internal depth scan, preferably the confocal condition is maintained. With an external depth scan, the confocal condition is generally implicitly maintained. In an internal depth scan, the confocal condition must be purposefully maintained geometrically and optically. This is done by achieving a coincidence of the images AS_O and BS_O of the shift paths in the object space.

The generation of the at least one grating pattern, the optical beam paths and the depth scan may be achieved in varying ways.

So, in the depth scan, at least two fixed and/or static linear gratings with different grating periods may be illuminated at alternating times or the at least two fixed linear gratings are self illuminating and illuminate at alternating times.

It is possible, instead of the fixed and/or static linear gratings, to use controllable spatial light modulators or light emitters. The method may then comprise a variation of the grating period with electronic means. So, for example, a spatial light modulator may be illuminated that switches sequentially in time the at least two grating patterns with the relevant different grating periods p_1 and p_2. Alternatively, a switchable, structured light emitter can switch sequentially in time the at least two grating patterns with the relevant different grating periods.

It is also possible to generate and detect two grating patterns concurrently, wherein the grating patterns are, for example, discriminated spectrally. So, for example, two fixed and/or static linear gratings with light with respectively different colour spectrum can be illuminated concurrently or the at least two linear gratings are self-illuminating with respectively different colour spectrum. The grating patterns generated are projected on the measured object concurrently by the same projection beam path so that a measured object illuminated in a structured way and in colour exists. This measured object can be detected by using a detection beam path from a rasterised light detector with at least two colour channels. The images in the relevant colour channel then form the relevant image set, by using which the wavelet is generated. Instead of fixed and/or static linear gratings, colour-coded controllable spatial light modulators or light emitters are used.

Furthermore, it is possible to use a fixed and/or static rotating linear grating, wherein the linear grating is rotated between at least two different rotational positions. By rotating the fixed and/or static rotating linear grating in the various rotational positions, sequentially in time at least two linear gratings with different effective grating periods p_eff_1 and p_eff_2 are generated. The linear grating may be illuminated with at least one light source or be self-illuminating.

Generally, only two rotational positions of a linear grating are used, as in the approach with wavelet generation by depth scan, no discrete phase shift must occur on the linear grating, as wavelets are generated in the depth scan, which supply the necessary phase information.

Preferably, one linear grating with the grating period p is used, that is rotated significantly from the normal position, in other words 90° to the triangulation base, about the angle of rotation psi clockwise. The angle psi is preferably from 10° to 80°. For the first rotational position of the linear grating, an angle of rotation psi_1 is produced that, for example, is equal to 40°. The effective grating period is increased by 1/cos(psi_1) compared with the normal position to p_1=p/cos(psi_1). In this position, a first depth scan is performed and a first image stack is recorded, from which the wavelet W1 is produced for each pixel.

After the first depth scan, the linear grating is turned somewhat further (for example by the angular amount of 10°), so that an angle psi_2 is set compared with the normal position. Thus, another effective period of the linear grating is produced, than is then $$p\_2\_f = p/\cos(psi\_2)$$

Therefore, a first fine grating period p_1 and then a second grating period p_2_f can be produced and the method described above used.

In the second rotational position, a second image stack is also recorded, from which the wavelet W2 is produced for each pixel, said wavelet then being somewhat expanded somewhat in comparison to the first wavelet W1 in this described case. The depth scan for the first rotational position may, for example, be performed when the scan is running forwards and for the second rotational position when the scan is returning.

It is advantageous if the combinations are used in which the quotient $$\cos(psi\_1)/\cos(psi\_2)$$

moves between 1.1 to 1.5.

A quotient in the range of 1.15 to 1.33 represents an optimum in this case. This means that the first effective grating period p_1 represents the smaller of the two grating periods.

Both positions with the angles of rotation psi_1 and psi_1 can be achieved highly precisely by mechanical stops with magnetic force in the direction of a bistable, robust mechanical construction supported such that it can rotate—at least in the partial range of the full circle. The construction supported such that it can rotate includes, for example, a controllable drive on which no accuracy requirements must be set, and which undertakes the rotation as quickly as possible. Putting into the final position can be done by means of magnetic force. Both angle of rotation positions and/or rotational positions are preferably secured so they can be reproduced as precisely as possible for the time between two calibrations.

Another possibility is to vary the aperture opening of a controllable aperture in an aperture plane in the projection and/or detection beam path. In particular, a fixed and/or static periodic linear grating may be illuminated with a period p with at least one light source or self-illuminator. In relation to the optical axis of the relevant mapping beam path, laterally different regions of the aperture opening of the controllable aperture may be released alternately, controlled with a preset for light transmission or light reflection. In so doing, the effective triangulation angle of the strip triangulation arrangement is changed in a preset controlled manner, so that sequentially at least two different effective triangulation angles beta_1 and beta_2 exist in the strip triangulation arrangement.

In this case, in particular, the geometric or the photometric centre of gravity of the aperture opening varies. Thus the location of the effective aperture centre of the triangulation arrangement and therefore also the effective triangulation angle change. A variation of the centre of gravity of the aperture opening affects the triangulation wavelength which has a direct effect on the wavelet period of the wavelet. The variation of the aperture opening and in particular the centre of gravity of the aperture opening is preferably done after each individual image recording of the measured object by means of the rasterised detector.

The controllable aperture may, for example, be a laterally controllable mechanical aperture. It is also possible to achieve the aperture by means of a spatial light modulator.

If the spatial light modulator or a controllable aperture of any kind whatsoever with lateral shift or a component with lateral shift of the centre of the aperture or the photometric centre of gravity is arranged in the aperture plane of the detection beam path, this leads to a thoroughly advantageous side-effect. In other words, to the effect that the digital aperture of the detection beam path is smaller than the digital aperture of the projection beam path respectively in the object space. In so doing, in the scan, the image point wash-out when recording the image is limited. That is advantageous for finely-structured objects or for objects with respectively a light-dark transition on the surface, e.g. in the form of a black-and-white pattern printed onto the surface of an object.

The aperture control may, for example, be undertaken as follows: In a first case, the centre of gravity of the aperture opening always lies in a first state on the optical axis of the detection beam path, and in a second state, the aperture opening is uncentred. In a second case, both centres of gravity of the aperture opening are uncentred at the same distance to the optical axis of the detection beam path.

The approach with the controlled aperture opening for variation of the effective triangulation wavelength is particularly suitable for rather cooperative objects without a marked fine structure and with uniform light scattering, therefore for measuring the deviation from the plane and the target shape of objects with rather small surface gradients.

So, a measured object illuminated in a structured manner exists by using two triangulation wavelengths when using only one single projection beam path, if the mapping components define the same as the projection beam path. The measured object is detected using the detection beam path of a rasterised light detector and in the depth scan a sequence of images of the measured object illuminated in a structured way is recorded. So, wavelets with different wavelet periods can be generated.

In the depth scan, an image stack in the memory is recorded for aperture opening alternating in time, and from the image stack, by alternating reading of two different wavelets, W1 and W2 with the wavelet periods pw_1 and pw_2 are generated. Thus wavelet W1 with the effective triangulation angle beta_1 and wavelet W2 with the effective triangulation angle beta_2 correspond. Due to the continuous depth scan, these wavelets W1 and W2 respectively exhibit a contrast envelope and may be stored separately in a digital memory.

From wavelets W1 and W2, as described above, the depth position for the measured object is calculated by pixel.

Furthermore, a second aspect of the invention relates to an arrangement for depth-scanning strip triangulation with structured illumination and wavelet signal generation for structured illumination of at least one measured object. The arrangement is particularly designed so to implement the method described above. The arrangement for depth-scanning strip triangulation comprises:
A projection beam path,
A detection beam path separated from the projection beam path,
At least one rasterised light detector with pixels,
At least one computer system; and
A computer-controlled scanning device for the depth scan of the measured object.

The computer system may contain different modules such as, for example, a storage module, a control module with a control program and an evaluation module with an evaluation program. It is possible to undertake controlling the strip triangulation arrangement and the (pixel-by-pixel) evaluation of the detected signals by different computer systems (which may be in signal interconnection).

The scanning device may be designed to run an external or an internal depth scan. The scanning device may comprise translation movement means (e.g. a translation sled) with an axis of translation, wherein the depth scan may be run either by a movement of the entire triangulation arrangement in relation to the measured object or the measured object in relation to the entire triangulation arrangement, or by components of the triangulation arrangement in relation to the measured object. The moving component may, for example, be a linear grating. The scanning equipment may, for example, comprise means of translation movement (e.g. a translation sled) with a translation axis.

Furthermore, the arrangement is designed,
(i) concurrently or sequentially to generate at least two grating patterns with different grating periods p_1 and p_2 and to project onto the measured object by the same projection beam path, wherein the grating periods p_1 and p_2 comply with the following relationships:

$p\_2 \geq 1.01 * p\_1$ and $p\_2 \leq 100 * p\_1$, or
(ii) to generate a grating pattern with a grating period p and to project through the projection beam path onto the measured object, and to vary the triangulation angle beta of the strip triangulation arrangement so that sequentially at least two different triangulation angles beta_1 and beta_2 exist in the strip triangulation arrangement, which comply with the relationships $beta\_2 \geq 1.01 * beta\_1$ and $beta\_2 \leq 1.25 * beta\_1$ With the rasterised light detector and by using the detector beam path of at least two sets of images, that respectively correspond to the grating patterns or the different triangulation angles, wherein each set of images comprises a sequence of images of the measured object illuminated in a structured manner with a given grating pattern or comprise images of the measured object illuminated in a structured manner at a given triangulation angle.

Furthermore, the computer system comprises a memory for storing the at least two image sets.

The computer system may furthermore comprise an evaluation module that is thus set up:
to generate at least two wavelets W1 and W2 with respectively different wavelet periods pw_1 and pw_2 from the at least two image sets, wherein the at least two wavelets W1 and W2 respectively exhibit a contrast envelope;
to determine the depth position of a measured measurement point i of the measured object from the at least two wavelets W1 and W2 and considering reference phase values specified by pixel phi_R_1, phi_R_2 of the at least two wavelet periods pw_1 and pw_2, wherein determining the depth position comprises:
by-pixel evaluation of the centre of gravity of at least one of the contrast envelopes and by-pixel phase evaluations of both the wavelet period pw_1, which provides a phase value phi_1 modulo 2 Pi, and the wavelet period pw_2, which provides a phase value phi_2 modulo 2 Pi;

Calculating the phase value phi_O_1_i and phi_O_2_i modulo 2 Pi for a pixel i, which in the pixel i both the reference phase value phi_R_1_i modulo 2 Pi of the wavelet period pw_1 and the phase value phi_R_2 i modulo 2 Pi of the wavelet period pw_2 in the surroundings of the calculated centre of gravity of the contrast envelope of the wavelet W1 and/or the calculated centre of gravity of the contrast envelope of the wavelet W2 correspond at least approximately; and Calculating the depth position for the measurement point i of the measured object from the calculated phase values phi_O_1_i and phi_O_2_i modulo 2 Pi for a pixel i.

As described in the context of the method according to aspect 1, the depth scan and the at least one grating pattern may be achieved in different ways.

To be able to produce the at least one grating pattern, the arrangement may comprise at least one pattern-generating component, such as, for example, a linear grating. The pattern-generating component may be a fixed and/or static component (such as a fixed linear grating, for example) or a controllable component (such as a spatial light modulator or a controllable light emitter, for example). The pattern-generating component may be self-illuminating (such as an LED array, for example) or be illuminated by one or more light sources.

The arrangement for depth-scanning strip triangulation may, for example, comprise two spatially-separate fixed and/or static periodic linear gratings that are either illuminated by means of a light source or are self-illuminating, wherein the light from the linear gratings passes an aperture arranged in a projection beam path and is projected through the beam path onto the measured object. The fixed and/or static periodic linear gratings may be illuminated sequentially or brought to be illuminated. A concurrent and spectrally-discriminated illumination and/or a concurrent and spectrally-discriminated lighting is also possible.

It is also possible to use a spatial light modulator or a switchable, structured light emitter, wherein the light modulator or the light emitter is set up to generate either concurrent, different (e.g. spectrally separated) grating patterns with respectively different grating periods p_1 and p_2 or grating periods p_1, p_2 sequentially switchable.

Furthermore, it is possible to use a fixed and/or static, rotating linear grating illuminated with at least one light source or that is self-illuminating, wherein by rotating the fixed and/or static rotating linear grating sequentially in time at least two grating patterns with different effective grating periods p_eff_1 and p_eff_2 are generated.

The fixed and/or static rotating linear gratings may be twisted from the normal position in relation to the triangulation base about the angle psi, wherein the angle psi is preferably between 10° to 80°. In so doing, two grating patterns with different effective grating periods may be generated, that preferably meet the conditions p_eff_2≥1.01*p_eff_1 and p_eff_2≤10*p_eff_1. The fixed and/or static rotating linear grating may be rotated by means of a computer-controlled and/or controllable rotation device.

It is also possible to use a fixed and/or static periodic linear grating with a period p in combination with a controllable aperture. The controllable aperture with an aperture opening is arranged in an aperture plane of the projection beam path and/or the detection beam path. The linear grating may either be illuminated with at least one light source or is self-illuminating. Furthermore, the arrangement for depth-scanning strip triangulation comprises an aperture control device which is set up, in relation to the optical axis of the relevant mapping beam path to release laterally different regions of the aperture opening in a preset controlled manner for light transmission or light reflection alternately, so that the effective triangulation angle of the strip triangulation arrangement changes in a preset controlled manner and thus sequentially at least two different effective triangulation angles beta_1 and beta_2 exist in the strip triangulation arrangement.

The controllable aperture may, for example, be a spatial light modulator, a lateral, mechanically shiftable controlled aperture and/or a laterally controlled fluid aperture. The controllable spatial light modulator may, for example, be formed as a ferro-electric liquid crystal that shifts the centre of the aperture opening preset laterally as described above.

The projection beam path and the detection beam path may be designed differently. Thus the projection beam path and/or the detection beam path may exhibit a mapping scale with a factor equal to or not equal to one. Preferably, the mapping scale factor is less than or equal to 5. The mapping scale factor in the projection beam path beta_dash_P and in the detection beam path beta_dash_D may—when considering the lateral size (y coordinate) in the array space to the lateral size (y coordinate) in the object space—at least approximately satisfy one of the following relationships beta_dash_D=beta_dash_P*[root of cos(beta)]

beta_dash_P=beta_dash_D*[root of cos(beta)]

The optical axis of the projection beam path in the array space and/or on the side or the component generating the at least one grating pattern and the optical axis of the detection beam path in the array space and/or on the side of the rasterised detector may be mutually inclined. The term "array" generally relates to any rasterised component (transmission pattern array), such as, for example, to the at least one component (e.g. linear grating) that generates the at least one grating pattern or to the rasterised detector (receiver array). The term "array space" relates to the space in front of the relevant array.

It is also possible that the optical axis of the projection beam path APA in the array space in the internal the beam path and the optical axis of the projection beam path ADA in the array space in the internal beam path run mutually parallel. The internal beam path relates to the beam path from the pattern-generating component (such as a linear grating, for example, a spatial light modulator, a light emitter, etc.) to the measured object and from the measured object to the rasterised detector. The projection beam path or the detection beam path may be perpendicular to the focal surface F_PD.

The surface normals of the rasterised detector may include an angle with the optical axis of the detection beam path ADA of the size kappa_D (kappa_D1, kappa_D2) of at least approximately kappa_D=modulus{arctan[beta_dash_D*tan(beta)]}

The surface normals of the pattern-generating component (such as a spatial light modulator, a fixed and/or static linear grating etc.) may also include an angle with the optical axis of the projection beam path APA of the size kappa_P of at least approximately kappa_P=modulus{arctan[beta_dash_P*tan(beta)]}

The at least one pattern-generating component (such as a spatial light modulator, a fixed and/or static linear grating etc., for example) may furthermore be perpendicular to the optical axis of the projection beam path.

The scanning equipment may, for example, comprise means of translation movement (such as e.g. a translation sled) with a translation axis TA. The optical axis of the detection beam path on the side of the measured object and/or in the object space may be arranged parallel to the translation axis of the scanning equipment and/or the means of translation movement.

In the projection beam path and/or in the detection beam path respectively a first mapping stage (comprising a front optical device allocated to the measured object) and/or an aperture may be arranged. In the projection beam path, the light from both grating patterns preferably passes the same aperture and the same mapping stage and/or front optical device.

Preferably, the arrangement for depth-scanning strip triangulation is designed and therefore set up to achieve a telecentric illumination of the measured object and/or a telecentric mapping of the measured object. So, for example, the mapping stage in the projection beam path and/or the mapping stage in the detection beam path may be a one-sided or two-sided telecentric mapping stage. Furthermore, the aperture in the projection beam path and/or the aperture in the detection beam path may be a telecentric aperture.

The telecentric mapping stage (that may be formed as a telecentric lens, for example) in the projection and/or detection beam path may be telecentric on the side of the array and/or the array space. The telecentric mapping stage may be a two-sided telecentric mapping stage, i.e. a mapping stage that is telecentric both on the side of the array and/or the array space as well as on the side of the measured object.

The projection and/or detection beam path may furthermore be unfolded (without deviation from the relevant optical axis) or folded (with deviation from the relevant optical axis).

So, in the projection and/or in the detection beam path at least two plane mirror surfaces may be arranged. The plane mirror surfaces in the projection beam path may be arranged on the optical path of a pattern-generating component of the arrangement for depth-scanning strip triangulation to the measured object. In the detection beam path, the plane mirror surfaces are arranged on the optical path of the measured object to the rasterised detector.

Preferably, the difference in the number of reflections on the plane mirror surfaces in the projection and in the detection beam path is zero or even-numbered. Accordingly, the difference of the plane mirror surfaces between the projection beam path and the detection beam path may be zero or even-numbered.

The at least two plane mirror surfaces may be arranged in the form of an angled mirror or an angled mirror prism in the projection and/or detection beam path. The angled mirror prism may, for example, be a pentaprism. The angled mirror may, for example, be a 45° angled mirror in air or 90° angled mirror.

In the examples above with plane mirror surfaces, the projection beam path and the detection beam path may be at an angle (triangulation angle beta) of 45°. In this case, the mapping stages may preferably be telecentric on both side and the mapping scale of both mapping stage preferably embodies the amount one. The pattern-generating component may comprise two linear gratings, wherein the planes of both linear gratings and the plane of the rasterised detector are preferably arranged mutually parallel. The translation axis of the translation system may be arranged perpendicular to the plane of the rasterised detector, and the main projection beam and the translation axis may be mutually aligned at an angle of 45°. The optical axis of the detection beam path is preferably perpendicular to the coincident plane of focus of the projection and the detection beam path.

The at least two plane mirror surfaces may, furthermore, be arranged in the form of an angled mirror arrangement in the projection beam path, wherein the total deflection angle (deflection angle in the beam path delta) of the angled mirror arrangement in the projection beam path, considered, for example, by a pattern-generating component, such as a linear grating, for example, that exhibit an angle of double the size of the triangulation angle beta, and wherein the projection beam path and the detection beam path exhibit a mapping scale factor of values not equal to or equal to one.

The at least two plane mirror surfaces may also be arranged in the form of a 90° angled mirror or pentaprism in the projection beam path, wherein the mapping scale of the object space in the array space is equal to the square of the tangent of the triangulation angle beta_P.

The at least two plane mirror surfaces may also be arranged in the form of an angled mirror arrangement in the projection beam path, wherein the total deflection angle (deflection angle in the beam path delta) of the angled mirror arrangement in the projection beam path, considered, for example, by a pattern-generating component, such as a linear grating, for example, that exhibit an angle of double the size of the triangulation angle beta, the translation axis TA represents the angle bisector to the optical axis of the projection beam path APA and the optical axis of the detection beam path ADA, and the projection beam path and the detection beam path exhibit a mapping scale factor of not equal to or equal to one.

As described above, the scanning equipment may comprise a computer-controlled translation system, e.g. in the form of a translation sled. The translation system may be arranged rigidly both to the rasterised light detector and at least one pattern-generating component of the arrangement for depth-scanning strip triangulation, so that the translation system, the rasterised light detector and the at least one pattern-generating component of the arrangement depth-scanning strip triangulation are rigidly connected.

The arrangement for depth-scanning strip triangulation may comprise two or more projection beam paths. The at least two projection beam paths may be arranged symmetrically to the optical axis of the detection beam path. Also, the arrangement for depth-scanning strip triangulation may comprise two or more detection beam paths. The at least two detection beam paths may be arranged symmetrically to the optical axis of the projection beam path. The projection beam paths and/or the detection beam paths may be formed telecentrically and respectively exhibit a telecentric aperture.

Example areas of application of the proposed method and arrangements are form-measuring, shape-measuring, also on extraoral dental components and also in connection with multiple coordinate metrology. Thus objects with a considerably extended depth are at the forefront. Furthermore, in particular, a highly-precise mini-shape measurement must be enabled, but not necessarily the maximum lateral resolution. Simple and low-cost components must be used enabling a highly mechanically-stable construction.

A preferred area of application is quite generally the area in which the triangulation angle beta of the measurement arrangement of the aperture angle (peripheral ray angle)

alpha of a normal lens for confocal microscopy or microscopy with focus-seeking—particularly with low microscope enlargement—is markedly surpassed.

The invention preferably aims at solutions for the three-dimensional measurement of objects with dimensions in the range of 1 mm×1 mm×1 mm through 25 mm×25 mm×25 mm and also up to 200 mm×200 mm×200 mm. This relates to a depth resolution of the submicrometer to the one- and two-figure micrometer range that is scaled to the size of the measuring field. Otherwise evaluated, this relates to a measurement volume in the orders of magnitude of around 1 cubic millimeter to 10 cubic decimeters, also frequently in a cubelike shape. This particularly also relates to measurement arrangements with a very high depth resolution of up to 1/100 000 of the measurement field diagonal.

So, therefore, the amounts correspond to the mapping scale beta_dash in the region of 0.05 to about 5. The mapping scale factor beta_dash around 1 and up to 0.2 is of particular interest in this case. Therefore, for the definition of the mapping scale beta_dash, in this case, the detection beam path from the measured object with mapping onto the chip of a rasterised detector is to be considered. For measured objects requiring an mapping scale factor beta_dash of greater than 5, the approach with the confocal microscope for 3D recording is certainly the better alternative. For amounts of the mapping scales beta_dash in the region of below 0.05, the restrictions due to a limited depth of field are mostly no longer so serious so that a depth scan can be dispensed with.

Special areas of usage are the highly-precise surveying of teeth or measured objects with the shape of a tooth, surveying of print-outs from the human ear for components of hearing aids that are to guarantee optimum seating in the ear, and surveying of injection moulding tools for plastic components with small parts up to the single-figure micrometer range.

The proposed approaches are particularly suitable for the low-cost area if, for example, it rather relates to 3D profile measurements of smaller objects, for example with three-dimensional mini-relief structures, at various, very different depths—as on surfaces offset in depth—or on inclined surfaces. In so doing, the absolute measurement of greater depths is not at the forefront but that of a fine 3D profile. To compensate for the lower long-term stability, for example of sensors made of polymer and polymer optics, recalibrations can be frequently made. Such sensors manufactured in larger quantities, for example, even by 3D printing, may also be used for multiple-equipping of measurement systems in combination with low-cost stepper motor drives.

In the following, preferred illustrative examples of the present invention are described by way of example using the accompanying figures. Individual elements of the described illustrative examples are not restricted to the relevant illustrative example. Rather, elements of the illustrative examples can be combined randomly with each other and new illustrative examples created as a result. In which:

FIG. 1*a* shows an example triangulation arrangement according to the prior art;

FIG. 1*b* shows a contrast function for the grating mapping at various depths in the triangulation arrangement from FIG. 1*a*;

FIG. 1*c* shows an example stereo microscope with the triangulation arrangement from FIG. 1*a*;

FIG. 1*d* shows a further example stereo microscope with a triangulation arrangement according to the prior art;

FIG. 1*e* shows a wavelet recorded with the stereo microscope from FIG. 1*d*;

FIG. 1*f* shows an example triangulation arrangement according to the prior art;

FIG. 1*g* shows a wavelet recorded with the arrangement from FIG. 1*d*;

FIG. 1*h* shows an example triangulation arrangement with internal depth scan according to the prior art;

FIG. 1*i* shows an example two-sided telecentric mapping stage for projection and detection of an object illuminated in a structured way according to the prior art;

FIG. 1*j* shows an example wavelet that can be generated pixel-by-pixel with an arrangement according to FIG. 1*f*, 1*h* or 1*i* by a measurement;

FIG. 1*k* shows an example symmetrical wavelet;

FIG. 1*l* shows an example asymmetrical wavelet

FIG. 2 shows an example continuous focus-scanning triangulation arrangement with a double wavelet approach and an external continuous scan.

FIG. 3 shows an example first linear grating with a first grating period p_1;

FIG. 4 shows an example second linear grating with a second grating period p_2;

FIG. 5 shows a first wavelet W1 that results from the first linear grating (FIG. 3);

FIG. 6 shows a second wavelet W2 that results from the second linear grating (FIG. 4);

FIG. 7 shows the beat frequency of the wavelets recorded with the linear gratings from FIGS. 3 and 4;

Figure 11:
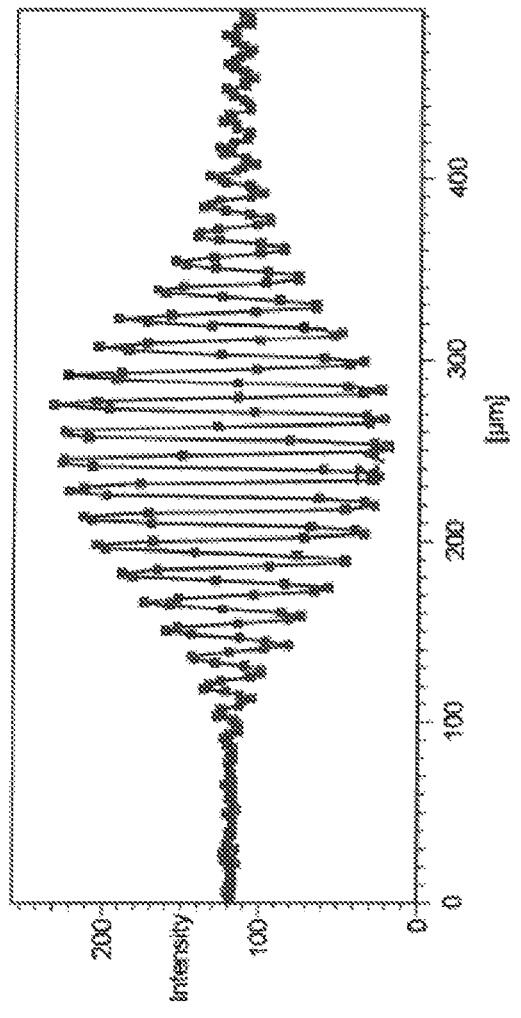
Figure 12:
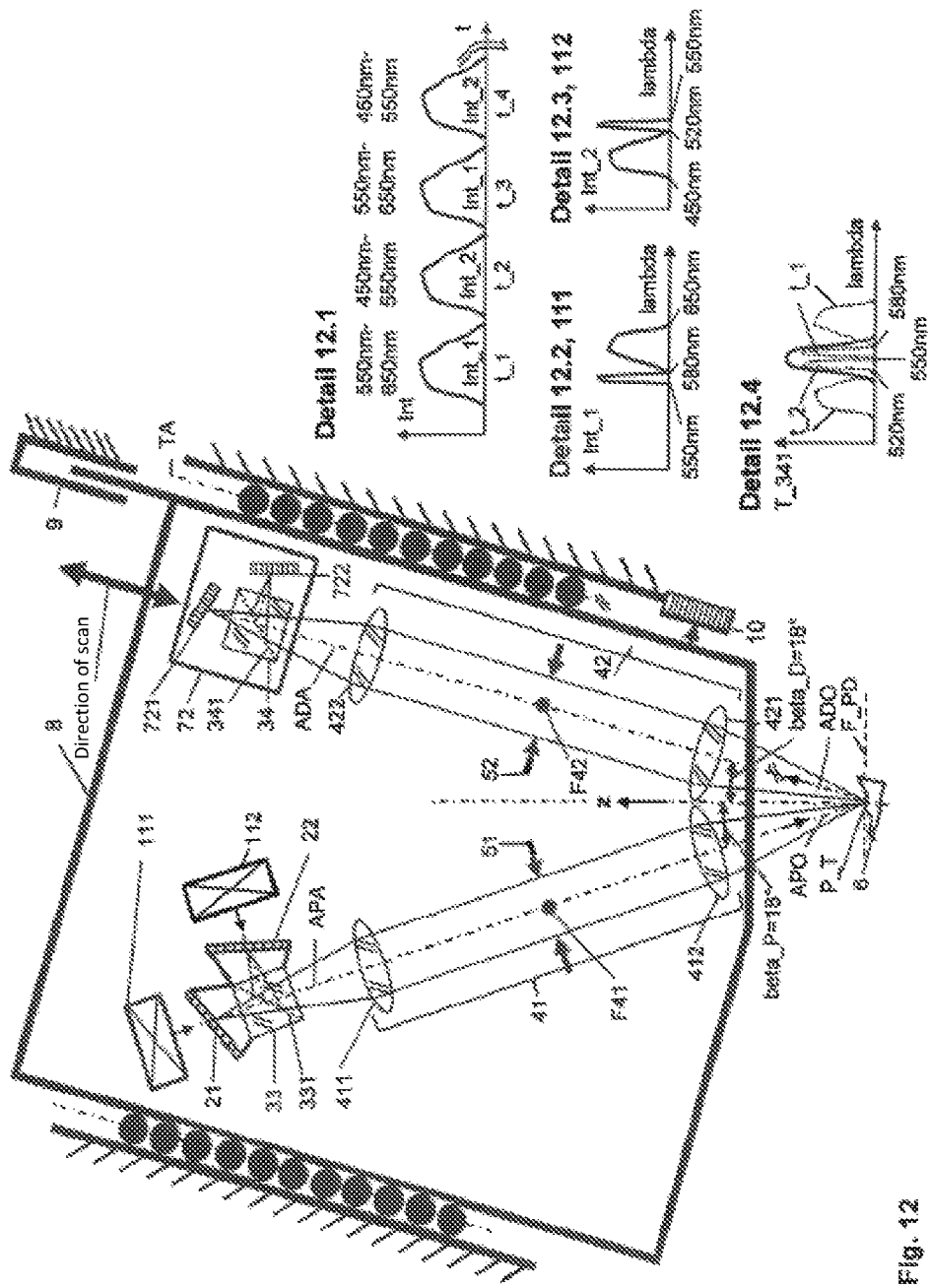
Figure 13:
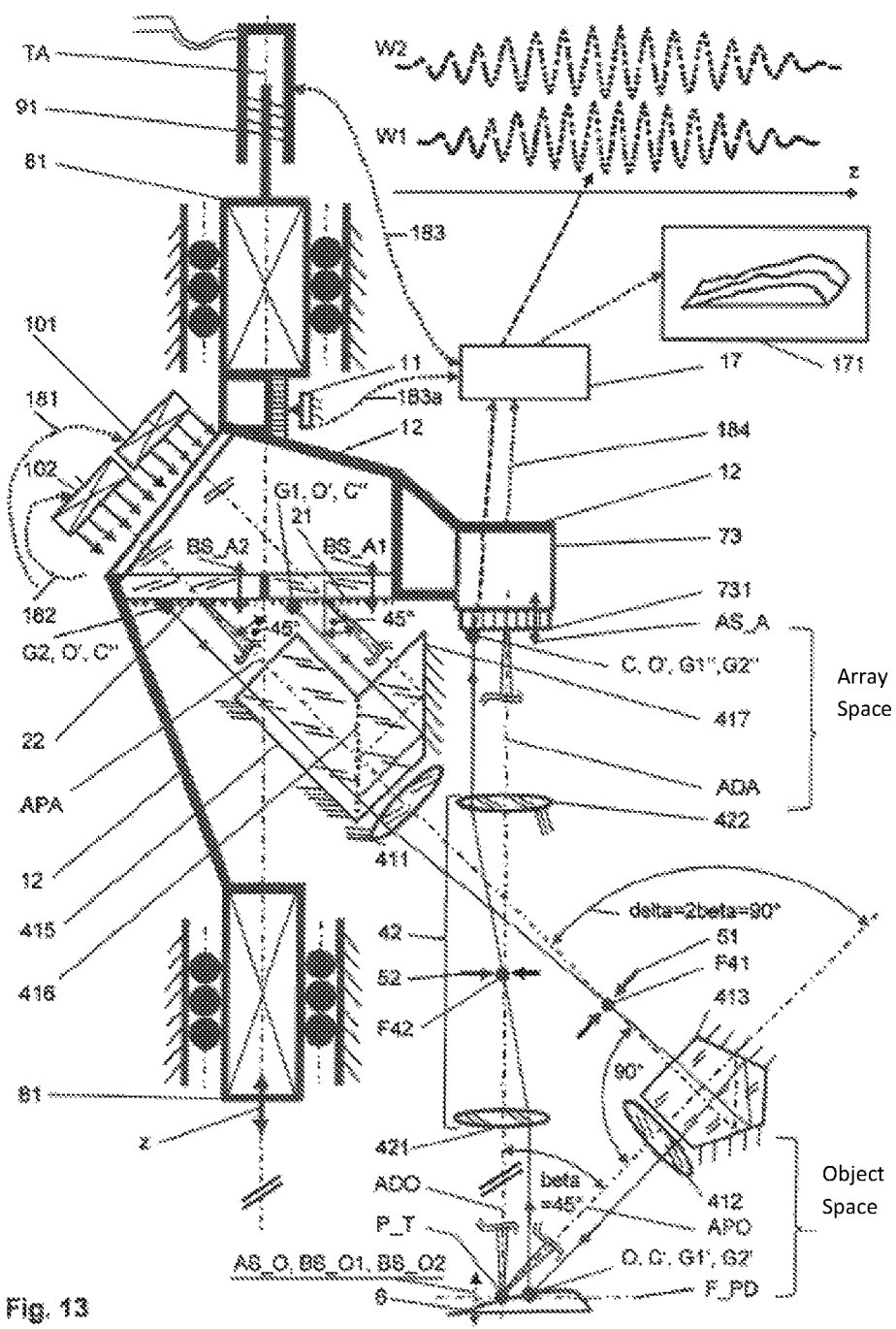
Figure 14:
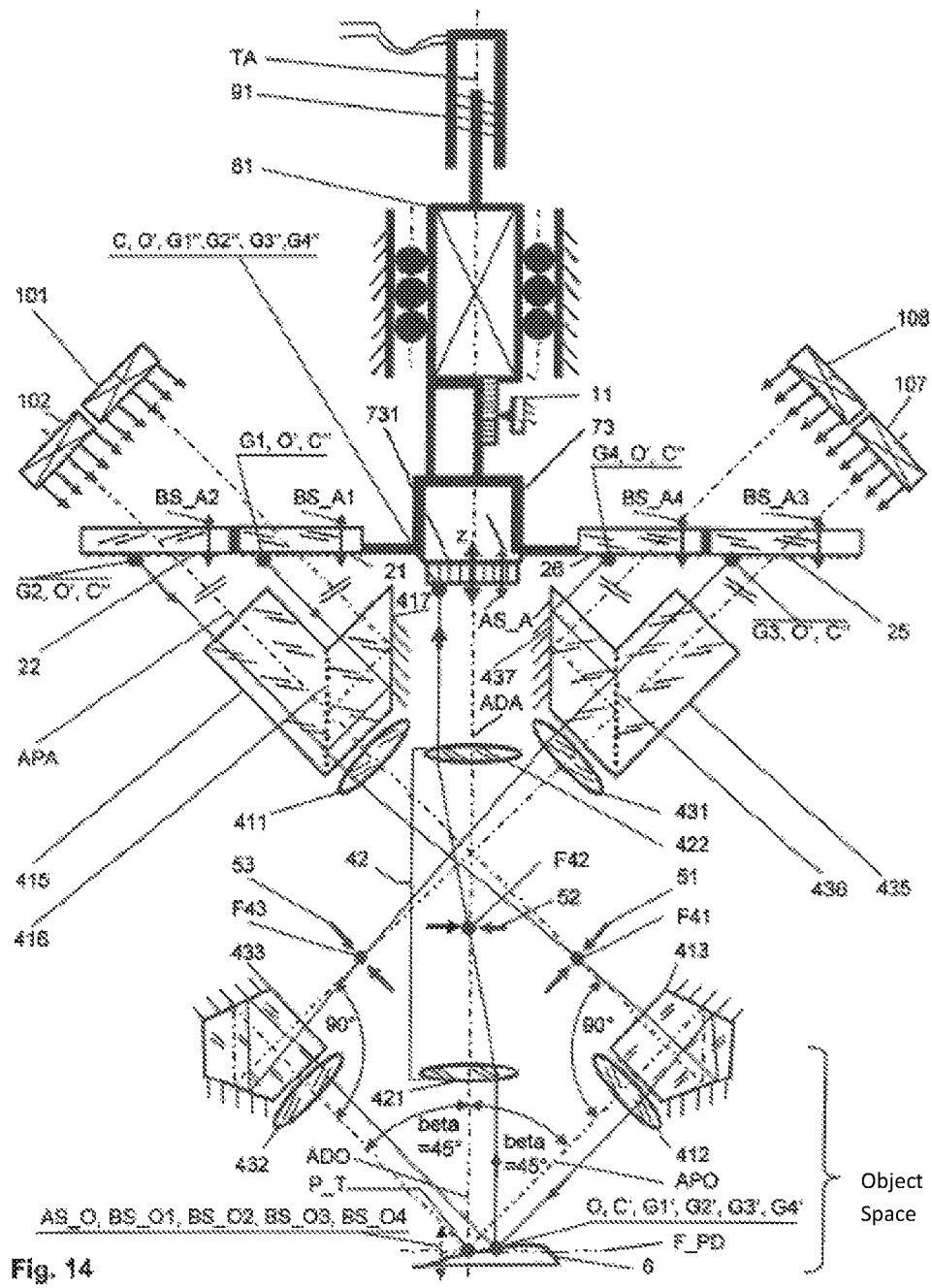
Figure 15B:
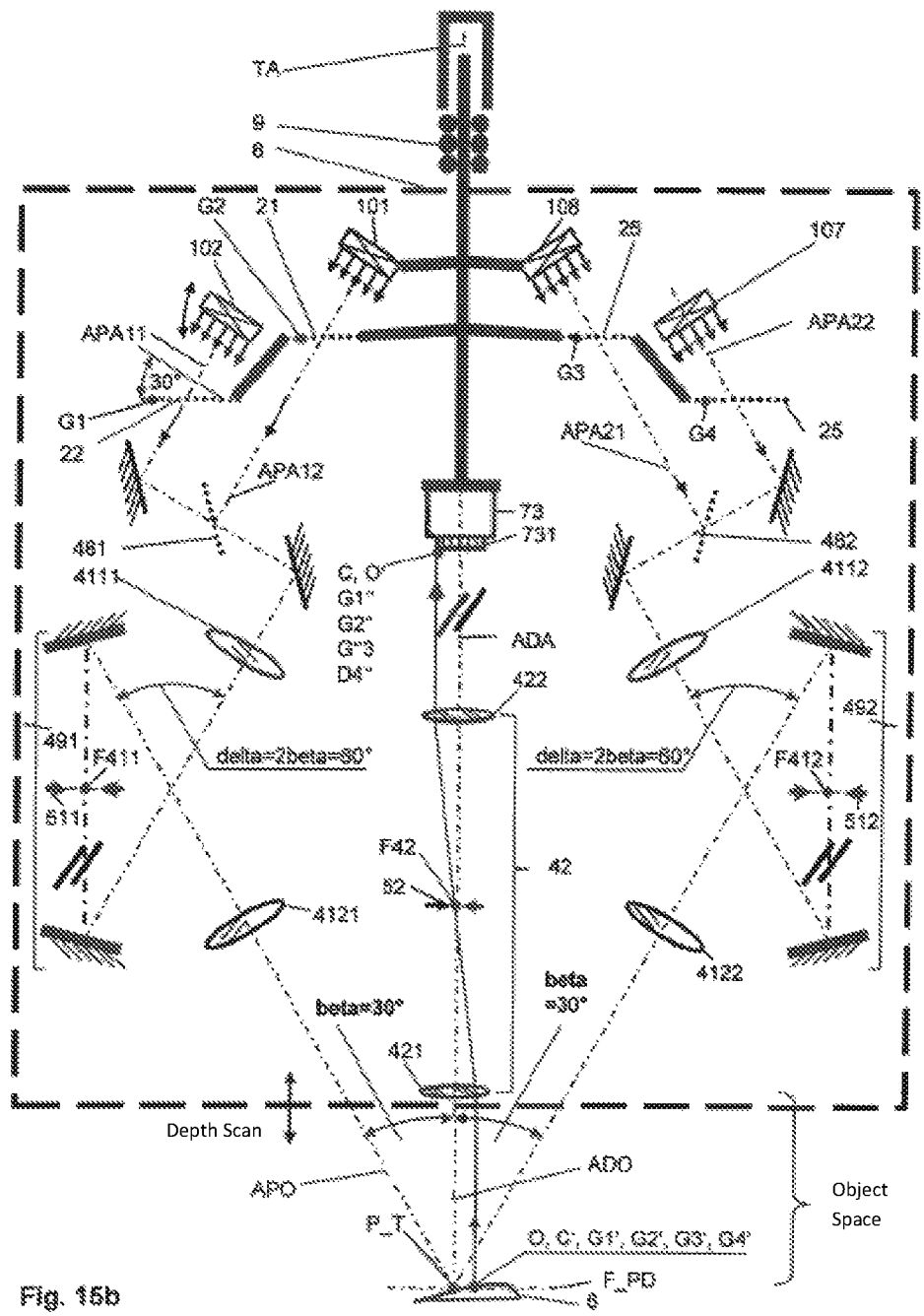
Figure 17:
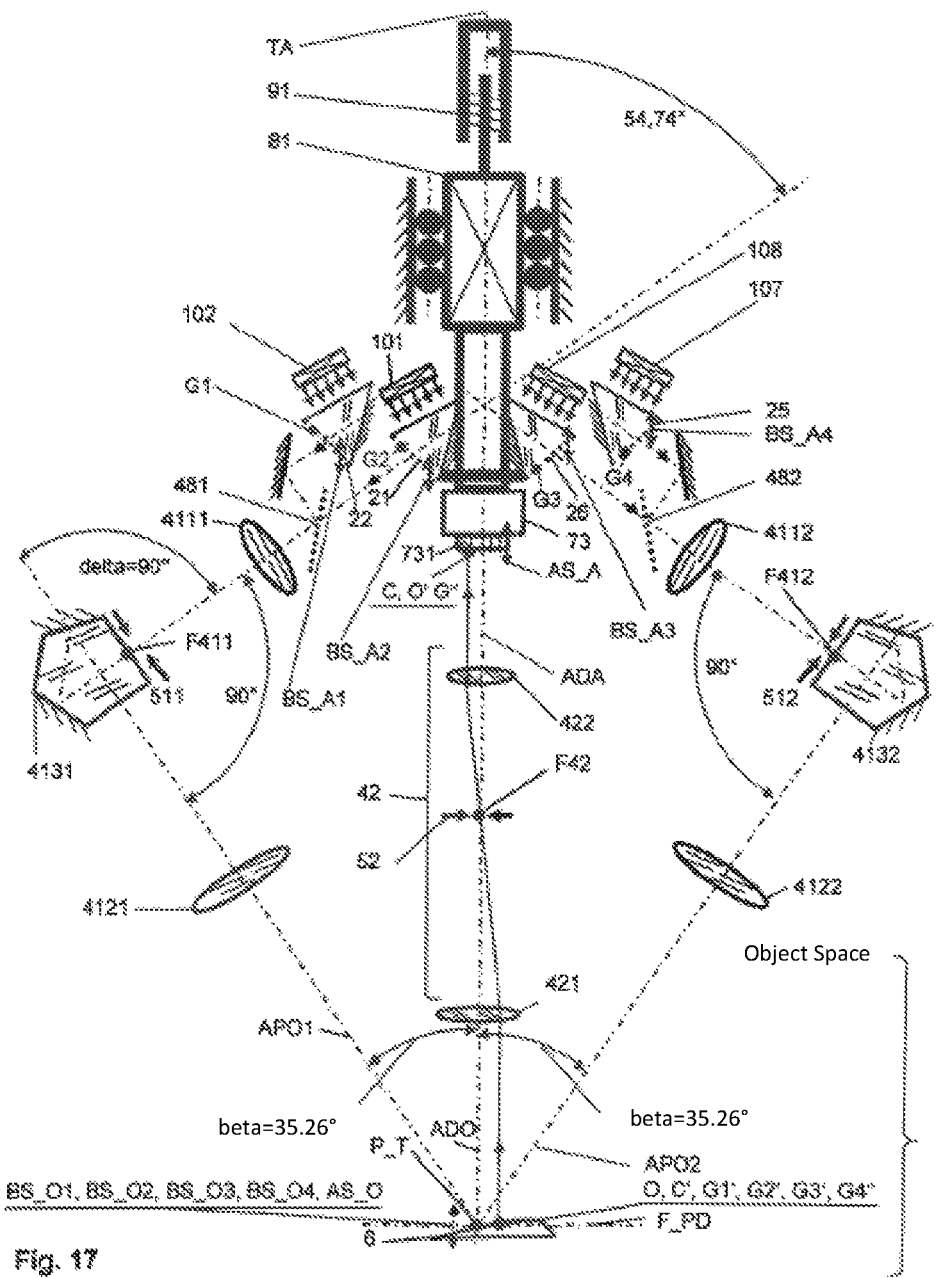
Figure 18:
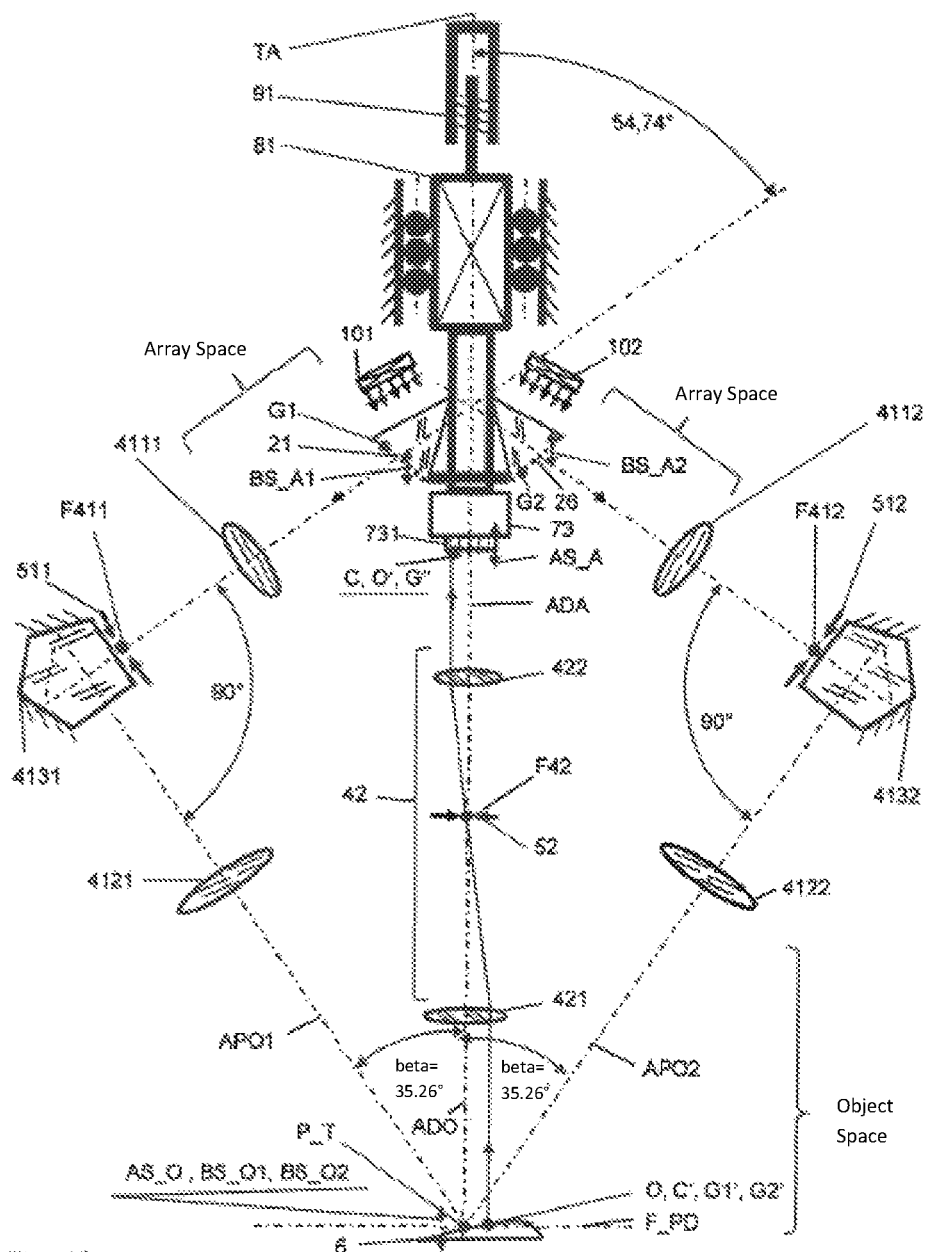
Figure 19:
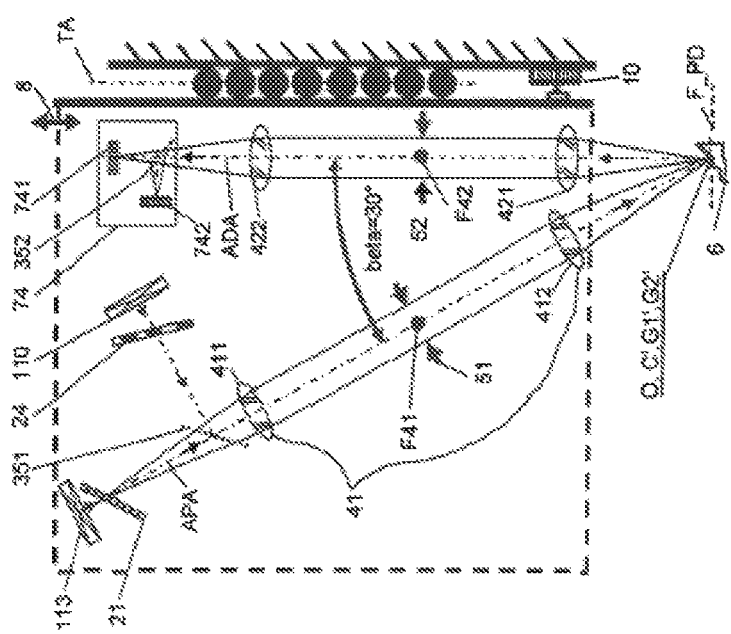

FIG. 8*a* shows an example first wavelet WR1 for a reference measurement point R, belonging to a pixel P that has been recorded with the first linear grating (FIG. 3);

FIG. 8*b* shows an example second wavelet WR2 for a reference measurement point R, belonging to a pixel P that has been recorded with the second linear grating (FIG. 4);

FIG. 8*c* shows the beat frequency of the reference wavelet recorded with the linear gratings from FIGS. 3 and 4;

FIG. 8*d* shows an example first wavelet WO1 for an object measurement point i, belonging to a pixel P_i that has been recorded with the first linear grating (FIG. 3);

FIG. 8*e* shows an example second wavelet WO1 for an object measurement point i, belonging to a pixel P_i that has been recorded with the second linear grating (FIG. 4);

FIG. 9 shows an example triangulation arrangement with a double wavelet approach and an external depth scan;

FIG. 10 shows an example first linear grating with a first grating period p_1_SLM;

FIG. 11 shows an example second linear grating with a second grating period p_2_SLM;

FIG. 12 shows an example arrangement with an external depth scan, in which the colour of the measured object can also be determined;

FIG. 13 shows an example triangulation arrangement with an internal continuous scan;

FIG. 14 shows an example triangulation arrangement based on the arrangement from FIG. 13 with double-sided illumination;

FIG. 15*a* shows an example triangulation arrangement with double-sided illumination;

FIG. 15*b* shows an example triangulation arrangement with double-sided illumination;

FIG. 16*a* to FIG. 16*g* respectively show, by way of example, triangulation arrangements with an internal depth scan with at least two plane mirror surfaces in the projection beam path;

FIG. 17 and FIG. 18 respectively show, by way of example, triangulation arrangements with an internal depth scan with at least two plane mirror surfaces in the projection beam path;

FIG. 19 shows a triangulation arrangement with an external depth scan with two linear gratings;

FIG. 20 shows the first linear grating that is used in the arrangement from FIG. 19;

FIG. 21 shows the second linear grating that is used in the arrangement from FIG. 19.

Figures 22, 23:
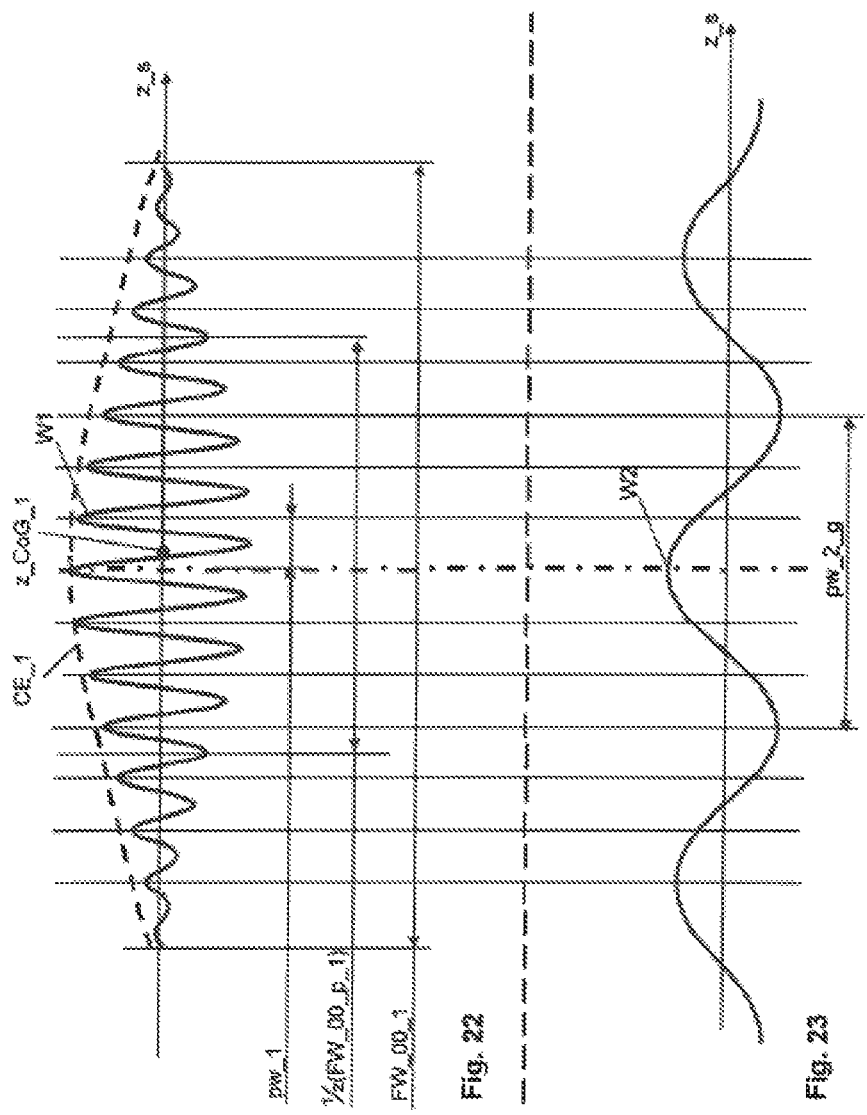
Figure 25:
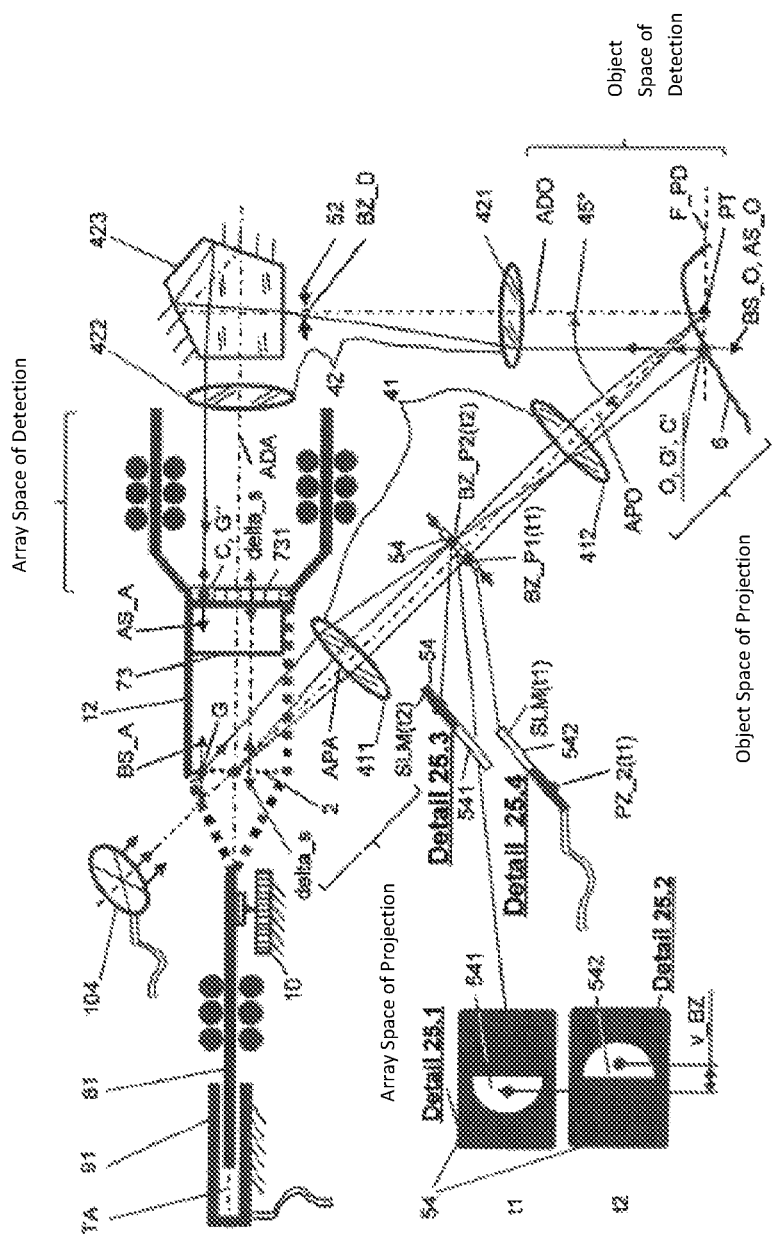
Figure 29:
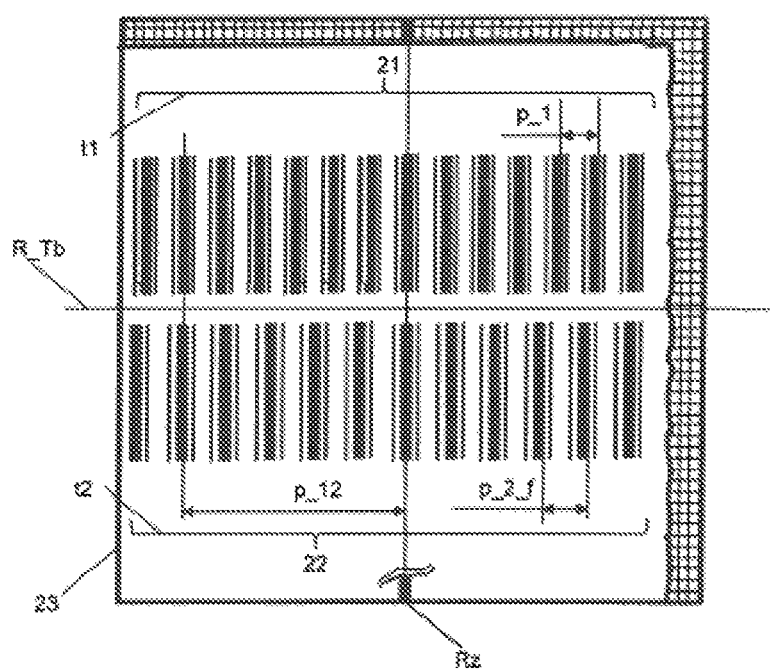
Figure 30:
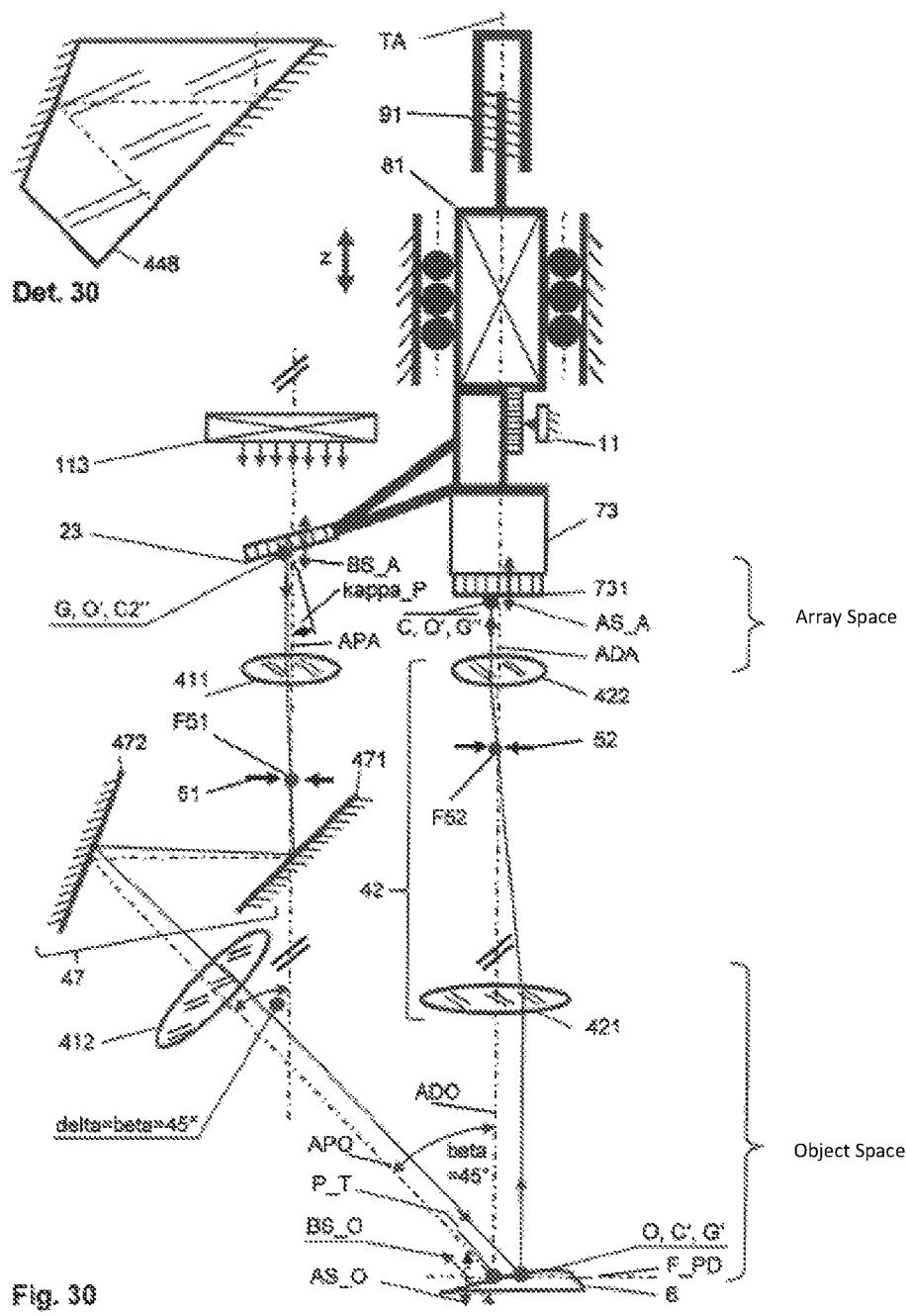
Figure 31:
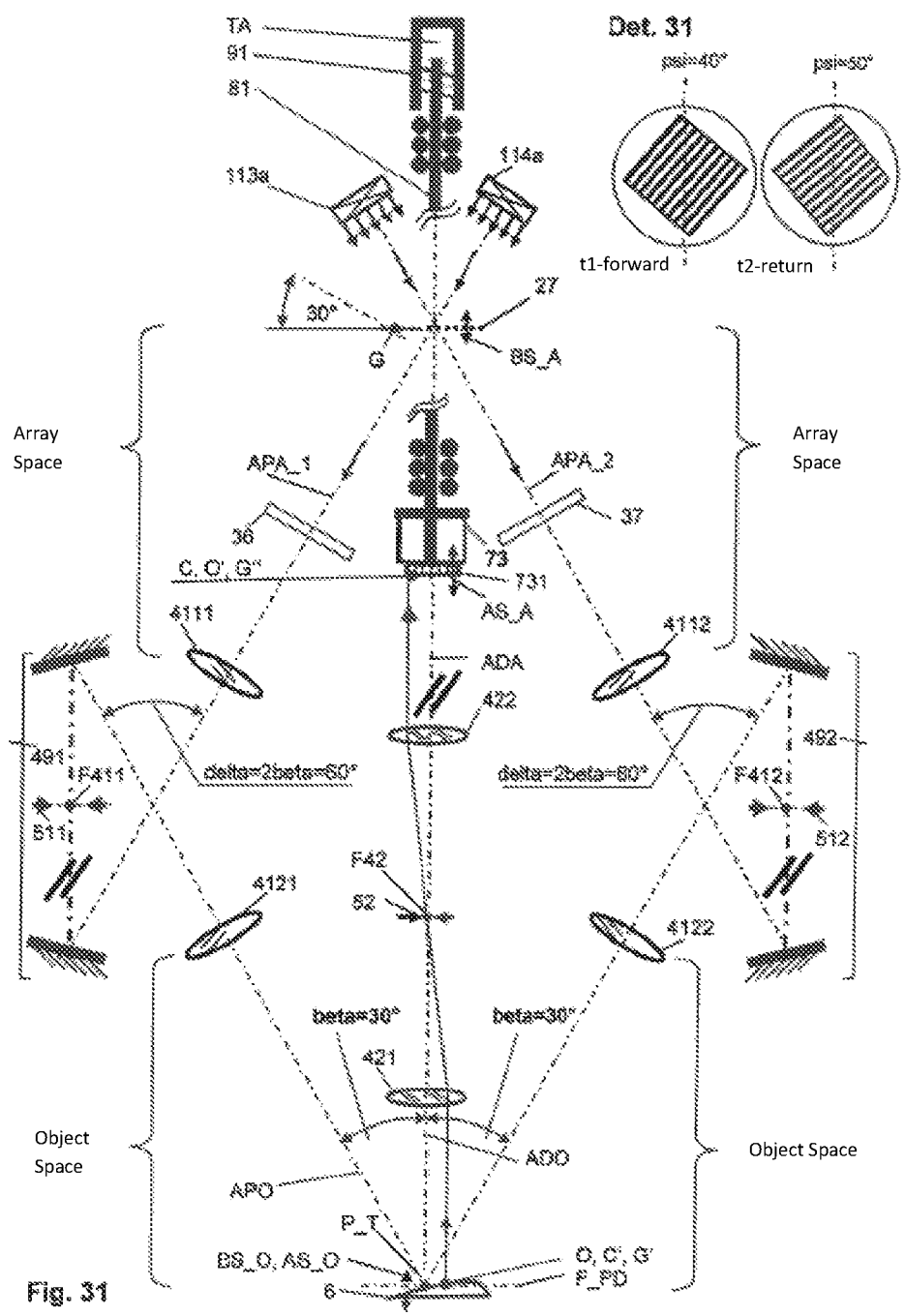
Figure 32:
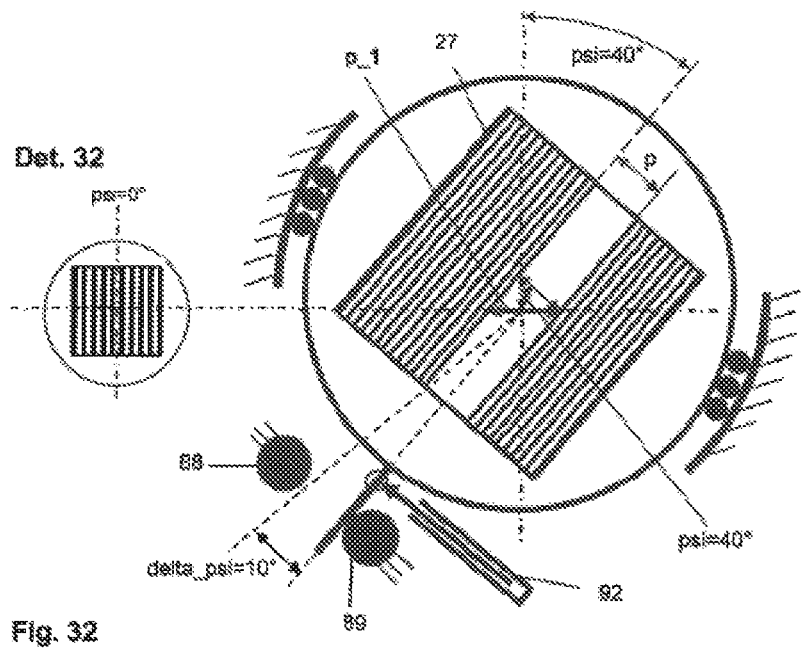
Figure 33:
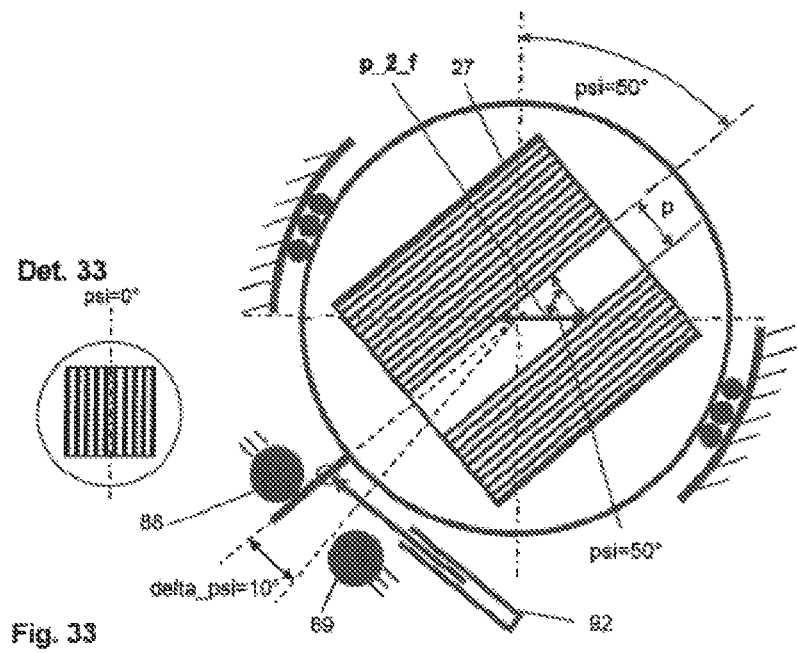

FIG. 22 shows the first wavelet that results from the first linear grating (FIG. 20);

FIG. 23 shows the second wavelet that results from the second linear grating (FIG. 21);

FIG. 24a shows a first wavelet for a reference measurement point R, belonging to a pixel P that has been recorded with the first linear grating (FIG. 20);

FIG. 24b shows a second wavelet for a reference measurement point R, belonging to a pixel P that has been recorded with the second linear grating (FIG. 21);

FIG. 24c shows an example first wavelet for an object measurement point i, belonging to a pixel P_i that has been recorded with the first linear grating (FIG. 20);

FIG. 24d shows an example second wavelet WO1 for an object measurement point i, belonging to a pixel P_i that has been recorded with the second linear grating (FIG. 21);

FIG. 25 shows an example triangulation arrangement with an internal scan arrangement with a controllable aperture arranged in the aperture plane;

FIG. 26 shows a first wavelet W1_SLM that results from a first position of the aperture opening in FIG. 25;

FIG. 27 shows a second wavelet W2 SLM that results from a second position of the aperture opening in FIG. 25;

FIG. 28 shows an example triangulation arrangement with an internal depth scan, that is conducted "on the fly";

FIG. 29 shows example linear grating structures;

FIG. 30 shows an example triangulation arrangement with an internal depth scan with a rotating linear grating;

FIG. 31 shows an example triangulation arrangement with an internal depth scan with a rotating linear grating;

FIG. 32 shows a first rotational position of the rotating linear grating in FIGS. 30 and 31; and FIG. 33 shows a second rotational position of the rotating linear grating in FIGS. 30 and 31.

It is a fact generally known to a person skilled in the art that, with a comparably large number n_FW_00 of periods among the contrast envelopes with their full width FW_00 of a wavelet signal, for example n_FW_00=20 to 25, on real measured objects, frequently an incorrect period (strip period) is identified. That is the case mostly above a triangulation angle of 30° to 60°. However, this depends on the maximum digital aperture of projection and detection lens NA_max in the optical system. So then the multiply observable 2Pi and sometimes also 4Pi and rather rarely even 6Pi jumps occur in the phase map.

The number of periods n_FW_00 produced below the full width of the contrast envelopes—calculated from the first zero point left to the first zero point right—when using a triangulation measurement arrangement with depth measurement direction parallel to the axis of deflection may be estimated with the equation (1)

$$n\_FW\_00 \approx 1.22 \cdot [\tan(beta\_P) + \tan(beta\_D)]/NA\_max \quad (1)$$

at least approximately well for triangulation angles beta_P and beta_D respectively as less than/equal to 45°. In equation (1) beta_P is the triangulation angle of projection and beta_D the triangulation angle of detection. In so doing, the partial angle of triangulation beta_P and beta_D are always determined between the main beam and normals of the focal plane. The digital aperture NA_max represents the maximum digital aperture of illumination or of detection in the object space of the triangulation measurement arrangement. This preferably relates to measurement arrangements in which the entire triangulation angle (beta_P+beta_D) does not considerably exceed 90° as for deep-shaped objects, the problem of unwanted shading is then also relevant. In so doing it is to be noted that only the digital aperture NA of the beam path is considered in the approximate estimate of the number of periods n_FW_00, where a depth scan also occurs. Only the effective pupil illumination in the sense of an apodisation may appreciably affect the results of the estimate.

For focus-varying or focus-scanning triangulation with structured illumination with generation of a wavelet signal, particularly also for the 3D shape measurement in the macroscopic range it is known, that with a number of periods n_FW_00 over the full range of the contrast envelope of a wavelet signal with n_FW_00=25 with such a measurement arrangement at particular problem zones such as corners with greyscale changes, extremely rarely, 8Pi jumps in the phase map may also occur (see FIG. 2 in [2]). Then with an 8Pi jump the evaluation of the contrast envelope therefore corresponding to 4 period lengths for 25 periods under the contrast envelope is wrong, which corresponds to 0.16 FW_00 in this case, if you assume the nominal width of the contrast envelope. In problem zones, an extension of the contrast envelope may also occur in this case. On the other hand, it is known according to [2] that when measuring very cooperative measured objects, the centre of gravity evaluation of the contrast envelope can still be used even for 25 periods below the full width of the contrast envelope with surprisingly low error for finding out the zero strip order.

Even in extreme cases, therefore, an unambiguity range above the range of width of +/−0.2FW_00 must always be sufficient. Generally, however, an unambiguity range of the width of +/−0.16FW_00 is considered to be sufficient.

In so doing, this preferably relates to continuous depth-scanning triangulation arrangements with generation of a wavelet signal, in which the confocal condition for separate pupil centres for projection light and detected light are maintained. In this case, light is always understood in the sense of electromagnetic radiation from the deep ultraviolet to the terahertz range. This confocal condition is always maintained in principle conditionally for an external depth scan. An external, continuous depth scan means that there is a continuous relative movement between triangulation measurement arrangement and the measured object. In this case, there is one at least approximately common focal plane of projection and detection that will run through in the continuous depth scan from the points of the measured object little by little for deep-formed objects. Inner components of the triangulation measurement arrangement always remain mutually at rest with an external depth scan, so that connected image points in the object space always remain connected, as the relevant components are not combined and also do not move to the triangulation measurement arrangement. However, that is not the case for an internal continuous depth scan, as in this case inner components of the triangulation measurement arrangement such as a linear grating and/or a camera chip also with the depth component—therefore with component in the direction of the main beam or directly in the direction of the main beam—move in relation to the triangulation measurement arrangement. In the context of this application, it always relates to both the triangulation measurement arrangements with an external and internal continuous depth scan. Combinations of both scans are also possible.

Maintaining the confocal conditions is indispensable when using triangulation measurement arrangements with an internal continuous depth scan and signals in wavelet form, if a comparably simple signal output is to result. This maintaining of the confocal condition is therefore also not there a priori, but must be achieved by targeted handling. Maintaining the confocal condition means for the principle with internal depth scan a permanent connection in the sense of an at least approximately optical conjugation of each single image point of the linear grating and of one pixel each back-mapped in the object space—for example by shifting the linear grating along the straight line gA according to DE 198 46 145 A1. Therefore, respectively one image point of the linear grating in the visual beam of a pixel is carried along in the entire depth scan. The optical conjugation of image points must therefore exist for the entire depth range of the depth scan and also for the entire measurement field, therefore for the entire measurement volume. Internal means that, in this case, only inner components of the arrangement are moved in the depth scan. Towards the outside both the arrangement and also the measured object remain at rest.

This optical conjugation, therefore maintaining the confocal condition, is then of great advantage to the measurement, if the paths of image points of the linear grating in the object space always target the centre of the pupil of the mapping optics of the detection system in the object space. Then a pixel in the entire depth scan detects the very same object point. With telecentric mapping of the detection system in the object space and scanning of the linear grating with lateral component, the paths of image points of the linear grating in the object space represent straight lines that are generally at a skew angle to the optical axis of the mapping optics for the projection system. In this case, the known Scheimpflug condition is to be followed. The convergence point K1 of the paths of image points of the linear grating in the object space are then infinite in the case of object-side telecentricity, where also the pupil is located with the pupil centre PZ_D of the detection system. In so doing, depending on the depth movement of the linear grating of the lateral scan, it must happen that the paths from image points of the linear grating in the object space are aligned parallel to the optical axis of the detection system in the object space. When moving the linear grating with telecentricity to the grating side of the projection optics this is along a straight line gA. Only when maintaining the confocal condition may any pixel be allocated a constant and by reference measurement singularly or multiply determinable starting phase in the signal wavelet, which is stored respectively in the long term, so that there is a reference record of reference phases. Other than with the briefly coherent interferometer, also known as a white-light interferometer, where with perfect optics the starting phase for all pixels is zero, the starting phase for a depth-scanning arrangement by means of a linear grating is initially unknown, as this is also produced from the random lateral position of the linear grating in the triangulation arrangement. This starting phase must therefore be determined once by a reference measurement and then stored permanently. For the reference measurement, in so doing, advantageously a highly level and good light-scattering, bright and due to the required mechanical stability also thick plate is used, for example, similar to gypsum or opaque fine ceramics. In this case, this is considered to be optically cooperative. A high mechanical long-term stability of the arrangement then ensures the constancy of the by-pixel singularly-determined starting phases from the reference measurement. These by-pixel known starting phases are then indispensable for the by-pixel determination of the depth position of the measurement points on the object, which thus always relates to a previously conducted reference measurement.

EXAMPLE 1

Example 1 relates to a method for continuous depth-scanning strip triangulation with wavelet signal generation, particularly also for the 3D shape measurement in microscopy and mesoscopy, with a strip triangulation arrangement for structured illumination. The method may be undertaken with the arrangement shown in FIGS. 2 to 12, 13, 14, 15*a*, 15*b*, 17, 19 to 27 and 31 to 33.

There is at least one measured object 6, 61, 62, 63 which is therefore illuminated in a structured way.

The strip triangulation arrangement is formed
arranged with a projection beam path with a front optical device 412, 4121, 4122 allocated to the object space, with an aperture 51,
with a projection beam path separated from the detection beam path,
with at least one rasterised light detector 71, 72, 73 with pixels,
at least one computer system 17 with control and evaluation programs and
with computer-controlled means of movement 8, 81 for continuous depth scan.

In this case, the front optical device 412, 4121, 4122 may be formed as a lens, a mirrored lens, a mirror or as a diffractive-optical element that is arranged in the object space.

For continuous depth scan, either the entire triangulation arrangement is moved in relation to the measured object 6, or there is continuous movement
of components of the strip triangulation arrangement in relation to the measured object 6,
of the measured object 6, 61, 62, 63
or of at least one linear grating 21, 22, 24, 25, 26.

A periodic grating, therefore a linear grating 21, 22, 24, 25, 26, is used. This may be both a Ronchi grating, or even a periodic grating with a cosine square characteristic which is also known as a sine grating.

At least in one of the two beam paths, in the projection beam path for mapping of the linear grating or in the detection beam path for back-mapping the rasterised detector or even in both beam paths, preferably the Scheimpflug condition is met at least approximately.

The continuous depth scan is conducted by
either a continuous relative movement between measured object 6 and the triangulation arrangement,
or a continuous relative movement between the measured object 6 and the focal plane of at least one grating image in the object space,
or a continuous variation of the refractive power in the projection beam path.

The example above preferably relates to arrangements with a number of periods $n\_FW\_00 \geq 6$ under the full width of the contrast mappings, therefore within the first of two zero points $(-1, +1)$, which contain the relationship in equation (1). For a stereo microscope normal in industry, for example, of the company Leica, with two separated pupils in the original size, the number of periods $n\_FW\_00$ is mostly not above five, so that this device class is rather unsuitable.

In the depth scan:
either at least two spatially separated fixed periodic gratings and/or linear gratings 21, 22, 24, 25, 26 in the triangulation arrangement are illuminated with at least one light source 101 to 114 or the linear gratings are self-illuminating. The light from the linear gratings 21, 22, 24, 25, 26 respectively passes the aperture 51 and/or the aperture plane in the projection beam path, through which the object is illuminated in a structured way. For example, due to ray convergence, the light from the separated linear grating converges in the projection beam path. Therefore, there is only one individual projection beam path, as the entire project light passes the same projection beam path with the single front optic allocated to the object space;

Or, it is allocated to a single spatial light modulator 23 or a switchable structured light emitter (e.g. an OLED).

Either there are concurrent different fixed grating periods p_1 and p_2 or sequentially switchable grating periods p_1 and p_2 are generated.

The grating periods p_1 and p_2 comply with both relationships:

$$p\_2 \geq 1.01*p\_1 \text{ and } p\_2 \leq 100*p\_1.$$

For p_2≤1.5*p_1 the grating period p_2 is still considered to be a fine period and the designation p_2_f is used. The beat frequency period p_12 produced by both fine periods p_1 and p_2_f determines the unambiguity range when determining the strip order.

For the relationship p_2≥3*p_1 the grating period p_2 is considered as a coarse period and is designated as p_2_g. This coarse period p_2_g determines the unambiguity range when determining the strip order.

The range 1.5*p_1≤p_2≤3*p_1 is rather less of interest for the technical and economical usage of the measuring method. Therefore, the beat frequency grating period is preferably at least 3 fine grating periods p_1. If the second grating period is selected as a coarse grating period, p_2_g, this is preferably at least 3-times the fine grating period p_1.

In so doing, the linear grating(s) 21, 22, 24, 25, 26 that represent gratings with fixed grating periods is/are:

either illuminated alternately in time or the linear gratings are self-illuminating, also with fixed grating period, and illuminate alternately in time.

Or, the spatial light modulator illuminates and from this grating periods p_1 and p_2 are switched sequentially.

Or the switchable structured light emitter, preferably an OLED, switches grating periods p_1 and p_2 sequentially. This is preferably computer-controlled.

Illuminated linear gratings, self-illuminators, illuminated spatial light modulators or switchable structured light emitters are projected onto the measured object by the same projection beam path. So there is a measured object illuminated in a structured manner with strips and this measured object is detected by using a detection beam path from a rasterised light detector.

The fixed linear gratings may also be illuminated concurrently with light with respectively different colour spectrum. Alternatively, the linear gratings are self-illuminating with respectively different colour spectrum. The linear gratings are projected concurrently onto the measured object by the same projection beam path and so there is a measured object illuminated in colour in a structured manner and this measured object is detected using the detection beam path from a rasterised light detector with at least two colour channels.

The structured illumination is done in the continuous depth scan with at least two different linear gratings through a single projection beam path and a projection optical device. The thus differently structured light consequently reaches the measured object, in all illumination situations, respectively through the same projection optical device.

Generally, for a triangulation measurement arrangement there is only one single projection optical device. However, the arrangement of several projection optical devices in one triangulation measurement system is also possible. Even then, through each individual projection optical device, at least two different light structures are brought in time series onto the measured object or for spectral separation also concurrently in the continuous depth scan produced from the mapping of at least two linear gratings. The linear gratings preferably represent linear gratings. Or, on the other hand, the digital aperture in the arrangement is increased in such a way that it is furthermore represented so that at least for cooperative measured objects an evaluation without 2-Pi jumps is possible.

So, in the continuous depth scan, a sequence of images of the measured object 6 illuminated in a structured manner is recorded.

Either, there is an image stack S in the memory for time-alternating illumination or alternating self-illumination of the two fixed linear gratings or the spatial light modulator—such as, for example, a liquid crystal (LCD) or a digital micro-mirror array (DMD)—or of the switchable, structured light emitter such as, for example, an OLED.

Or, there are two separate image stacks S in the memory when using, for example, two colour channels. These may be obtained from two different camera chips of a two- or three-chip colour camera.

Either with a time alternating illumination or with an alternating self-illumination of the two fixed linear gratings for each pixel of the rasterised light detector, from the image stack S through alternating reading of two different wavelet W1 and W2 in the period are generated with the wavelet periods pw_1 and wavelet periods pw_2. Due to the depth scan, these wavelets W1 and W2 respectively exhibit a contrast envelope CE and these wavelets W1 and W2 may be stored separately in a digital memory.

Or, with a concurrent in time illumination or with a self-illumination of the two linear gratings with light, with respectively different colour spectrum in each of the two colour channels a wavelet is generated. So, the wavelets W1 and W2 with the wavelet periods pw_1 and pw_2 are generated by the depth scan respectively with a contrast envelope CE_1 and CE_2 and these wavelets W1 and W2 are stored separately in a digital memory.

From the wavelets W1 and W2, by means of the evaluation of the centre of gravity, at least one of the contrast envelopes CE_1 and CE_2 and by means of the phase evaluations both the wavelet period pw_1 which provides a phase value (phi_1 modulo 2 Pi), and the phase evaluation of the wavelet period pw_2 which provides a phase value (phi_2 modulo 2 Pi), respectively the depth position (z) of a measured object point is determined by pixel by means of the evaluation program.

In so doing, the depth position is determined by pixel by means of respectively reference phase values (phi_R_1, phi_R_2) of the wavelet periods pw_1 and pw_2 given pixel by pixel. These phase values (phi_R_1 modulo 2 Pi, phi_R_2 modulo 2 Pi) were determined by a previously conducted reference measurement by means of reference measured object by pixel and stored in a data memory.

Now, precisely the depth position for a measurement point of the measured object from the calculated phase values (phi_O_1, phi_O_2 modulo 2 Pi) are calculated by pixel, which at least approximately correspond to both the reference phase value (phi_R_1 modulo 2 Pi) of the wavelet period pw_1 and the phase value (phi_R_2 modulo 2 Pi) of the wavelet period pw_2 in the vicinity of the calculated centre of gravity (CoG_1) of the contrast envelope of the wavelet W1 and/or the calculated centre of gravity (CoG_2) of the contrast envelope of the wavelet W2 from the measurement of the measured object.

The wavelet-based measurement technique particularly provides the possibility, using the shape of the contrast envelope of the wavelet, of being able to get indications of the measurement uncertainty of the measured point. So, for each measurement point, the control of the known nominal half value width of the wavelet of the arrangement or the skew of the wavelet for determined wavelets can be monitored and with significant deviations from the half value width or symmetry of the envelope this measurement can be rejected. Measurements of great uncertainty often exhibit a dip in the contrast envelope or a marked skew, therefore an asymmetry, of the contrast envelope.

EXAMPLE 1-1

In the method for continuous depth-scanning strip triangulation according to Example 1, by selecting the grating periods $p\_1$ and $p\_2$ with $p\_2 < 2*p\_1$, the wavelets W1 and W2 may digitally exhibit a mutual beat frequency with at least one beat frequency period $pw\_12$ that is at least twice as large as the wavelet period $pw\_1$ of the wavelet $W\_1$. In so doing, the beat frequency period $pw\_12$ specifies the unambiguity range EDB.

EXAMPLE 1-2

In the method for continuous depth-scanning strip triangulation according to Example 1, by selecting the grating periods $p\_1$ and $p\_2$ with $p\_2 > 2*p\_1$, the wavelet W2 may also be formed considerable more coarsely that the wavelet W1, wherein the wavelet period $pw\_2$ of the wavelet W2 is at least twice as large as the wavelet period $pw\_1$ of the wavelet $W\_1$. Thus, the beat frequency period $pw\_12$ specifies the unambiguity range EDB.

EXAMPLE 1-3

Preferably, in the method for continuous depth-scanning strip triangulation according to one of Examples 1 to 1-2, the measured object—by means of a telecentric aperture in the projection beam path—is illuminated telecentrically.

EXAMPLE 1-4

Preferably, in the method for continuous depth-scanning strip triangulation according to one of Examples 1 to 1-3, the measured object—by means of a telecentric aperture in the detection beam path—is mapped telecentrically.

EXAMPLE 1-5

Preferably, in the method for continuous depth-scanning strip triangulation according to one of Examples 1 to 1-4 with electronic means, for at least one switchable grating, a variation of the grating period is conducted.

EXAMPLE 2

Example 2 relates to an arrangement for continuous depth-scanning strip triangulation with wavelet signal generation, particularly also for the 3D shape measurement in microscopy and mesoscopy, with a strip triangulation arrangement for structured illumination. Example designs of the arrangement according to Example 2 are in FIGS. 2 to 12, 13, 14, 15a, 15b, 17, 19 to 27 and 31 to 33.

There is at least one measured object 6, 61, 62, 63 which is therefore illuminated in a structured way.

The strip triangulation arrangement is formed
  with a projection beam path with an aperture 51,
  with a projection beam path separated from the detection beam path,
  with at least one rasterised light detector 71, 72, 73 with pixels,
  at least one computer system 17 with control and evaluation programs and formed with computer-controlled translation movement means 8, 81 with a translation axis TA to the continuous or at least quasi-continuous depth scan.

For the depth scan, either the entire triangulation arrangement is moved in relation to the measured object, this relates to an external depth scan, or there is the movement
  of components of the triangulation arrangement in relation to the measured object,
  or of the measured object
  or of at least one linear grating.

The latter, for example, represents an internal depth scan. The continuous depth scan is conducted by
  either a continuous relative movement between measured object and the triangulation arrangement
  or a continuous relative movement between the measured object and the focal plane of at least one grating image in the object space
  or a continuous variation of the refractive power in the projection beam path.

In the continuous depth-scanning triangulation arrangement, at least two spatially-separate linear gratings 21, 22, 24, 25, 26 with different grating periods $p\_1$ and $p\_2$ are arranged, that are illuminated with at least one light source or they are arranged as self-illuminating. These are then preferably formed as OLEDs.

These spatially-separated linear gratings are formed with grating periods $p\_1$ and $p\_2$, therefore represent linear gratings that comply with both relationships $$p\_2 \geq 1.01 * p\_1 \text{ and } p\_2 \leq 100 * p\_1$$

The aperture 51 of the projection beam path is always arranged after both linear gratings. The light coming from both linear gratings therefore always passes the same aperture and the same projection beam path. So, for each linear grating, the triangulation angle is as least approximately equal and therefore the illumination behaviour for the measured object is also very similar.

EXAMPLE 2-1

Preferably, in the arrangement for continuous depth-scanning strip triangulation according to Example 2, the optical axis of the projection beam path in the array space (APA) is arranged significantly inclined to the optical axis of the detection beam path in the array space (ADA).

EXAMPLE 2b

Furthermore, preferably in the arrangement of the continuous depth-scanning strip triangulation according to Example 2 or 2-1, the optical axis of the detection beam path in the object space (ADO) is arranged parallel to the translation axis TA. Thus, in the scan, one pixel of the rasterised detector is respectively allocated to one measurement point of the measured object—at least in the case of telecentric mapping of the measured object—through the mapping beam at least approximately fixed. On the other hand, in the continuous internal depth scan—in the case of significant mutual inclination of the optical axes APA and ADA—the phase in each pixel of the rasterised detector also changes continuously. In the external, continuous depth scan—in the case of significant mutual inclination of the optical axes APO and ADO in the object space—the phase in each pixel of the rasterised detector also changes continuously.

EXAMPLE 2-3

Furthermore, in the arrangement for continuous depth-scanning strip triangulation according to one of Examples 2 to 2-2 in the projection beam path, a telecentric lens is arranged on the side of the array space. Therefore, with an internal scan, the phase change in the scan on the rasterised detector for all pixels, the image points of which are allocated to the measured object, is at least approximately of the same amount.

EXAMPLE 2-4

Furthermore, in the arrangement for continuous depth-scanning strip triangulation according to one of Examples 2 to 2-2 in the projection beam path, a telecentric lens is preferably arranged on both sides.

EXAMPLE 2-5

Furthermore, in the arrangement for continuous depth-scanning strip triangulation according to one of Examples 2 to 2-4 in the detection beam path, a telecentric lens is preferably arranged on the side of the array space.

EXAMPLE 2-6

Furthermore, in the arrangement for continuous depth-scanning strip triangulation according to one of Examples 2 to 2-5 in the detection beam path, a telecentric lens is preferably arranged on both sides.

EXAMPLE 2-7

Furthermore, in the arrangement for continuous depth-scanning strip triangulation according to one of Examples 2 to 2-6 preferably at least one grating is formed as a spatial light modulator In so doing, two different grating structures can be switched. This can be done by directly swapping them. On the other hand, particularly if it concerns rather slow light modulators compared with the rasterised detector, the first linear grating may be entered with the fine period when the scan is running forwards and the second linear grating with a somewhat coarser period when the scan is returning. This approach provides two separate image stacks with separated wavelets that have been recorded at somewhat different times. However, that has the precondition of a certain constancy of the measurement conditions and the stability of the measurement arrangement.

EXAMPLE 3

Example 3 relates to a further example method for continuous depth-scanning strip triangulation with wavelet signal generation, particularly also for the 3D form measurement in microscopy and mesoscopy, with a strip triangulation arrangement for structured illumination. The method may be undertaken in the arrangement shown in FIGS. 25 to 27.

There is at least one measured object 6, 61, 62, 63 which is therefore illuminated in a structured way.

The strip triangulation arrangement is formed with a projection beam path with an aperture 51, with a detection beam path separated from the projection beam path, with at least one rasterised light detector 71, 72, 73, 74, 75 with pixels, at least with a computer system 17 with control and evaluation programs and with computer-controlled means of movement 8, 81 to the depth scan.

For the continuous depth scan, either the entire triangulation arrangement is moved in relation to the measured object, or there is continuous movement
- of components of the strip triangulation arrangement in relation to the measured object,
- or of the measured object
- or of at least one linear grating 2, which is a fixed periodical linear grating.

The continuous depth scan is conducted by
- either a continuous relative movement between measured object and the triangulation arrangement
- or a continuous relative movement between the measured object and the focal plane of at least one grating image in the object space
- or a continuous variation of the refractive power in the projection beam path.

In the continuous depth scan, the fixed periodical grating 2 with a period p, preferably a fine linear grating, is illuminated with at least one light source, preferably by means of LED illumination. Or, this linear grating 2 is self-illuminating. Preferably, this linear grating may be formed as a spatial light modulator.

In the aperture plane of the projection beam path and/or the detection beam path are either a spatial light modulator (SLM) or a laterally mechanically shiftably-controlled aperture or a laterally-controlled fluid aperture arranged as a controllable aperture which—in relation to the optical axis of the relevant mapping beam path—is alternately released in a preset controlled manner laterally to different regions of the aperture opening by light transmission or light reflection. So, the effective triangulation angle of the strip triangulation arrangement is somewhat changed in a preset controlled manner, so that sequentially at least two different effective triangulation angles beta_1 and beta_2 exist in the strip triangulation arrangement, which complies with both relationships $$\text{beta\_2} \geq 1.01 * \text{beta\_1} \text{ and } \text{beta\_2} \leq 1.25 * \text{beta\_1}$$

In this case, therefore, the geometric centre of gravity of the aperture opening or even the photometric centre of gravity of the aperture opening varies. Thus the location of the effective aperture centre of the triangulation arrangement and therefore also the effective triangulation angle change. A variation of the centre of gravity of the aperture opening also affects the triangulation wavelength which exhibits a direct effect on the wavelet period of the wavelet. This is preferably done after each individual image recording of the measured object by means of rasterised detector.

If the spatial light modulator or a controllable aperture of any kind whatsoever with lateral shift or a component with lateral shift of the centre of the aperture or the photometric centre of gravity is arranged in the aperture plane of the detection beam path, this leads to a thoroughly advantageous side-effect. In other words, to the effect that the digital aperture of the detection beam path is smaller than the digital aperture of the projection beam path respectively in the object space. In so doing, in the scan, the image point wash-out when recording the image is limited. That is advantageous for finely-structured objects or for objects with a light-dark transition on the surface, e.g. in the form of a black-and-white pattern printed onto the surface of an object. Fundamentally there are two options for controlling the aperture: In a first case, the centre of gravity of the aperture opening always lies in a first state on the optical axis of the detection beam path, and in a second state, the aperture opening is uncentred, or in a second case, both centres of gravity of the aperture opening are uncentred at the same distance to the optical axis of the detection beam path. This approach with the controlled aperture opening for variation of the effective triangulation wavelength is particularly suitable for rather cooperative objects without a marked fine structure and with uniform light scattering, therefore for measuring the deviation from the plane and the target shape of objects with rather small surface gradients.

So, a measured object illuminated in a structured manner exists by using two triangulation wavelengths when using only one single projection beam path, if the mapping components define the same as the projection beam path. The measured object is detected using the detection beam path of a rasterised light detector and in the depth scan a sequence of images of the measured object illuminated in a structured way is recorded. So, wavelets with different wavelet periods can be generated.

So, in the depth scan, an image stack in the memory is recorded when the aperture opens alternating in time, and from the image stack, by alternating reading of two wavelets differing by period, W1 and W2 with the wavelet periods pw_1 and pw_2 are generated, and thus wavelet W1 corresponds to the effective triangulation angle beta_1 and wavelet W2 to the effective triangulation angle beta_2. Due to the continuous depth scan, these wavelets W1 and W2 respectively exhibit a contrast envelope and these wavelets W1 and W2 may be stored separately in a digital memory.

From the wavelets W1 and W2, by means of the evaluation of the centre of gravity, at least one of the contrast envelopes (CE_1, CE_2) and by means of the phase evaluations both the wavelet period pw_1 which provides a phase value (phi_O_1 modulo 2 Pi), and the phase evaluation of the wavelet period pw_2 which provides a phase value (phi_O_2 modulo 2 Pi), respectively the depth position z_O of a measured object point is determined by pixel by means of the evaluation program.

In so doing, the depth position is determined by pixel respectively by means of reference phase values (phi_R_1, phi_R_2) of the wavelet periods pw_1 and wavelet period pw_2 given by pixel. These phase values (phi_R_1 modulo 2 Pi, phi_R_2 modulo 2 Pi) were determined by a previously conducted reference measurement by means of reference measured object by pixel and stored in a data memory.

The depth position for the measured object is calculated by pixel from the calculated phase values (phi_O_1, phi_O_2 modulo 2 Pi) by pixel, and indeed precisely the depth position, which at least approximately corresponds to both the reference phase value (phi_R_1 modulo 2 Pi) of the wavelet period pw_1 and the phase value (phi_R_2 modulo 2 Pi) of the wavelet period pw_2 in the vicinity of the calculated centre of gravity (CoG_1) of the contrast envelope of the wavelet W1 and/or the calculated centre of gravity (CoG_2) of the contrast envelope of the wavelet W2 from the measurement of the measured object.

In the method for continuous depth-scanning strip triangulation, the spatial light modulator (SLM) is preferably arranged as a telecentric aperture in the projection beam path.

This spatial light modulator (SLM) is preferably formed as a ferro-electric light crystal. These work particularly rapidly, for example, also with switch frequencies in the kilohertz range.

EXAMPLE 3-1

Furthermore, preferably in the method for continuous depth-scanning strip triangulation according to Example 3, a telecentric aperture is arranged in the detection beam path.

EXAMPLE 3-2

Furthermore, preferably in the method for continuous depth-scanning strip triangulation according to Example 3, the spatial light modulator (SLM) is arranged as a telecentric aperture in the detection beam path.

EXAMPLE 3-3

Furthermore, preferably in the method for continuous depth-scanning strip triangulation according to one of Examples 3 to 3-2, a telecentric aperture is arranged in the projection beam path.

EXAMPLE 4

Example 4 relates to a method for depth-scanning strip triangulation with structured illumination, particularly also for 3D shape measurement in microscopy and mesoscopy with a strip triangulation arrangement for structured illumination of at least one measured object 6, 61, 62, 63 with a fixed linear grating. The method is based on the approach described in DE 41 34 546 A1 and DE 43 34 546 C2. The method may be undertaken in the arrangements shown in FIGS. 31 to 33. The wavelets that arise are shown in FIGS. 5 to 7 and 8*a* to 8*e*.

The strip triangulation arrangement for structured illumination of at least one measured object with a fixed linear grating 27 comprises:

a projection beam path with an aperture 51,
a detection beam path with an aperture 52 separated from the projection beam path,
at least one rasterised light detector 73 with pixels;
at least one computer system 17 with control and evaluation programs; and computer-controlled means of movement for the continuous depth scan
either of the entire strip triangulation arrangement in relation to the measured object,
or of components of the strip triangulation arrangement in relation to the measured object,
or of the measured object
or of the fixed linear grating.

The continuous depth scan is conducted by
either a continuous relative movement between measured object and the strip triangulation arrangement
or a continuous relative movement between the measured object and the focal plane of at least one grating image in the object space
or a continuous variation of the refractive power in the projection beam path is conducted.

In the continuous depth scan, the fixed linear grating 27 with a period p is illuminated with at least one light source or this linear grating is self-illuminated. This linear grating is twisted from the normal position in relation to the triangulation base about the angle psi, which is from 10 A° to 80° and computer-controlled rotation means 92 are allocated to this fixed linear grating.

So, the effective grating period p_eff of the strip triangulation arrangement is in a preset manner controlled by a rotational movement at least somewhat changeable and thus there are two different grating periods p_eff sequentially in time in the strip triangulation arrangement which comply with both relationships $$p\_eff\_2 \geq 1.01 * p\_eff\_1 \text{ and } p\_eff\_2 \leq 10 * p\_eff\_1$$

So, there is a measured object illuminated in a structured way and this measured object is detected using the detection beam path of a rasterised light detector 73 and in the continuous depth scan a sequence of images of the measured object illuminated in a structured way is recorded. So, an image stack is recorded in a first rotational position and from the image stack, by reading the rasterised detector a wavelet W1 of the wavelet period pw_1 is generated, wherein wavelet W1 corresponds to p_eff_1.

For each rotational position of the linear grating 27—preferably two rotational positions—an image stack is recorded and from the image stacks, one wavelet W1 and W2 each is generated with the wavelet period pw_1 and pw_2.

If the measurement is to be conducted rapidly, for example, with a 100 Hz camera, it is difficult to undertake a rotational movement for the linear grating between each camera image recording. So, preferably, when the continuous depth scan is running forwards, the recording of image data is done for a first wavelet for each pixel of the rasterised detector, wherein the linear grating is located in a first rotational position. After the first continuous depth scan, the linear grating is rotated and the continuous depth scan is run in reverse, so that a second wavelet can be generated for each pixel from the recorded second image stack.

Preferably only precisely two rotational positions of a linear grating are used, as in the approach with wavelet generation by depth scan, no discrete phase shift must occur on the linear grating, as wavelets are indeed generated in the depth scan, which supply the necessary phase information.

Particularly in this case, one linear grating with the grating period p is used, that is rotated significantly from the normal position, in other words 90° to the triangulation base, about the angle of rotation psi, for example, clockwise. So, for the first rotational position of the linear grating, a first rotation angle of, for example psi_1 equal to 40° is produced. So, the effective grating period is increased by 1/cos 40° compared with normal position on p_1=p/cos 40°. With this linear grating, a first depth scan is performed and a first image stack is recorded, from which the wavelet W1 is produced for each pixel. After this depth scan, the linear grating is turned somewhat further (for example and angle of size 10°), so that a second angle alpha_2 is then set at 50° compared with the normal position. Thus, another effective period of the linear grating is produced, that is then $$p\_2\_f = p / \cos 50°$$

So, a first fine grating period p_1 and then a second grating period p_2_f can be generated and the method described above can be applied, by then conducting a second depth scan with the position of the rotating linear grating of psi=50°, preferably as the scan is returning, and a second image stack is recorded from which for each pixel the wavelet W2 is produced that is then somewhat extended in comparison with the first wavelet W1 in this described case. It is advantageous if the combinations are used in which the quotient $$\cos(psi\_1)/\cos(psi\_2)$$

moves between 1.1 to 1.5. A quotient in the range of 1.15 to 1.33 represents an optimum in this case. This means that the first effective grating period p_1 represents the smaller of both grating periods always in this case.

EXAMPLE 4-1

Both positions with the angles of rotation psi_1 and psi_2 can be achieved highly precisely by mechanical stops with magnetic force in the direction of a bistable, robust mechanical construction supported such that it can rotate—at least in the part of the region of the full circle. The mechanical stops for each rotational position may be highly-precise, robust mechanical stops. The rotary adjuster may, therefore, be imprecise in its adjustment movement, but must have as much clearance so that the highly-precise achievement of the stop position is not prevented. The stop may preferably be secured by magnetic force. The rotary adjuster must then work somewhat against the magnetic force when starting.

This construction supported such that it can rotate includes, for example, a controllable drive on which no accuracy requirements must be set, as this only somewhat loosely undertakes the rotation as quickly as possible. Putting into the final position is done by means of magnetic force. Both angle of rotation positions must be secured so they can be reproduced as precisely as possible for the time between two calibrations.

EXAMPLE 5

Basically, according to the approach of generating two wavelets, it is also possible to work with two linear gratings with different grating period in a triangulation arrangement with continuous depth scan and to use these linear gratings in two measuring cycles, therefore sequentially to push into the beam path mechanically. So, for the continuous depth scan running forwards measuring can be done with a finer linear grating and returning with a somewhat coarser linear grating, or even with one coarse linear grating—compared with the fine one. The change of linear grating is done after running forwards.

EXAMPLE 6

Example 6 relates to a further arrangement for continuous depth-scanning strip triangulation with internal depth scan with structured illumination and with wavelet signal generation, particularly also for the 3D shape measurement in microscopy and mesoscopy, with a strip triangulation arrangement for structured illumination. Example designs of the arrangement according to Example 6 are shown in FIG. 14, 15*a*, 16*a*, 16*b*, 16*c*, 16*d*, 16*e*, 16*f*, 16*g*, 17, 18, 25. The wavelet signal generation may comprise the generation of one or more wavelets.

There is at least one measured object 6, 61, 62, 63 which is therefore illuminated in a structured way.

The strip triangulation arrangement is formed
    with a projection beam path with an aperture 51,
    with a projection beam path separated from the detection beam path,
    with at least one rasterised light detector, 73 with pixels, at least one computer system 17 with control and evaluation programs and with computer-controlled means of movement 81 for internal continuous depth scan.

In so doing, at least one illuminated linear grating 21, 22, 25, 26 is moved to conduct the depth scan as an internal scan.

At least two plane mirror surfaces 491, 492, 441, 442, 451, 542, 471, 472 are arranged for the purpose of beam deflection in the triangulation arrangement—on the optical path of the linear grating 21, 22, 25, 26 to the measured object 6, 61, 62, 63 and from the measured object to the rasterised detector 73—and the difference of the number of reflections on the plane mirror surfaces in the projection and in the detection beam path is zero or an even number.

In this case, the number of reflections in the inner beam path (beam path between object and linear grating, or between the object and rasterised detector) may be one both in the projection and in the detection beam path. Furthermore, the number of reflections may also be, however, two, both in the projection and in the detection beam path. Preferably, the number of reflections in the projection beam path is two and in the detection beam path zero, as then for a detection beam path, there is a known simple straight line construction.

The computer-controlled means of movement are formed by means of translation sled 81 that carries both the rasterised light detector 73 and at least one illuminated linear grating 21.

Therefore, the rasterised light detector 73 and at least one illuminated linear grating 21 are connected rigidly to the translation sled 81.

Preferably, in this case, the triangulation angle is 45° and the projection beam path and the detection beam path are preferably formed by means of telecentric mapping stages on both sides.

In so doing, the movement path of the linear grating for telecentricity in the object space is formed in such a way that its image in the object space is parallel to the movement path of the rasterised detector, the mapping in the object space of which is also done telecentrically. To establish a movement path, it is sufficient to consider an element of the linear grating or a pixel of the rasterised detector. Preferably the movement path of the rasterised detector is aligned parallel to the optical axis of the detection lens and the focal surfaces for the linear grating image and the reflected detector image coincide in the object space. This allows the detection of an object point by the same pixel in the depth scan.

This triangulation arrangement thus formed now exhibits, compared with guidance errors transverse to the direction of translation of the translation sled, an insensitivity compared with the phase to the axially perpendicular object regions, as the image of a grating element and a pixel image move in the same direction. However, it is to be noted that for guidance errors transverse to the direction of translation, the pixel images assume a different lateral position on the measured object. Nevertheless, where there are large gradients of the measured object, this leads to considerable measurement errors. In this case, from the pixel a somewhat different height or depth is recorded in the scan due to the undesired lateral movement of the pixel image. Therefore, the arrangement of an angled mirror of an angled mirror prism or a pentaprism makes sense for deflecting the beam, as measurement errors where there are guidance errors transverse to the direction of translation tend to be smaller.

EXAMPLE 6-1

Preferably, in the arrangement for depth-scanning strip triangulation according to Example 6 an angled mirror 491, 492, 44, 45, 47 or an angled-mirror prism 448, 458, 413 433, 423, 4131, 4132 for beam deflection is arranged in the projection or deflection beam path. So, in each case in the detection beam path, there are two reflections on the plane mirror surfaces and in the projection beam path there are no or also two reflections on the plane mirror surfaces.

EXAMPLE 6-2

Preferably, the angled-mirror prism is formed as a pentaprism 413, 423, 4131, 4132 or the angled mirror as a 45°-angled mirror in air 44, 45, 472, by which a 90° beam deflection is produced.

EXAMPLE 6-3

Preferably in the arrangement for depth-scanning strip triangulation according to one of Examples 6 to 6-2 the triangulation angle is 45° and the projection beam path and the detection beam path are preferably formed by means of telecentric mapping stages on both sides. The mapping scale factor of both mapping stages is 1.

Furthermore, there is preferably precisely one reflection with beam deflection in the projection and precisely one in the detection beam path. To do this, respectively each one plane mirror surface 417 in the projection beam path and precisely one plane mirror surface in the detection beam path are arranged.

EXAMPLE 6-4

Furthermore, in the arrangement for depth-scanning strip triangulation according to one of Examples 6 to 6-3, the triangulation angle beta_P is preferably 45° and the planes of both linear gratings and the plane of the rasterised detector are aligned mutually parallel and the translation axis TA is arranged perpendicular to the plane of the rasterised detector. Therefore, the main detection beam and translation axis TA are aligned in parallel. The main projection beam and the translation axis are aligned mutually 45° and no or two reflections occur in the projection beam path—considered from the linear grating to the measured object—and precisely two reflections occur in the detection beam path—considered from the measured object to the rasterised detector. In so doing, the optical axis (ADO) of the detection beam path is preferably perpendicular to the coinciding focal plane of the projection and the detection beam path (F_PD) object space. Variants of this illustrative example are shown in FIGS. 13, 14 and 25.

EXAMPLE 6-5

Preferably, in the strip triangulation arrangement according to one of Examples 6 to 6-4 in the projection beam path or in the detection beam path, the telecentric aperture is preferably formed as a controllable spatial light modulator, preferably as a liquid crystal display (LCD).

EXAMPLE 6-6

Furthermore, in the strip triangulation arrangement according to one of Examples 6 to 6-5, the controllable spatial light modulator is preferably formed as a ferroelectric liquid crystal that may displace the centre of the aperture opening laterally in the kilohertz range. So, the effective triangulation wavelength between the recordings of individual camera images may be changed spasmodically and so an image stack is generated from which two mutually nested wavelets with different periods can be generated, such as, for example, shown in FIG. 25.

EXAMPLES 7-x

To solve the special task that only one individual translation system is arranged for the projection beam path and also the detection beam path and the focal planes in the entire depth scan remain in coincidence, therefore always coincide, the arrangements according to the following Examples 7-x) are proposed. Preferably these arrangements may be used in a method with continuous depth scan. But also with a method with an incremental depth scan, these arrangements are to be used advantageously. Furthermore, these arrangements (R1 and R2 and R5) may also be used advantageously in a method with wavelet generation. In so doing, one or more wavelets may be generated.

EXAMPLE 7-1

The Example 7-1 relates to an arrangement for continuous depth-scanning strip triangulation with wavelet signal generation for three-dimensional recording of an object with an internal depth scan. Example designs of the arrangement according to Example 7-1 are shown in FIGS. 13, 14, 15*a*, 15*b*, 16*a*, 16*c*, 16*d*, 16*e*, 16*f* and 31.
The arrangement is:
with at least one projection beam path and
with at least one detection beam path separated from the projection beam path, between which there is the triangulation angle beta and at least one linear grating and
at least one linear grating and
at least one rasterised detector and
a computer-controlled translation system allocated to the linear grating and the rasterised detector.

There are at least two plane mirror surfaces in the form of an angled mirror arrangement 491, 492 arranged in the projection beam path and the overall diffraction angle delta of the angled mirror arrangement 491, 492 in the projection beam path—considered from the linear grating to the measured object—exhibits an angle of double the size of the triangulation angle beta and both the at least one linear grating and also the at least one rasterised detector are allocated rigidly to the translation system for the purpose of the depth scan. Both the projection beam path and the detection beam path exhibit the mapping scale factor one.

EXAMPLE 7-2

Example 7-2 relates to an arrangement for continuous depth-scanning strip triangulation with wavelet signal generation for three-dimensional recording of an object with an internal depth scan. Example designs of the arrangement according to Example 7-2 are shown in FIGS. 17 and 18.
The arrangement is built up as follows:
with at least one projection beam path, and
with at least one detection beam path separated from the projection beam path, between which there is the triangulation angle beta and at least one linear grating, and
at least one linear grating 21, and
at least one rasterised detector 71, 73, and
a computer-controlled translation system 81 allocated to the linear grating 21 and the rasterised detector 71, 73.

At least two plane mirror surfaces in the shape of a 90° angled mirror or pentaprism 4131, 4132 are arranged in the projection beam path. The mapping scale of the object space to the array space is selected equal to the square of the tangent of the triangulation angle beta_P and both the at least one linear grating and at least the rasterised detector are allocated rigidly to the translation system for the purpose of the depth scan.

EXAMPLE 7-3

Preferably, for the arrangements according to Example 7-1 and Example 7-2, two projection beam paths are arranged for continuous depth-scanning strip triangulation.

EXAMPLE 7-4

Preferably, for the arrangements according to one of Examples 7-1 to 7-3, both projection beam paths are arranged symmetrically to the optical axis of the detection beam path.

EXAMPLE 7-5

Example 7-5 relates to a further arrangement for continuous depth-scanning strip triangulation for three-dimensional recording of an object with an internal depth scan. Example designs of the arrangement according to Example 7-5 are shown in FIGS. 16*e*, 16*f* and 16*g*.
The arrangement is built up as follows:
with at least one projection beam path and
with at least one detection beam path separated from the projection beam path, between which there is the triangulation angle beta and at least one linear grating and
at least one linear grating 21 and
at least one rasterised detector 71, 73 and
a computer-controlled translation system allocated to the linear grating and the rasterised detector.

At least two plane mirror surfaces are arranged in the detection beam path in the form of an angled mirror arrangement 491 and the overall diffraction angle delta of the angled mirror arrangement in the detection beam path exhibits an angle of the double the size of the triangulation angle beta and the translation axis TA represents the angle bisector to the optical axis of the projection beam path on the linear grating (APA) and to the optical axis of the detection beam path on the rasterised detector (ADA). Both the at least one linear grating and also the at least the one rasterised detector are allocated rigidly to the translation system 81 for the purpose of the depth scan. The mapping scale factor of projection beam path and detection beam path exhibits the amount unequal to or equal to one.

In this case, there is preferably a digital pixel tracking in the image evaluation, so that there is a virtual pixel, as the image moves laterally over the rasterised detector in the depth scan. In so doing, the image recording is made so that an image is recorded if the image has moved precisely one pixel pitch or exactly several pixel pitches.

EXAMPLE 7-6

Furthermore, in the arrangement for continuous depth-scanning strip triangulation according to one of Examples 7-1 to 7-5, the difference of the plane mirror surfaces between the projection beam path and detection beam path—considered from linear grating 21 to measured object 6, 61, 62, 63 and from measured object 6, 61, 62, 63 to the rasterised detector—is zero or even-numbered, wherein at least two plane mirror surfaces are arranged in the inside of the beam path. Preferably, even in this case, the approach with generation of a wavelet signal can be used.

In another illustrative example of the arrangement above, the linear grating may also be represented by a spatial light modulator.

EXAMPLE 7-7

Furthermore, in the arrangement for continuous depth-scanning strip triangulation according to one of Examples 7-5 and 7-6, two detection beam paths are arranged.

EXAMPLE 7-8

Furthermore, in the arrangement for continuous depth-scanning strip triangulation according to one of Examples 7-5 and 7-7, both detection beam paths are arranged symmetrical to the optical axis of the projection beam path.

EXAMPLE 7-9

Furthermore, in the above arrangement for continuous depth-scanning strip triangulation according to one of Examples 7-1 to 7-8, both the projection beam path or the project beam paths and the detection beam path or detection beam paths are formed telecentrically on both sides with respectively one telecentric aperture.

EXAMPLE 7-9

Furthermore, in the arrangement above for continuous depth-scanning strip triangulation according to one of Examples 7-1 to 7-9, the linear grating is formed as a spatial light modulator.

Examples 8-x relate to arrangements of the depth-scanning strip triangulation for three-dimensional recording of an object with an internal depth scan. In so doing, the generation of one or more wavelets is not absolutely required, the arrangements may also be generated for depth-scanning strip triangulation for the three-dimensional recording of an object with an internal depth scan without wavelet generation. Example designs of the arrangement according to Examples 8-x are shown in FIGS. 28 and 29 (Example 8-1) and in FIG. 30 (Example 8-2).

EXAMPLE 8-1

Example 8-1 relates to an arrangement for continuous depth-scanning strip triangulation for three-dimensional recording of an object with an internal depth scan comprising:
  at least one projection beam path that is formed telecentrically on both sides,
  at least one spatial light modulator 23, preferably formed as a liquid crystal display or micro-mirror array,
  a light source 113, and
  at least one detection beam path separated from the projection beam path that is formed telecentrically on both sides, with an mapping scale factor beta_dash less than or equal to 5.

There is a triangulation angle beta between the projection and the detection beam path in the object space. The arrangement furthermore comprises a computer-controlled translation system 81 for internal continuous depth scan, at least one rasterised detector 73 for image recording of the object illuminated in a structured way, and a computer system 81 with control and evaluation programs.

The spatial light modulator and the rasterised detector are rigidly allocated to the computer-controlled translation system for the internal continuous depth scan. The mapping scale factor in the projection beam path (beta_dash_P) and in the detection beam path (beta_dash_D)—when considering the lateral size (y coordinate) in the array space to the lateral size (y coordinate) in the object space—always at least approximately satisfy the relationship $$\text{beta\_dash}\_D = \text{beta\_dash}\_P * [\text{root of } \cos(\text{beta})]. \tag{2.1}$$

When adhering to this relationship, the focal planes in the entire depth scan remain very much unchanged and are also combined with corresponding depth adjustment of the beam paths.

Furthermore, at least one angled mirror 44, 45 with two plane mirror surfaces 441, 442, 451, 452 is arranged in the detection beam path and the projection beam path is unfolded or exhibits at least one plane mirror pair. Preferably, the projection beam path is formed in straight-line construction.

The optical axis of the projection beam path (APA) and the optical axis of the detection beam path (APO) are parallel in the array space and the projection beam path is perpendicular to the focal surface F_PD. The spatial light modulator and the rasterised detector are moved together in the depth.

The spatial light modulator is therefore perpendicular to the optical axis and the surface normals of the rasterised detector enclose, with the optical axis of the detection beam path (ADA), an angle of the size kappa_D (kappa_D1, kappa_D2) at least approximately of $$\text{kappa\_}D = \text{modulus}\{\arctan\,[\text{beta\_dash}\_D * \tan(\text{beta})]\} \tag{3.1}$$

Therefore, the Scheimpflug condition is adhered to and the focal planes of projection beam path and detection beam path are always parallel on both sides of the telecentric projection beam path and detection beam path. By adhering to equation 2.1, the focal surfaces—with corresponding individual adjustment—always coincide in the object space in the entire depth scan.

EXAMPLE 8-2

Preferably, the projection beam path is arranged centrally in a triangulation arrangement with continuous depth scan according to Example 8 and is surrounded by at least two detection beam paths.

EXAMPLE 8-3

Example 8-3 relates to an arrangement for continuous depth-scanning strip triangulation for three-dimensional recording of an object 6, 61, 62, 63 with an internal depth scan comprising:
  at least one projection beam path that is formed telecentrically on both sides,
  at least one spatial light modulator 23, preferably formed as a liquid crystal display or micro-mirror array,
  a light source 113,
  at least one detection beam path separated from the projection beam path that is formed telecentrically on both sides, with an mapping scale factor beta_dash less than or equal to 5.

There is a triangulation angle beta between the projection and the detection beam path in the object space.

Furthermore, the arrangement comprises:
- a computer-controlled 81 translation system for internal continuous depth scan and
- at least one rasterised detector 73 for image recording of the object illuminated in a structured way, and
- at least one computer system 17 with control and evaluation programs.

The spatial light modulator 23 and the rasterised detector 73 are allocated to the computer-controlled translation system 81 for the internal continuous depth scan. The mapping scale factor in the projection beam path (beta_dash_P) and in the detection beam path (beta_dash_D)—when considering the lateral size (y coordinate) in the array space to the lateral size (y coordinate) in the object space—always at least approximately satisfy the relationship:

$$\text{beta\_dash\_}P = \text{beta\_dash\_}D * [\text{root of cos(beta)}]. \quad (2.2)$$

When adhering to this relationship, the focal planes in the entire depth scan remain very much unchanged and are also combined with corresponding depth adjustment of the beam paths.

At least one angled mirror 47 with two plane mirror surfaces 471, 472 is arranged in the projection beam path or a plurality of plane mirror pairs is arranged in the projection beam path and the detection beam path is unfolded. The optical axis of the projection beam path (APA) and the optical axis of the detection beam path (APO) in the array space are parallel. The detection beam path is perpendicular to the focal surface F_PD, the spatial light modulator is inclined to the optical axis and the surface normals of the spatial light modulator enclose, with the optical axis of the projection beam path (APA), an angle of the size kappa_P at least approximately of $$\text{kappa\_}P = \text{modulus}\{\arctan[\text{beta\_dash\_}P * \tan(\text{beta})]\} \quad (3.2)$$

Therefore, the Scheimpflug condition is adhered to and the focal planes of projection beam path and detection beam path are always parallel on both sides of the telecentric projection beam path and detection beam path. By adhering to equation 2.2, the focal surfaces—with corresponding individual adjustment—always coincide in the object space in the entire depth scan.

EXAMPLE 8-4

Preferably, the detection beam path is arranged centrally in a triangulation arrangement with continuous depth scan according to Example 8-3 and is surrounded by at least two projection beam paths.

On the Principle of the Methodical Approach with Wavelet Generation

During the continuous depth scan, with structured illumination of the object, continuously an image stack is recorded with at least one chip of a rasterised receiver. In so doing, either alternating, the size of two different triangulation wavelengths with periods lambda_T_1 and lambda_T_2 are spasmodically changed, wherein the structured light then comes from the same projection optical device. Or, for example, due to spectral separation there are two triangulation wavelengths with the periods lambda_T_1 and lambda_T_2 concurrently. In general, no additional phase shift is introduced as a result. The images of the illuminated object may, therefore, be stored in a single image stack if the image recorded is done by means of a single camera chip. With spectral separation, a two- or three-chip camera may also be used and there are several image stacks.

Therefore, it is possible that in two partial beam paths, the allocated light source of which exhibits a different colour spectrum respectively, there are different triangulation wavelengths lambda_T_1 and lambda_T_2 concurrently, by illuminating two linear gratings of different grating period by light with respectively a different colour spectrum. So, two wavelets with different period or different local frequency may be generated concurrently. The period or local frequency of the wavelet is produced according to the size of the relevant triangulation wavelengths, resulting from the geometry of the arrangement with the relevant triangulation angle and the strip period existing in the focal plane of the object space.

Preferably, an additional (narrower than the full width of the wavelet FW_00) and reliably usable unambiguity range (in micrometers) EDB is created.

Typically, however, the unambiguity range must, as a maximum only be 0.5 times the extent of FW_00 (p_1) for the first fine linear grating.

The approach with n_FW_00≥10, so more than ten periods below the envelope, is very useful, as wavelets of real linear gratings are also often somewhat asymmetrical. As a result, the support of the centre of gravity evaluation of the contrast envelope through phase relationships of two linear gratings in beat frequency is very advantageous.

A period ratio of 6:7 or 7:8 in this case is good for a beat frequency, as period lengths are still somewhat equal and therefore both signal paths may contribute by averaging to decreasing the measurement uncertainty. The results of the signal with the somewhat coarser period are not practical based on known experience or hardly with larger measurement uncertainty flawed than that of the shorter ones. With the period ratio mentioned above, the beat frequency wavelength is already large enough to avoid 2Pi jump error to the greatest possible extent.

For the approaches with depth scan in the application document, it must be true that in the space where a depth scan is conducted, there is always a telecentric beam path.

Strip triangulation particularly with continuous depth scan allows wavelets with a dominating frequency to arise. Therefore, for the phase evaluation, lock-in approaches [4], [5] are favoured, as this frequency is known in advance and is generally highly stable.

On the Principle of the Depth Scan Approach

Arrangements with an external continuous depth scan represent fundamentally the better measurement method with regard to measurement uncertainty, as the optical devices in the object space only work in the really narrowly limited depth region around the focal plane. That releases the requirements on correction of the optical devices with regard to aberrations—such as distortions—in depth quite extensively, as the telecentricity and the lack of distortion is only guaranteed in a small depth region. This is an advantage for external depth scans compared with an internal scan and the same depth measurement range. However, even for the external depth scan, a very precise relative movement between the measured object and the measurement arrangement must be generated. This approach comes across considerable technical challenges with an external depth scan if comparably large objects are to be measured, for example, with lateral dimensions above 50 mm. Then a comparably large optical arrangement must be moved precisely in depth.

Arrangements with an internal continuous depth scan are particularly suitable for larger measured objects such as fine details on automotive engine blocks, in which also larger measurement volumes occur with measured depths markedly greater than 5 mm. In this situation, the measured object with a large mass can move only precisely in depth with difficulty. With a depth measurement range above 5 mm, however, due to the optical devices generally to be used in this case with large focal lengths—mostly then already with focal lengths markedly above 50 mm, the optical measuring device also exhibits a very large footprint. Therefore, even this measurement arrangement already exhibits a considerable mass. Therefore, the approach with the internal depth scan is a very good alternative, as in this case, only one or two linear gratings and the rasterised detector must be moved. In the internal depth scan, the optical devices in the object space are generally used in a considerable measured depth about the focus range. However, that increases the requirements on the optical devices quite particularly with regard to the correction in depth—such as securing very low telecentricity deviations in connection with a very low distortion in depth—quite considerably. However, this can be mastered quite well with refractive objects in the prior art. On the other hand, the optical design when using fluid lenses in the prior art presents considerable challenges so that in this case, with high requirements with regard to measurement uncertainty, only a comparably small depth measurement range—compared with the displacement of linear gratings and the rasterised detector respectively with depth component—can be enabled.

Principle of Evaluation and Determining the Depth Position of the Measured Point P_i with the Wavelet Approach In all arrangements and methodical approaches, there is always a change of relative position of the focal plane (focal surface) of a strip image to each one measured point P_i of the generally extended measured object. The relative position is changed by a scan that is therefore called the depth scan. In the depth scan, a stack of images of the measured object is recorded.

In the surroundings of the centre of gravity of the contrast envelope CE_CoG_O_i determined by calculating from the object data for a measured point P_i and both object phases phi_1_O_i and phi_2_O_i determined by calculation, for the present object phase pair (phi_1_O_i, phi_2_O_i) the depth position is determined by calculation, where the object phase pair (phi_1_O_i, phi_2_O_i) best fits the stored reference phase pair (phi_1_R_i, phi_2_R_i) to a previously conducted reference measurement—also considering the phase difference (delta_phi_12_R_i mod 2Pi) of the object phase duo—for the measured point P_i.

In so doing, it may be either two fine phases, resulting from two fine grating periods (p_1, p_2_f) or one fine and one coarse phase resulting from a fine (p_1) and a coarse grating period (p_2_g).

On the one hand, it is possible that for the fine-tuning—therefore by using the phase information—of the depth position of the measured point P_i only the value phi_1_O_i, therefore only one grating period and general the finer grating period, is used.

On the other hand, it is also possible that for the fine-tuning of the depth position of a measurement point P_i, both fine phases phi_1_O_i and phi_2_Oi are used. This corresponds to an averaging that primarily makes sense if both fine grating periods are not very different. Therefore, the best signal-to-noise ratio for determining the depth position for a measured point P_i is achieved.

It is also fundamentally possible to conduct a first depth scan with a first linear grating with the grating period p_1 and in a second depth scan exchange the linear grating by means of a computer-controlled device for pushing a carrier of various linear gratings and therefore use a different linear grating with a somewhat different grating period p_2 in the beam path. The second depth scan with the second inserted linear grating may then be done as it returns.

Other Illustrative Examples, Regardless of the Approach Used

Fixed linear gratings (which are self-illuminating or illuminated by one or more light source), controllable linear gratings (e.g. LED arrays) or controllable spatial light modulators (such as liquid crystal modulators, for example, micro-mirror arrays etc.). In many strip projection triangulation arrangements with spatial light modulators in the prior art there is only one projection level for structured illumination and two detection levels each with a camera. At large measured volumes, a lot of light is needed, therefore a lot of energy is needed and therefore a lot of disruptive heat is generated in a precision arrangement. Therefore, the limitation to one projection level usually makes a lot of sense.

For small measurement volumes, however, less light is needed and not so much heat is generated, even as the efficient LED lighting is possible for the linear grating. For this case, as it relates to here, a strip projection triangulation arrangement with a central camera and two projection levels is not disadvantageous. In its favour, the effort may be devoted to only one telecentric detection level, but which, in its favour is very precise. This reduces the effort taken for the demanding calibration for the approach with depth scan and also tends to reduce the measurement uncertainty in the measurement. A further reason for a central camera and 2 projection stages is that a spatial light modulator is not absolutely necessary, as the proposed methods and devices basically arise without a spatial light modulator. This is because the cost-effective amplitude linear grating and LED illumination are sufficient to implement the approach for strip triangulation described here.

FIG. 1a to 1l show triangulation arrangements according to the prior art. Illustrative embodiments of the invention are described in the context of FIGS. 2 to 33 and eleven illustrative examples without their own figure.

FIG. 1a to 1c shows the known prior art from document [3]. FIG. 1a illustrates a triangulation arrangement with a depth scan of the object. Therefore, it relates to an external depth scan. A grating is moved laterally to the phase shift. FIG. 1b shows the contrast function in the grating mapping at different depths and FIG. 1c the implementation of this approach by means of stereo microscope, wherein the object experiences an inclined scan in this case, but which is parallel to the optical axis of the detection optics, so that the image does not migrate on the camera.

Figure 1E:
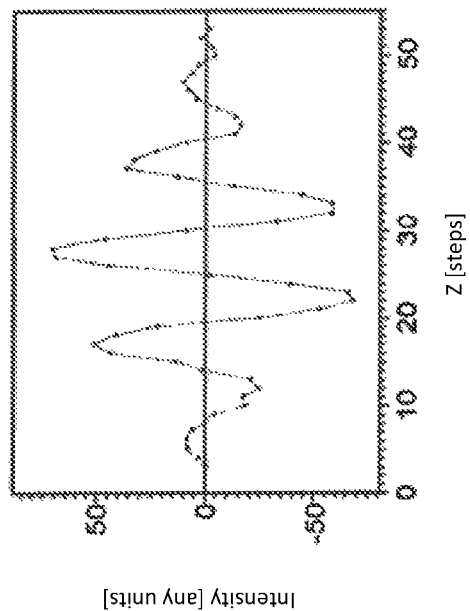
Figure 1D:
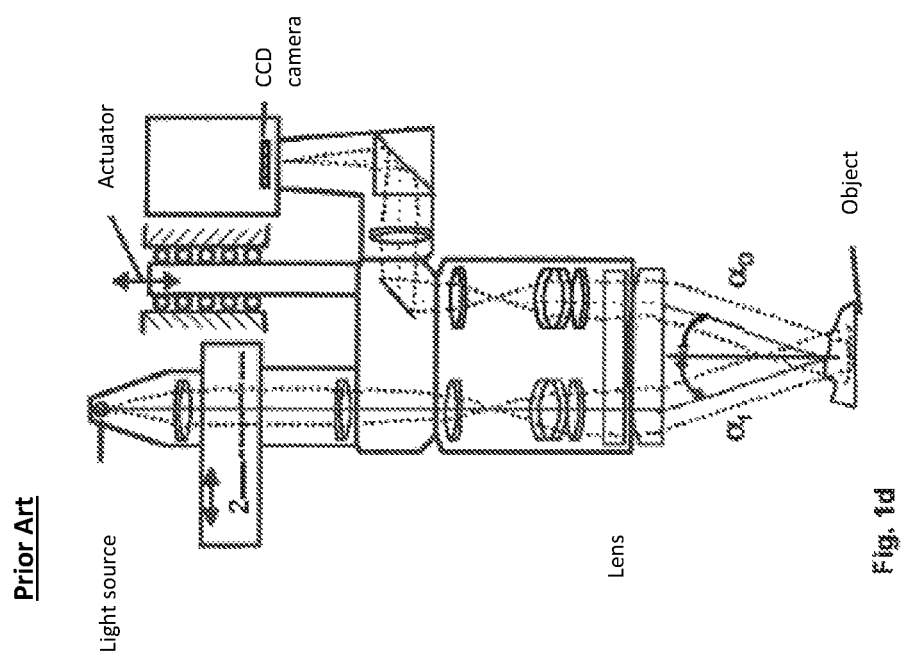

FIG. 1d presents as an example, a stereo microscope which is formed as a compact unit that can be displaced in depth in a controlled manner, to conduct an external depth scan, see also [4] and [5], there FIG. 1. The wavelet produced by measurement, published in [4] as FIG. 7b is represented here in FIG. 1e. In the stereo microscope, there is a comparatively large aperture diameter of about 15 mm free opening with a comparatively small triangulation base of 24 mm, that represents the distance from the centres of the aperture of the stereo microscope and a useful lens with a focal width of 80 mm. FIG. 1e shows a wavelet recorded with these parameters of the stereo microscope that exhibits barely 5 full periods under the envelope. Such a low period number n_FW_00 set for triangulation arrangements is therefore a special case, which is not to be considered here any further. The image shift resulting from the angle between the slider direction of the actuator and the optical axis of the detection channel must be corrected digitally. A virtual pixel is formed to do this. In so doing, a parallelity between the slider direction and the optical axis of the detection channel is to be preferred, as such a pixel always detects the same object point in depth and provides a wavelet of this object point.

Figure 1G:
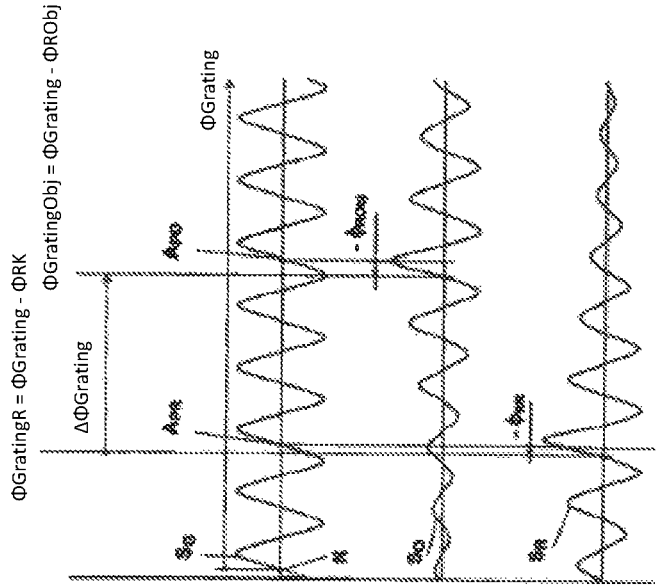
Figure 1F:
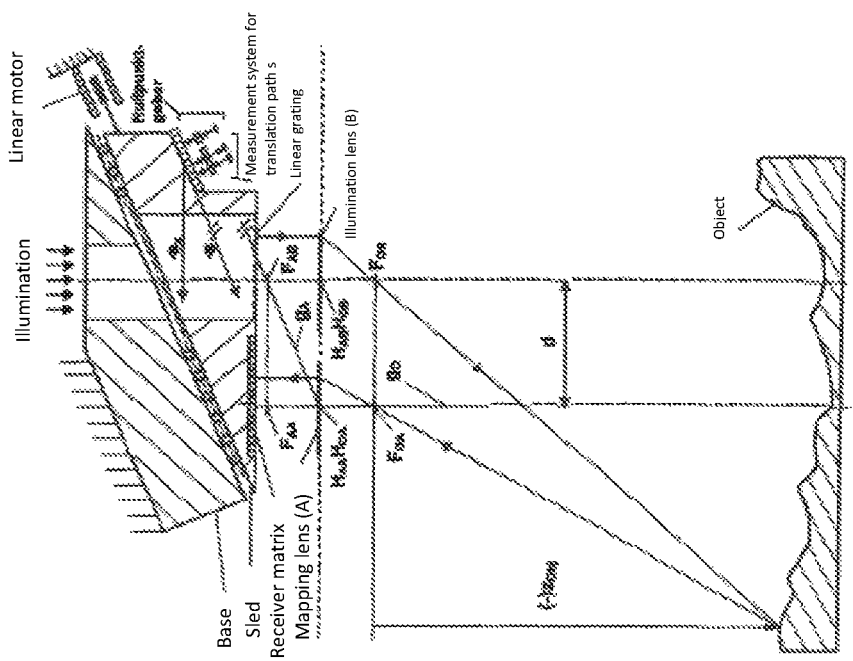

FIGS. 1f and 1g show an arrangement from DE 198 46 145 A1, see there FIG. 3, with an internal depth scan and the originating signal in the form of a wavelet with an envelope from document DE 198 46 145 A1, see there FIG. 2. Due to the relatively mutually densely situated apertures with aperture centres F_OA and F_OB—therefore a small triangulation basis—and thus comparatively large aperture openings, in the wavelet in FIG. 1g only few periods with greater amplitude occur, so that a signal evaluation with identification of the dominant period is comparatively simple. The lateral shift of the camera chip is subtracted out by pixel tracking in the sense of a virtual pixel.

Maintaining the confocal condition, therefore the permanent coupling (optical conjugation) of each one image point of the linear grating and of each one pixel mapped in the object space—achieved in this case by shifting the linear grating along the straight line gA—is important in the internal depth scan with wavelet evaluation. Internal means that, in this case, inner components of the arrangement are moved. Only when maintaining the confocal condition may any pixel be assigned a constant and by reference measurement singularly or multiply determinable starting phase in the signal wavelet, which is stored in the long term, so that there is a reference record of reference phases. Otherwise, as with the short-coherent interferometer, where with perfect optics the starting phase for all pixels is zero, the starting phase for a depth-scanning arrangement by means of linear grating is initially unknown and must be determined at least once by a reference measurement and stored. For the reference measurement, advantageously a highly-level and good light-scattering bright and because of mechanical stability also thick plate is used, for example, similar to gypsum, which is considered as an optically cooperative object. A high mechanical long-term stability of the arrangement then ensures the constancy of the by-pixel singularly-determined starting phases from the reference measurement. These by-pixel known starting phases are then necessary for the by-pixel determination of the depth position of the measurement points on the object, which thus always relates to a previously conducted reference measurement.

The arrangement in FIG. 1h with an internal depth scan, taken from FIG. 4 of PCT/DE00/00991 (WO 00/66972) is constructed with knowledge of the Scheimpflug condition so that the paths BS_Oj of the wandering image points of grating elements BA always target the pupil centre PZ_OA of the detector lens in the scan. Therefore, these paths BS_Oj coincide with the visible rays ABS of the detector lens (2). FIG. 1j illustrates the wavelets with contrast envelope produced by an object and a reference measurement, from the shifting of which waves by object point, the phase difference delta_phi grating is determined in relation to a reference measurement. From this phase difference delta_phi grating, with knowledge of the geometry of the measurement arrangement and the optical parameters of the lenses, the depth information can be determined for each object point. The arrangement of the centre PZ_OA of the aperture for detection in the point of intersection K1 of the object-side Scheimpflug straight lines leads to the confocal approach. This means a permanent coupling of the image points of the grating with the image points of the pixels of the rasterised receiver in the object space, therefore permanent confocality, if the rasterised receiver is also correspondingly moved along synchronously in depth. As a result, the phase at the centre of gravity of the contrast envelope of a wavelet is also at least approximately constant in the various depth positions of an object point, which represents a considerable advantage for the evaluation. In a real system, this is nevertheless true only in a limited depth region, which is particularly dependent on the quality of the telecentric mapping of the lenses, i.e., the array-side pupils of the lenses must be at infinity.

FIG. 1i illustrates two-sided telecentric mapping stages for projection and detection of an object illuminated in a structured way. An internal scan is done, as a linear grating (here reference number 3) and the camera chip (here reference number 6) are moved. This is represented in the prior art, see DE 199 19 584 A1, FIG. 18. An element j of the grating (here reference number 3) is moved along the path BS_Aj. The image of this path in the object space is BS_Oj and is aligned parallel to the optical axis of the detection lens, so aims in the object space into the pupil of the telecentric detection lens which is at infinity. In this case, the counteracting movement of grating and camera pixel images in the object space represent a certain disadvantage if there are guidance errors of the translation sled (here reference number 7) transverse to the direction of translation. This is because—depending on the discrepancies in the transverse position of the translation sled (here reference number 7)—counteracting movement of grating and camera pixel images may particularly lead to inclined surfaces as a result of phase errors.

FIG. 1j illustrates a typical wavelet that can be generated by pixel by means of an arrangement according to FIG. 1f, 1h or 1i by a measurement. The measured wavelet has been taken from publication [7], FIG. 2. It is clearly recognisable that the strip of zero order with the relatively large number of periods below the contrast envelope is not so obvious to find. Nevertheless, finding the zero order by means of evaluation of the centre of gravity at least on cooperative surfaces is still comparatively good, i.e. it is very rare that an incorrect strip order is identified as the zero one, which may then be appreciable as a 2Pi jump in the phase map.

FIG. 1k illustrates a symmetrical wavelet which may be recorded at a cooperative object point O. A symmetrical wavelet is produced, for example, at an axially perpendicular and good light-scattering region of the object, shown in the detail Det. 1k. The deposition delta_z_CoG_coop_Ave of the calculated centre of gravity by means of the data of a real measured value from the centre of the wavelet is markedly below the period pw, which defines the unambiguity range EDB. So, an identification of the strip order is also generally certainly possible by various digital evaluation methods.

FIG. 1l illustrates an asymmetrical wavelet which may be recorded at a non-cooperative object point O. An asymmetrical wavelet is produced, for example, at a heavily inclined region of the object or even at an edge of the object, represented in Detail Det. 1L. The deposition delta_z_CoG_non-coop_Ave of the calculated centre of gravity by means of the data of a real measured value of the centre of the wavelet is markedly above the period pw, and is therefore greater than the unambiguity range EDB, so that an identification of the strip order is generally not or is hardly possible also due to different digital evaluation methods. There is the risk that in this case a wrong strip order is identified, which makes the phase evaluation in a 2Pi jump or through n*2PI jump with n=2 or 3 appreciable.

FIG. 2 illustrates a continuous focus-scanning triangulation arrangement with double wavelet approach with an external continuous scan for high demands. The triangulation angle is 30°. For the external scan, in this case, a continuously moving z translation sled 8 not shown here, with linear drive 9 controlled by the measurement system 10 and with highly precise neutral point transmitter 11, not shown here, so that the starting method may also start highly precisely in the same z position, is used. Two fine sine gratings 21 and 22 with different periods $p\_1=50$ μm and $p\_2\_f=60$ μm, therefore arranged in the ratio 5 to 6, are show in FIGS. 3 and 4. There is a beat frequency period with $p\_12=300$ μm, symbolically represented as a wavelet in FIG. 7. The triangulation wavelength 1 by means of linear grating 21 is 86.6 μm. The increment of the in-depth scanning for image recording the depth scan for each of the two linear gratings 21 and 22 is calculated to be respectively 9.62 μm and remains unchanged in the depth scan. By means of the computer-controlled pulsed first green-coloured light source 101, which is pre-assigned to linear grating 21 for illumination and the second computer-controlled pulsed green-coloured light source 102, which is pre-assigned to the linear grating 22 for illumination, there is alternating illumination of the two linear gratings 21 and 22. The light from both linear gratings gets through the neutral beam splitter cubes 31 through the bandpass colour splitter 32 for green light with the bandpass colour splitter layer system 321 that allows at least 90% of green light to pass through and reflects at least 90% of red light, into the telecentric mapping stage 41. The light source 103, which emits red and blue light constantly in the depth scan, is used to illuminate the measured object 6 to be able to generate a colour image of the object. The light gets through the bandpass colour splitter 32, that reflects at least 90% of the blue and red light, also into the telecentric mapping stage 41. The digital aperture NA of the telecentric mapping stage 41 for projection is $NA=0.04$. This exhibits a mapping scale factor of one and on the object-side has a strict telecentricity and is diffraction-limited. The distortion is a maximum of 0.05%. The telecentric mapping stage 42 is of the same construction as mapping stage 41 and also exhibits a digital aperture $NA=0.04$. The light source 103, which emits red and blue light constantly in the depth scan, is used for object illumination to be able to generate a colour image of the object. The light gets through the bandpass colour splitter 32 and through the telecentric mapping stage 41 to the measured object 6, which is coloured as a colour print, and illuminates this measured object 6 in an unstructured way. The selected measurement field exhibits a diameter of 8 mm. A colour camera 71 with a half-inch chip 711 is used. After each image recording, the respective other linear grating is illuminated. The colour camera chip 71 is formed with Bayer filter mosaics. The green pixels of the RGB chip 711 detect the strips. By means of concurrently occurring red and blue illumination of the object and the green channel, the object colour is determined. The number of periods below the contrast envelope $n\_FW\_00$ is produced for 30° and $NA\_P=0.04$ with equation (1) for approximately 18 periods. The depth measurement range is 8 mm. From this depth measurement range is produced a depth scan range of maximum 10 mm due to the necessary pre-run and after-run.

To control the components of the arrangement according to FIG. 2, such as the light sources 101 and 102, camera 71, regulated linear drive 9 and also for data processing, a computer system 17 is allocated to the depth-scanning measurement arrangement. This computer system 17 also takes on the calculation of 3D point clouds. On the display 171 of the computer system 17, the measured 3D point cloud of measured object 6 is represented. A possible principle for determining a 3D point cloud is therefore the following: With a depth-scanning reference measurement on the highly level plate—in the best focus position—the phases modulo 2Pi are determined for a shorter wavelet W1 and a somewhat longer wavelet W2, in relation to the scanning raster, and their phase difference modulo 2Pi is determined and stored by means of multi-point evaluation. Then, in an object measurement at the points of the measured object 6 the relevant z position in the high contrast region is determined by means of multi-point calculation, where there are exactly the same phase relationships or where there is the same cut-out of both wavelets.

FIG. 3 illustrates the transparency of the linear grating 21 with cosine-square-shaped transparency with fine grating period $p\_1$. FIG. 4 illustrates the transparency of the linear grating 22 with the grating period $p\_2$. In the context of this application document, the first linear grating 21 with $p\_1$ always exhibits the finer period in comparison with period $p\_2\_f$ of the second linear grating 22, which is also formed with cosine squared-shaped transparency. Such gratings are also called sine gratings. Alternatively, however, the use of binary linear gratings is also possible. The ratio of periods is 5:6 here. The beat frequency period is $p\_12$, which is 6 times $p\_1$ and 5 times $p\_1$.

FIG. 5 shows the first wavelet W1 via the scan path $z\_s$, which results from the fine linear grating 21. The contrast envelope $CE\_1$ is represented, and the calculated depth position $z\_CoG\_1$ from the centre of gravity of the contrast envelope of the wavelet. FIG. 6 shows the somewhat longer second wavelet W2 with the somewhat smaller local frequency in comparison with the first wavelet W1, which is derived from the fine linear grating 22. The wavelets are represented in FIGS. 5 and 6 with continuous dashes to improve recognisability. In reality, however, wavelets with discrete measurement points are produced. In these parameters, respectively approximately 6 to 7 periods are produced with at least 50% of the maximum amplitude. Each wavelet is obtained by pixel from an image stack. To do this, the intensity values are sorted out alternately from the image stack and stored separately. The individual signal values thus arise somewhat time-offset. Each wavelet is recorded time-nested. The value $delta\_z\_CoG\_12\_f\_i$ shows the difference of the centre of gravity positions in a pixel i. This value $delta\_z\_CoG\_12\_f\_i$ is ideally zero, but is caused by signal noise and scanning error in the creation of the wavelet. In the method, the centres of gravity $CoG\_1$ and $CoG\_2\_f$ of both contrast envelopes $CE\_1$ and $CE\_2$ of wavelets W1 and W2 are determined. From this, the difference of the centre of gravity positions $delta\_z\_CoG\_12\_f$ is determined. A dense close positioning of $CoG\_1$ and $CoG\_2\_f$, therefore a low value of $delta\_z\_CoG\_12\_f$ is generally a sign of high signal quality and good mechanical stability of the arrangement and a precise scanning in depth. Respectively the phases for both signal paths at the centre of gravity are calculated.

FIG. 7 presents as a model the beat frequency of both fine linear gratings 21 and 22 in the form of a wavelet with the beat frequency period $pw\_12$, wherein also here the wavelet is presented in a simplified way as a continuous pattern, although it is only present in discrete values when there is a measurement.

FIG. 8*a* shows the wavelet WR1 for a reference measurement point R, belonging to a pixel P, wherein the reference measurement point R and the pixel P are optically conjugated. The reference signal has been recorded by means of pixel P. The wavelet WR1 comes from an image stack that has been measured and generated with a fine linear grating 21 with the grating period $p\_1$ at a white light-scattering flat plate as reference object at reference point R. The reference object in this case represents a metrologically very cooperative bright surface for the triangulation with laterally very uniform light scatter. This reference flat plate is always perpendicular to the optical axis of the detection beam path. This position of the reference flat plate always applies for all reference measurements. For recording of the measurement points for this wavelet WR1, the light source 101 for the linear grating 21 is always switched on for image recording for the wavelet WR1 and the light source 102 for the second linear grating 22 is always switched off, wherein this is done in rapid interchange according to the image recording frequency of the camera 71 with the camera chip 701 in the depth scan. The scanning comb AK is only represented here symbolically. Generally, the scanning is done somewhat more densely, for example, with 9 support points for each period of scanning. As is known to a person skilled in the art, from the wavelet WR1, the depth position z_R_1_CoG can be determined by means of the known centre of gravity calculation, therefore, by determining the centre of gravity of the contrast envelope of the wavelet then from the present wavelet signal WR for each reference point R. Furthermore, phase phi_R_1 CoG is determined and stored at the centre of gravity of the contrast envelope.

FIG. 8b illustrates the reference signal measured in pixel P with the second, only somewhat coarser linear grating 22 with grating period p_2_f at the same reference point R of the reference flat plate. This is possible if only then signal values of the wavelet WR2 are recorded by means of pixel P if the light source 101 for the first linear grating 21 is switched off and the light source 102 for the second linear grating 22 is switched on. Linear gratings 21 and 22 are arranged optically conjugated. By means of the linear grating 22, the depth position z_R_2_f_CoG of the centre of gravity (CoG) is determined and stored from the then present wavelet signal WR2 through the contrast envelope by calculation. Also the phase phi_R_2_f_CoG is determined and also stored. In FIGS. 8a and 8b, the positions of the centres of gravity z_R_1_CoG and z_R_2_f_CoG are combined for technical drawing reasons. Therefore, it is represented in the ideal case, wherein the discrepancy delta_z_CoG_12_f with a mechanically stably constructed and well-adjusted arrangement with depth-scanning with an uncertainty of maximum 1% of the grating period p_1 in the scanning step and stably-working light sources are to be low.

FIG. 8c illustrates the calculated beat frequency of the reference signals and/or reference wavelets. This beat frequency is only shown in FIG. 8c, to detect the unambiguity range EDB, which corresponds to the beat frequency period pw_12. For the beat frequency signal, there is no phase evaluation here.

FIG. 8d illustrates a wavelet WO1 for an object measurement point i, belonging to pixel P_i. In so doing, object measurement point O_i and pixel P_i are optically conjugated, wherein, furthermore, writing the index i is dispensed with. This signal WO1 has been determined in an object measurement at a very cooperative measured object with the fine linear grating 21 (p_1).

In so doing, due to the position and shape of the object for the depth position of the object measurement point O, a different depth position than with the reference measurement is generally produced. Consequently, the object wavelet WO1 is shifted compared with the reference wavelet WR1 to the z_s axis, therefore in depth. This shift contains the measurement information on the depth position of the object point O in relation to the reference measurement point. By means of centre of gravity evaluation, the value z_O_1_CoG is determined and in its environment, respectively the locations of phase phi_R_1 CoG are determined, wherein in this case, only the location z_O_1 is illustrated.

FIG. 8e illustrates a wavelet WO2 for an object measurement point i, measured with the coarser linear grating 22 (p_2_f). In the environment of the centre of gravity, the locations of the phase phi_R_2_f_CoG are determined. Finally, the location z_O in the environment of centre of gravity z_O_1_CoG is determined, at which the phase pairs from wavelets WO1 and WO2 best correspond to the phase pairs from wavelets WR1 and WR2. The phase pairs at positions "−1" and "+1" are discarded, because these are too far away from the centre of gravity z_O_1_CoG. With very symmetrical wavelet signals according to FIGS. 8d and 8e, the application of the two-wavelet approach can still be dispensed with. Yet for wavelets with 20 and more periods and a certain asymmetry of the contrast envelope, the usage of the two-wavelet approach is indispensable.

The following describes the process for an example method with two separate fine linear gratings, see also FIGS. 8a to 8c, for the reference measurement, i.e. the measurement on a reference plate:

1. Determine in a reference measurement with a highly level and light-scattering reference plate for all pixels of the rasterised detector by means of fine linear grating 21 with the period length p_1 the depth position z_R_CoG_1 of the Centre of Gravity (CoG).
2. Determine in a reference measurement of a highly level and light-scattering reference plate for all pixels by means of fine linear gratings 22 with the period length p_2_f, the depth position z_R_CoG_2_f of the centre of gravity.
3. Determine in a reference measurement for all pixels of the rasterised detector 7X the difference of the depth positions z_R_CoG_1-z_R_CoG_2_f and reject the measured points the difference of which exceeds a threshold delta_z waste. As a guideline, for the threshold value delta_z waste, preferably half the period length of the linear grating 21 with the period length p_1 is applicable.
4. Proceed with the remaining (valid) pixels as follows:
5. Calculate the phase value phi_R_CoG_1 in a reference measurement for all pixels on the depth position z_R_CoG_p_1 of the centre of gravity.
6. Calculate the phase value phi_R_CoG_2_f in a reference measurement for all pixels on the depth position z_R_CoG_2_f of the centre of gravity.
7. Determine in a reference measurement for all pixels, the beat frequency curve by means of the data from both linear gratings 21 and 22 and therefore the phase value phi_R_12 CoG on the centres of gravity. The phase value phi_R_12 CoG may be determined at the depth position z_R_CoG_1 or at the depth position z_R_CoG_2_f or at the average depth position z_R_average. The latter is preferable, so this is then the phase value phi_R_12 CoG_average.
8. Store the phase value phi_R_12 CoG_average and also the phase values phi_R_CoG_1 and phi_R_CoG_2_f for all valid pixels.

The following describes the process for a method with two separate fine linear gratings, see also FIGS. 8d to 8e, for the object measurement, i.e. the measurement described at an object:

1. Determine in an object measurement for all pixels by means of linear grating 21 with the period length p_1 the depth position z_R_CoG_1 of the centre of gravity.
2. Determine in an object measurement for all pixels by means of linear grating 22 with the period length p_2 the depth position z_R_CoG_2 of the centre of gravity.

3. Determine in an object measurement for all pixels the difference of the depth positions z_O_CoG_1-z_O_CoG_2 f and reject the measured points the difference of which exceeds a threshold delta_z waste. As a guideline, for the threshold value delta_z waste, preferably half the period length of the fine first linear grating 21 with the period length p_1 is applicable.
4. Proceed with the remaining (valid) pixels as follows: Form the average z_O_CoG_average_12.
5. Calculate the phase value phi_O_CoG_1 in the object measurements for all pixels on the depth position z_O_CoG_p_1 of the centre of gravity.
6. Calculate the phase value phi_O_CoG_2 f in the object measurements for all pixels on the depth position z_O_CoG_p_2_f of the centre of gravity.
7. Search in the object measurements for all pixels the phase value phi_R_12 CoG_average, which is closest to the average z_O_CoG_average_12, and determine the depth position z_O by means of the same for all pixels.
8. Search in the object measurements for all pixels the phase values phi_CoG_O_p_1 and phase values phi_CoG_O_p_2 in the immediate vicinity of phi_12_CoG_R_average and determine the relevant depth position z_O_1 and z_O 2 in the scanning comb and average these z depth positions to z_O_average_1_2, wherein this average z_O_average_1_2 then represents the relevant depth position of an object point.

The contrast centre of gravity of the coarse linear grating with period p_2_g is not dealt with, as it is not used for the calculation due to its "unsharpness" because of the comparatively large width of the envelope of the relevant wavelet. A usable contrast centre of gravity CoG is always derived from a fine linear grating, so in this case from fine linear grating 21 with the period p_1, so that the contrast centre of gravity CoG_1 is determined by calculation. The contrast centre of gravity CoG_2 f of the fine linear grating 22 with period p_2_f is only used to assess the signal quality by deposition to CoG_1. If the deposition (delta_z_CoG_1-Cog_2_f_i) of CoG_2_f to CoG_1 is too large, there are different asymmetries in the contrast envelope which allow faulty optical signals to be concluded. Measurement results from such a measurement point must be rejected under these circumstances.

FIG. 9 represents an arrangement for an approach for an external depth scan. The mapping scale factor beta_dash_P in the projection beam path is for a triangulation angle beta_P=30°, selected to fit a normal micro-mirror array with 12° deflection angle of the micro-mirror. On the object side, for both mapping stages 41 and 42 there is a strict telecentricity, wherein the digital aperture in the object space in this case on the object side is respectively NA=0.04. The structured light is generated by means of a green-coloured cold light source 104, that is permanently switched on in the depth scan, and with a spatial light modulator (SLM) 23, that it formed as a micro-mirror array. This is therefore used as a controllable linear grating. By means of this light modulator 23, sequentially the grating periods p_1 and p_2_f are generated, the ratio of which is also 5:6 here. As a result, according to each image recorded by the measured object 6 with structure illumination, the light modulator 23 is switched over into another period of the linear grating. The recording of the measured object 6, to generate the image stack, is done with a monochrome camera 73.

FIG. 10 shows a linear grating with the grating period p_1_SLM entered at a time t1 by means of a spatial light modulator 23 and FIG. 11 represents a linear grating with the grating period p_2_f_SLM entered at a time t2 by means of SLM 23. Each wavelet is obtained by pixel from an image stack. To do this, the intensity values are sorted out alternately from the image stack and stored separately.

FIG. 12 represents an arrangement with an external depth scan, in which the colour of the measured object 6 can also be determined. The arrangement uses the double wavelet approach, in which two fine linear gratings are illuminated alternately and used to obtain two wavelets.

For the projection and detection there is a 1:1 mapping, by which the maximum expansion of the measured object 6 is jointly determined by the camera chip size. The digital apertures are respectively 0.04. Two fine linear gratings 21 and 22 are used, that are alternately illuminated by the light source 111 for the linear grating 21 and by the light source 112 for the linear grating 22. The light source 111 is formed in the spectrum both with a powerful light part with centre of gravity at wavelength 580 nm, which drops to zero up to wavelength 550 nm, as well as with a wide-band red part. The spectral range of 550 nm to 580 nm is reserved for the linear grating 21. The light source 112 is formed in the spectrum both with a powerful light part with centre of gravity at wavelength 520 nm, which drops to zero up to wavelength 550 nm, as well as with a wide-band blue part. The spectral range of 520 nm to 550 nm is reserved for the linear grating 22. The light sources 111 and 112 are pulsed alternately. In so doing, both light sources run computer-synchronised to a 2-chip camera 72, to an edge colour splitter 34 for the transmission of green light, which is structured. The colour correction of the telecentric mapping stages 41 and 42 must be particularly good in the spectral range of 520 nm to 580 nm. The external depth scan is done by means of precision translation sled 8 and drive 9, which is formed with a translation measurement system 10. Preferably, the telecentric mapping stages 41 and 42 are corrected well chromatically at the wavelengths 535 nm and 565 nm, as these are also the centre of gravity wavelengths of both peaks of the light sources. Detail 12.1. shows a curve over time of the illumination and the specification of the relevant spectral range of the light source. Detail 12.2 shows the emission spectrum of the light source 111 and Detail 12.3 shows the emission spectrum of the light source 112. Detail 12.4 shows the transmission of the colour splitter 341 in the spectral range of 520 nm to 580 nm, which is used for measuring by means of chip 721. Chip 722 only detects intensities, to determine the colour of the object. In this spectral range, the chromatic correction of the optical device does not have to be perfect either, if no extreme requirements exist on the lateral colour information of the measured object 6. The monochrome chip 721 of camera 72 detects from the light sources 111 and 112 alternately only structured light in the spectral range of 520 nm to 580 nm. Only by means of this monochrome chip 721 is phase information obtained. From its amplitude, the green part can be calculated. The monochrome chip 722 obtains light in the spectral range of 450 nm to 520 nm and 580 nm to 650 nm, however at different times, which is therefore distinguishable. From both channels with the monochrome chips 721 and 722 and the different light source 111 and 112, the information for the object colour in the red and blue range can be obtained, which produces the RGB colours of the measured object 6 with the information from the monochrome chip 721. The second monochrome chip 722 is only used for obtaining colour information.

In another illustrative example (1) in FIG. 12, the rasterised detector is formed as a normal one-chip colour camera with Bayer mosaic. Only the green pixels are used for the phase evaluation. However, that does not provide 100% coverage with pixels but only 50% coverage. For the resolution that does not represent a great problem, if the camera has a sufficiently high level of pixels. However, the exploitation of light is not optimum.

In a further illustrative example (2) in FIG. 12, the rasterised detector is formed as a normal 3-chip colour camera. Even in this case, only the green pixels are used for the phase evaluation, which advantageously provides a 100% coverage with pixels.

FIG. 13 represents a triangulation measurement arrangement with an internal continuous scan for somewhat smaller measurement volumes. By means of the two computer-controlled pulsed, green-coloured light sources 101 and 102, that are always alternately switched on, the illumination of both fine linear gratings 21 is done with the grating periods p1=60 µm and 22 with p2_f=72 µm, while these two are moved by means of the translation sled 81 with depth component. In this case, the translation axis TA is vertical in space. Also, the monochrome camera 73 is synchronised through the computer system 17 in the depth scan with the alternating illumination of the two linear gratings 21 and 22 and the translation sled 81. The double-sided telecentric mapping stage 41 for projection, therefore for mapping the linear grating 21 and 22, exhibits a mapping scale of 1:1 and a digital aperture of NA=0.067. Also the double-sided telecentric mapping stage 41 for detection exhibits a mapping scale of −1:1 and a digital aperture of NA=0.05. Where space is tight in the design of the optical device, there is the option to shift the layers of the main planes of the same in the depth in the design of the optical device somewhat.

The triangulation angle beta is 45°. The planes of both linear gratings and the detector plane are aligned mutually parallel and the translation axis TA is perpendicular to the planes of both linear gratings 21 and 22 and on the plane of the chip 731 of the monochrome camera 73. The main detection beam and the translation axis are aligned mutually parallel. The main projection beam and the translation axis TA are mutually 45°.

The number of reflections in the detection beam path is zero and there are precisely two reflections by means of pentaprism 413 in the projection beam path. The carrier of the linear grating is supported by rods 12, so that no vibration occurs. The tipping error of the translation sled 81 has a really major effect on the measurement result, as the angle of incidence on the linear grating is 45°. Therefore, the finer of the two linear gratings, the linear grating 21 is close the translation axis TA.

The perpendicular incidence on the chip 731 of the monochrome camera 73 is advantageous, as such tipping of the translation sled 81 remains extensively without effect. Lateral guidance error of the translation sled 81 in the continuous depth scan have the same effect on the linear grating 21 and 22, which is advantageous for the phase relationships in the signals. Thus, the errors when measuring the axially perpendicular surface regions are greatly minimised. However, these guidance errors in the presence of large gradients on the object are problematic, as measurement errors can be produced as a result. The position of the linear gratings 21 and 22 in the immediate vicinity of the translation axis TA minimises the effect of tipping errors of the translation sled 81. The tipping error of the translation sled 81 has a really major effect on the measurement result, as the angle of incidence on the linear grating 21 and 22 is 45° here.

In relation to the number of periods under the envelope, in this case it results, as beta_D is equal to zero, with the equation $$n\_FW\_00 \approx 1.22 * [\tan(beta\_P) + \tan(beta\_D)]/NA$$

$$n\_FW\_00 \approx 1.22 * \tan(45°/0.067 \approx 18$$

in a number of 18 periods below the envelope. From the 1:1 mapping of the mapping stage 42 in the detection beam path, depending on the size of the chip 731 of the camera 73, a measurement volume results, which is generally below 10 mm×10 mm×10 mm. With a camera chip with 5.6 µm pixel pitch and 1 million pixels, in this case, a field diagonal of about 8 mm results. With this arrangement, a depth measurement range of 6 mm may be achieved, wherein the required scan range is a maximum of 9 mm.

The scanning increment, therefore the depth step between two images for recording the image stack S on the translation sled is 5 µm. As the light sources 101 and 102 are switched on alternately, for each wavelet sorted out from the image stack, the scanning increment is 10 µm.

Also in this case, the arrangement according to FIG. 13 the confocal condition for separate apertures for projection and detection is met, as the image point straight lines BS_01 and BS_02 of grating elements in the object space to the translation axis TA and to the optical axis of the detection system ADO are parallel lines that coincide with the image point straight lines AS_O of the pixel in the object space in the entire depth scan. There is a coupling of the focal planes in the entire depth scan of the depth measurement range. Also, the coincidence of the points O, C', G1, G2 are represented at a time of the depth scan on object 6. The transverse guidance error of the translation sled 81, in this case of the individual components, must be a maximum of 1 µm for high requirements, i.e. if also objects with comparatively large surface gradients are to be measured with a low error and at pixel sizes of around 3 µm to 6 µm and for grating periods p of the linear gratings of 50 µm, in order to be sure to keep measurement uncertainties caused as a result to below one micrometer.

The pentaprism 413 exhibits two mirrored surfaces. Therefore, the difference of the reflections in the P and D beam path are even-numbered. This even-numberedness leads to the advantage of the compensation for lateral guidance errors, as a pixel image and an element of the linear grating in the object space remains optically conjugated even for lateral guidance error, therefore for transverse offset, moving together on the same measured object 6. When encountering a powerful beam on an axially perpendicular surface region of the measured object 6, in the transverse offset of the translation sled 81 there is therefore no phase error, and the opposite is true with inclined surface regions of the measured object. Therefore, a smaller lateral guidance error of the translation sled 81 is a prerequisite for low-error measurement.

When measuring with an arrangement according to FIG. 13, the wavelet signals shown in FIGS. 5 and 6 arise. The evaluation of these wavelets corresponds to the description for figure group 8 and the representations of figure group 8.

In relation to the signal evaluation, between an inner and an outer depth scan there is only the difference, in that the phase at the centre of gravity for a geometrically-optically stable triangulation arrangement with an external depth scan is completely independent of the object depth position, therefore is always the same by pixel. On the other hand, with an arrangement with an external depth scan, in spite of adherence to the confocal condition—therefore the coincidence of the images of the array-side displacement paths in the object space—depending on the quality of the optical device, particularly the correction in depth, there may be certain changes of phase at the centre of gravity depending on the actual depth of an object point. In a well-designed optical system with regard to telecentricity with a digital aperture of less than 0.15, more certainly with a digital aperture of below 0.1, the dependence of the phase on the centre of gravity of the actual depth position can be achieved.

FIG. 14 illustrates the arrangement according to FIG. 13 now with illumination on two sides. There is at least one counterbearing not shown for the translation sled 81 to minimise the guidance error. Also the average of the mechanical stiffening of the device, to prevent a rocking of the linear grating 21, 22, 25, 26 in the depth scan, are not represented here. Also as a result, wavelets emerge that are already illustrated in FIGS. 5 and 6. Also here, evaluation of these wavelets corresponds to the description for figure group 8 and the illustrations of figure group 8. This also applies to all further arrangements in which two wavelets are generated.

In a further illustrative example (3), based on FIG. 14, however without figure, instead of the two—as in FIG. 14—now four projection beam paths arranged at 120° are arranged, to minimise extensively the shadowing effects for deep-formed measured objects, for example, in conical pyramids or in freeform formation.

In a further illustrative example (4), based on FIG. 14, however, without its own figure, instead of the four linear gratings 21, 22, 25 and 26—as in FIG. 14—only the linear gratings 21 and 26 or the linear gratings 22 and 25 are arranged. Therefore, in this case, only respectively one wavelet occurs in the detection beam path. The precondition for this is then, however, a projection optical device with an object-side digital aperture NA_PO of at least NA_P0=0.08 or better 0.1 is to be used. In the latter case, the number of periods under the envelope is $$n\_FW\_00 \approx 1.22 * \tan(45°/0.12 \approx 12.2.$$

For a multiple of rather cooperative measured objects, also with such a measurement arrangement with only one wavelet, satisfactory measurements can also be taken.

In FIG. 15a for the arrangement with an internal continuous depth scan, the triangulation angle is 30°. Therefore with the digital aperture of the projection beam path NA_P0=0.04, according to equation 1, a number n_FW_00 of 17.6 is produced. Furthermore, for a mapping scale of −1 and from the triangulation angle of 30° a deflection angle delta of delta=180°−2beta is produced, so that the movement paths of BS_A run parallel to the translation axis TA, by which the confocal condition is also met in this case.

In FIG. 15b an arrangement with an external continuous depth scan is illustrated. The triangulation angle is 30°. This measurement arrangement is attached to a 3-coordinate measuring machine and uses its possibilities for a highly-precise external depth scan.

FIGS. 16a to 16g respectively show example triangulation arrangements with an internal depth scan, wherein in the projection beam path at least two plane mirror surfaces are arranged in the form of an angled-mirror arrangement. The triangulation arrangements may be used with the wavelet approach, wherein one or more wavelets are generated and may be used for measurement.

Figure 16A:
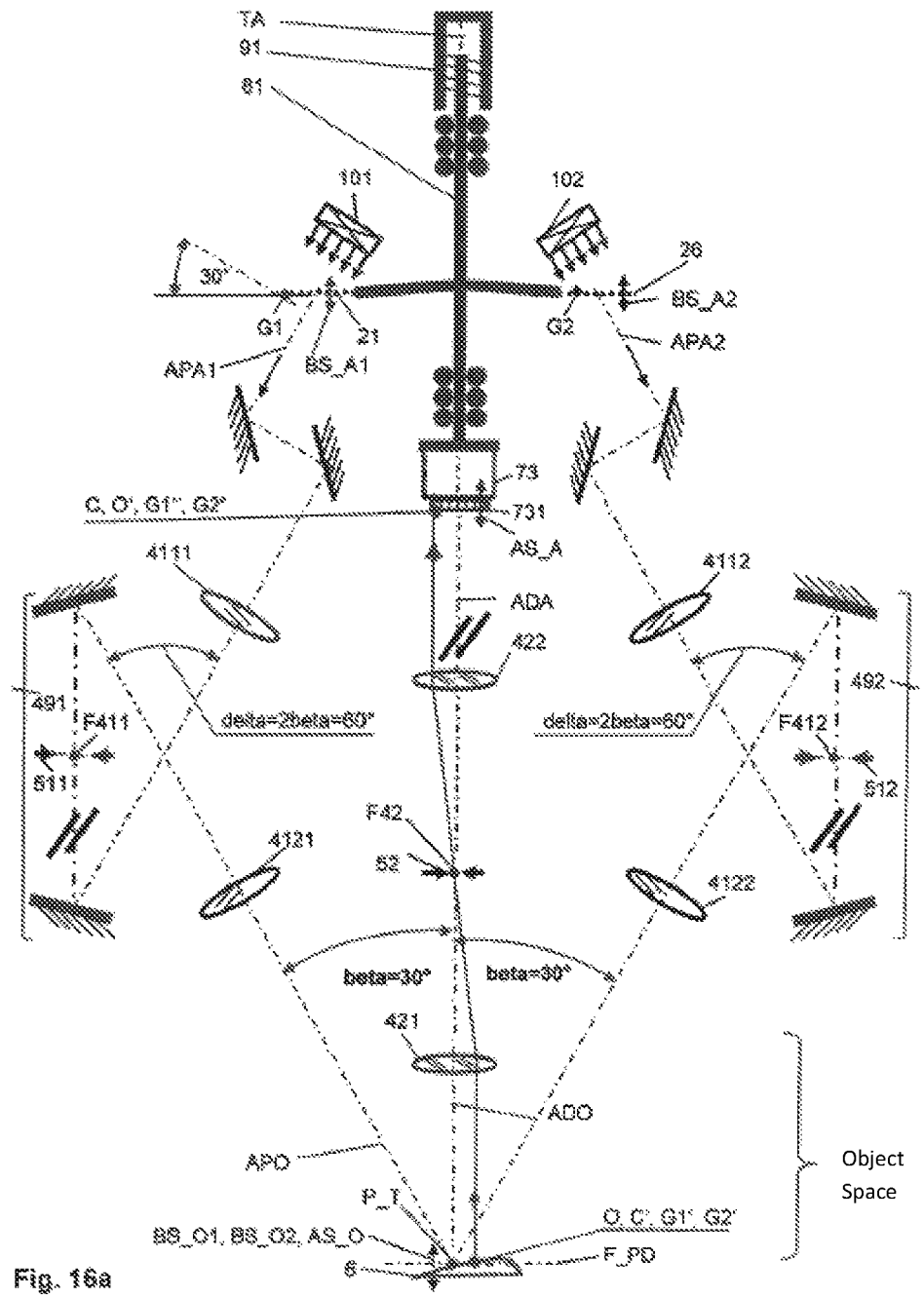

In an illustrative example according to FIG. 16a with beta=30° with a high aperture of the projection beam path of NA_P0=0.06 respectively only one linear grating is arranged in each projection beam path. In this case, then only the linear grating 21 and the linear grating 26 are used and only respectively one wavelet emerges. The deflection angle delta is 2beta=60°.

In an illustrative example (5), based on FIG. 16a, also only one linear grating may be positioned symmetrically on the axis TA, which is then illuminated by two light sources from various directions—according to the directions illustrated in FIG. 16a. However, it can give crosstalk in the respective projection beam path not to be illuminated. The usage of slightly different centre of gravity wavelengths in both projection stages with band-stop filters for the wavelengths of the respectively unwanted light in the other beam path justify this effort, which also generally entails a further effort in terms of design with the translation sled, only in exceptional cases. It is better to optimise the mapping stages for precisely one centre of gravity wavelength with respect to distortion and minimisation of telecentricity errors in the entire measurement volume addressed.

Figure 16B:
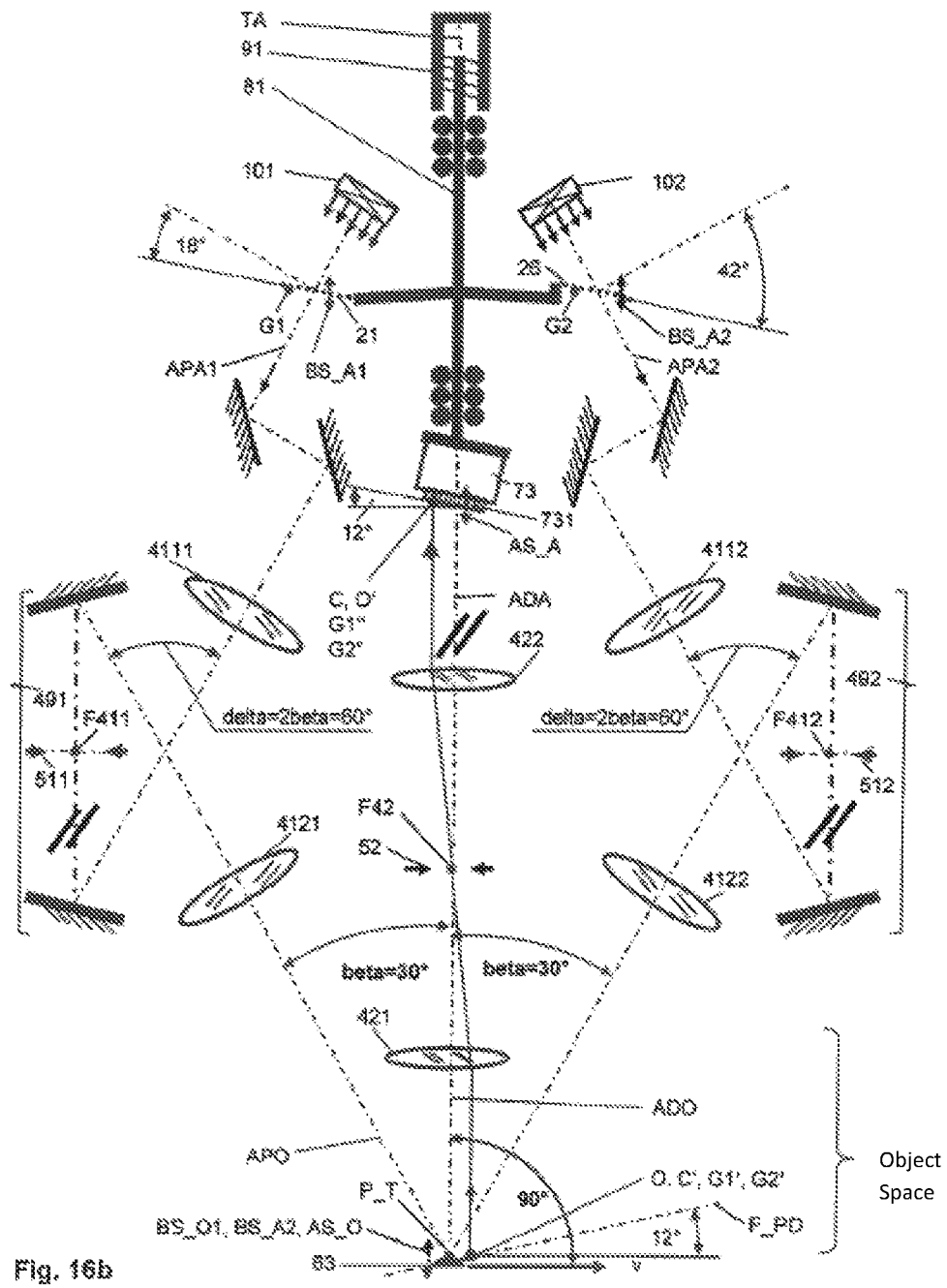

In an illustrative example according to FIG. 16b, also with beta=30 and an mapping scale factor equal to one, the measurement level is inclined by 12°. To enable a common focal plane in the object space, the camera chip 731 and the linear gratings 21 and 26 are also inclined by 12°. The digital apertures in both beam paths are respectively 0.1 (NA_P=NA_D=0.1), to create a prerequisite of being able to operate the camera with a high image frequency of 1 kHz. The depth measurement range is co-determined by the camera chip length in the feed direction v and is produced in the case because of the inclination angle of 12° and the mapping scale factor of one to hardly a fifth of the camera chip length, as pre-running and post-running are needed for the measurement. The translation sled 81 in this case is only used for the singular focusing or refocusing. Between a solder bump 63 as a measured object and the triangulation arrangement, there is a lateral movement at least approximately perpendicular to the optical axis ADO. This lateral movement is measured and controlled and is synchronised with the camera, so that pixel-tracking can be performed, as is already described in DE 103 21 888 A1. A wavelet is always produced from a virtual pixel, which respectively follows along and detects the same object point. As there is only one camera, the separation of both project channels is to be considered. In this case, projection is done alternately in time right and left.

In another illustrative example (6), however, work can also be done with spectral separation of the left and right channel, by forming the camera as a two-chip camera with colour splitter. The colours bright red and dark red are then used, which respectively originate from high power LED lighting. The feed speed of the measured object is finally only determined by the available quantity of light and the image rate of the camera, and the computer power of the system, and when using corresponding high-power components for the lighting, mapping and image recording, as well as controlling the movement, it has the potential for feed speeds in the order of magnitude of 0.1 m to 1 m per second for the class of solder bumps.

Figure 16C:
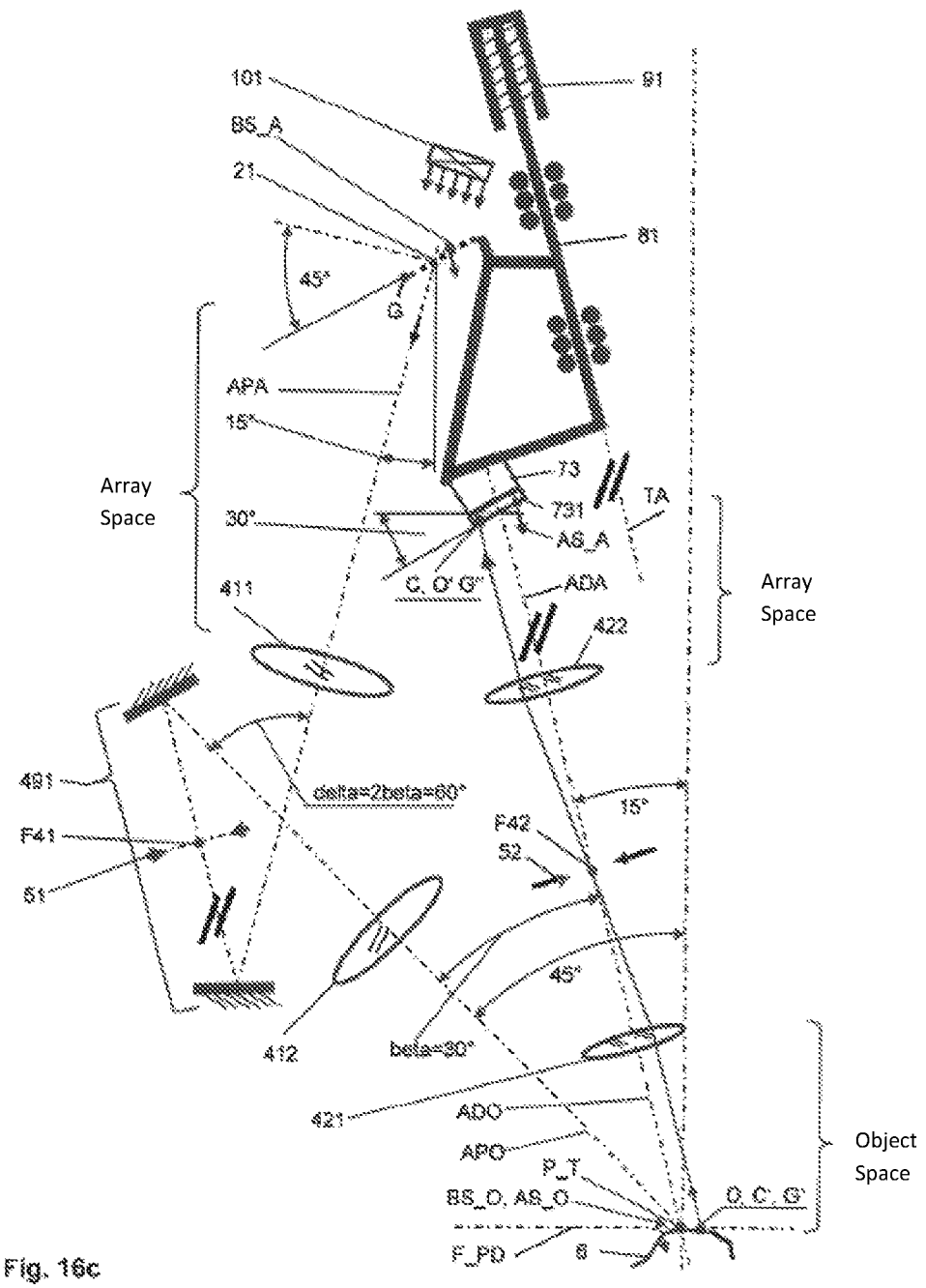

In an illustrative example of the internal depth scan to FIG. 16c an arrangement according to FIG. 16a is tipped by 15°. So the mapping scale factor in this case is 1 in both mapping stages. The deflection angle delta is 2 beta=60°. The focal planes always remain connected in the depth scan. With sufficiently large aperture openings that allow a digital aperture of 0.1, work can be done with only one linear grating, as only around 10 periods occur under the envelope of the contrast function.

Figure 16D:
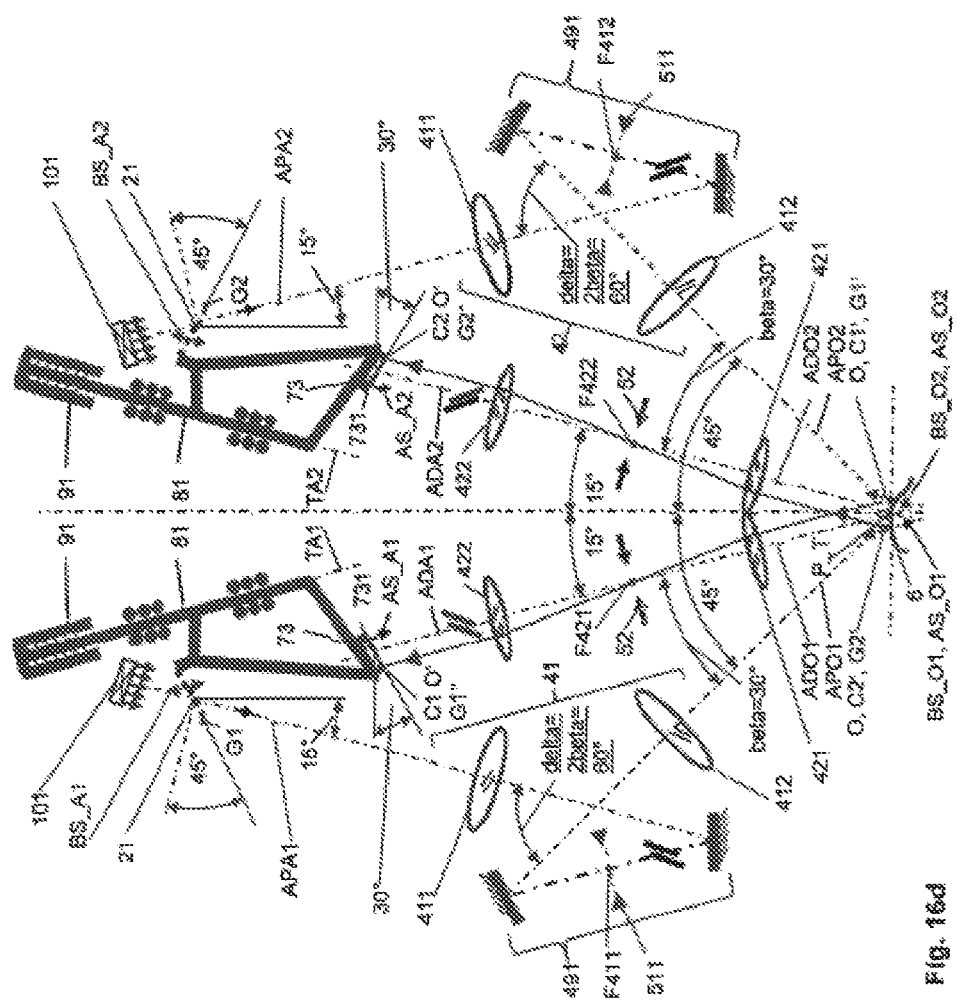
Figure 16E:
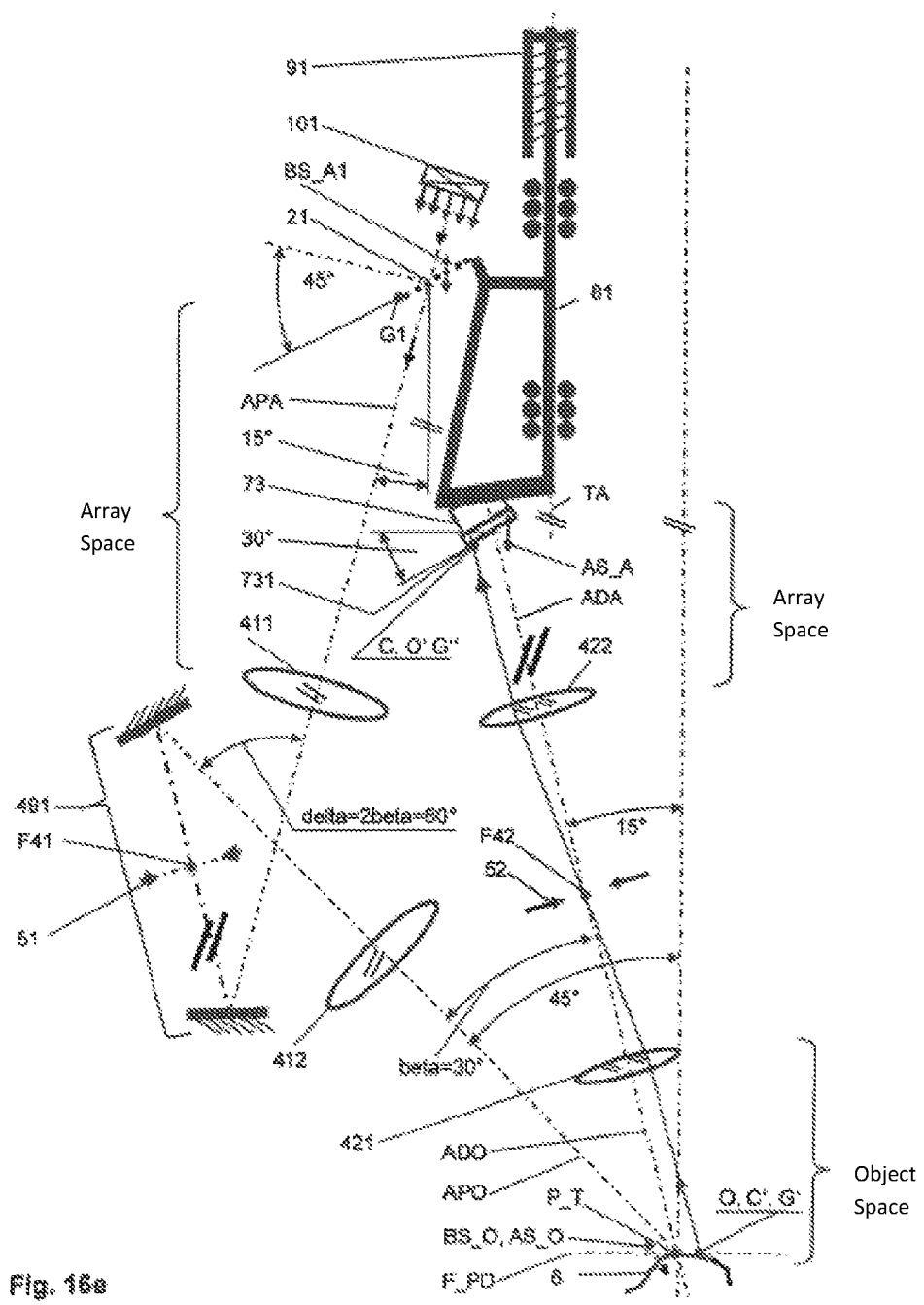
Figure 16F:
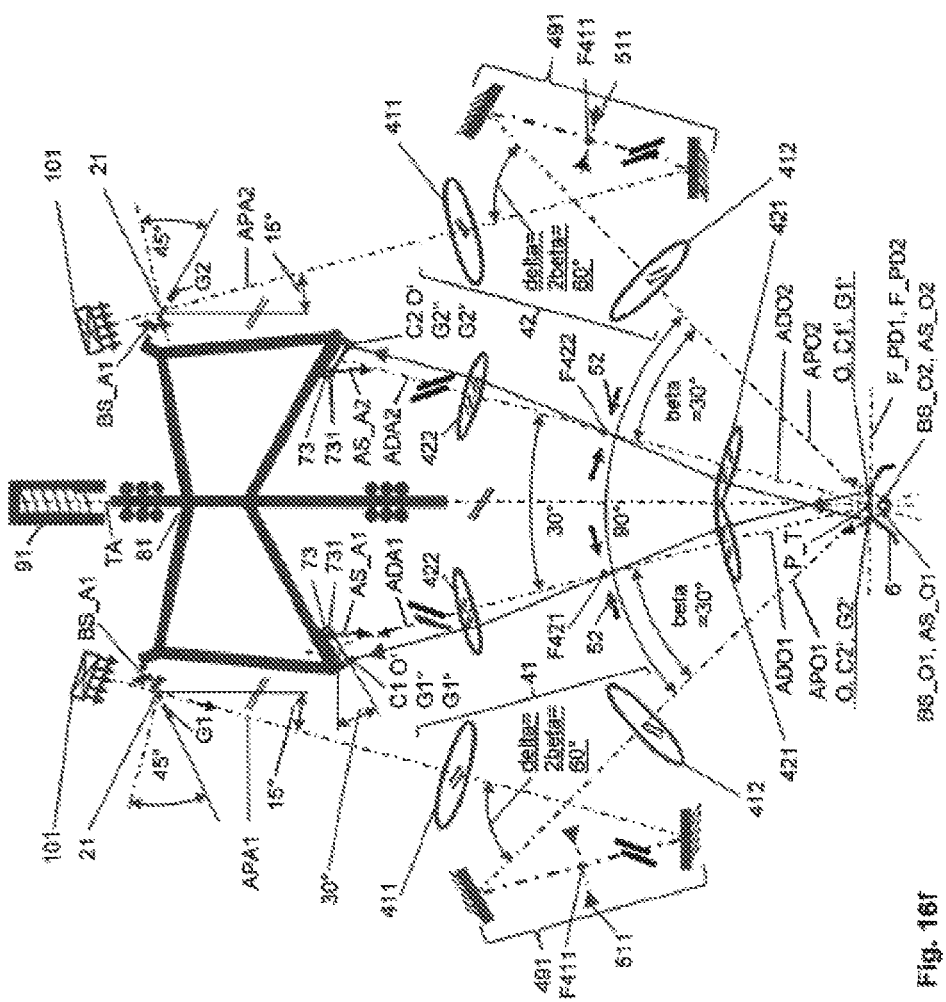
Figure 16G:
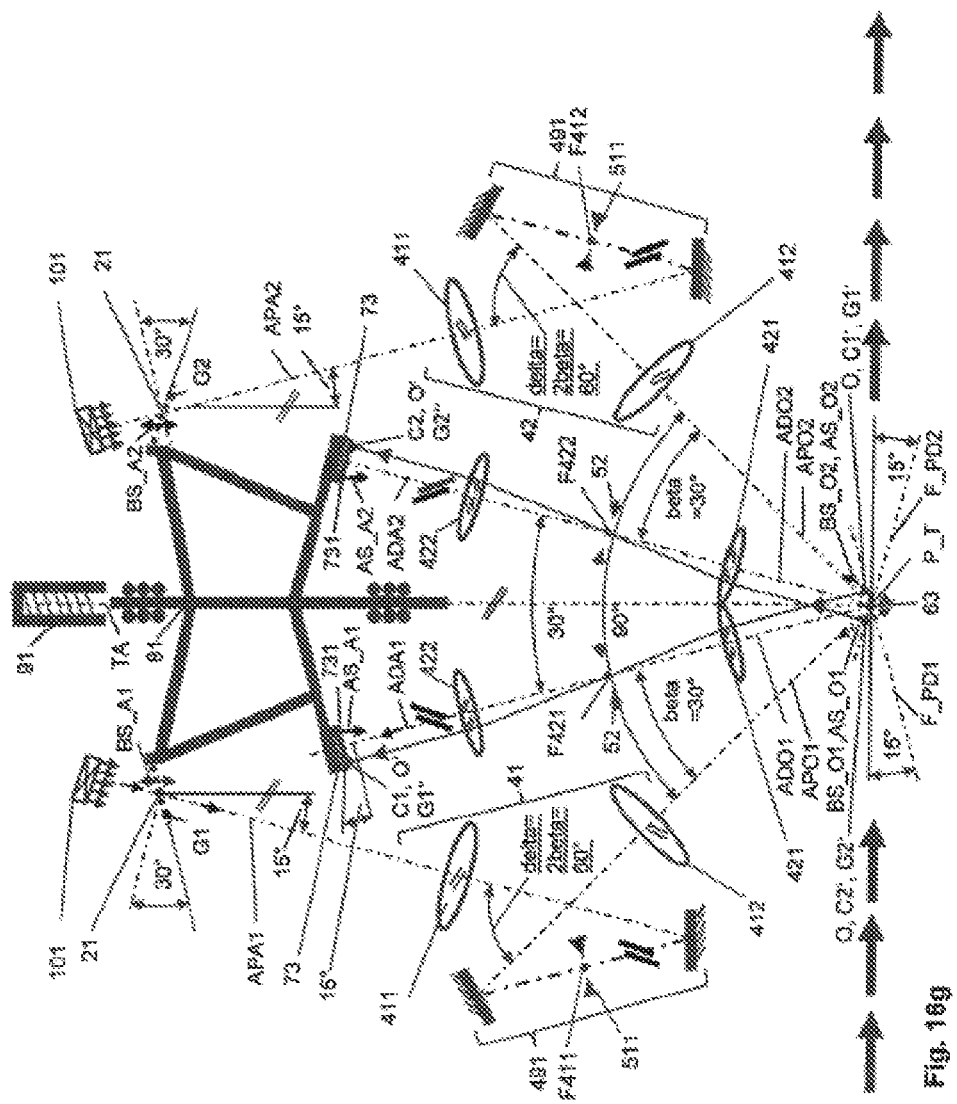

In an illustrative example according to FIG. 16d, the arrangement has been doubled. By doubling, the side region of a measured object 6 can also be surveyed. However, to do this, two translation sleds 81 are needed.

In an illustrative example with an internal depth scan according to FIG. 16e the translation sled 81 is perpendicular to the translation axis TA. The deflection angle delta is 2beta=60°. The translation axis TA represents the angle bisector to the optical axes APA and ADA. Therefore, the depth movements are of the same amount and the focal planes always remain connected in the depth scan, as also the Scheimpflug condition is maintained with the inclination of linear grating 21 and camera chip 731. This arrangement may also be applied with an external depth scan or with the lateral scan of a moved measured object with stationary arrangement. The wavelet to be obtained in the depth scan from the image stack has fewer periods than for the previous arrangements according to FIGS. 15 to 16d, as instead of 30° it is only 15°, so the number of periods below the envelope n_FW is only about 50% of the amount just mentioned. Even in this case, the confocal condition is maintained, as the displacement paths are optically conjugated, i.e. the phase on the centre of gravity is ideally independent of the specified depth position of an object measurement point and always the same. However, the BA_O paths do not aim into the centre of the pupil but are skew. Therefore, there must be pixel tracking so that work is done with a virtual pixel, which is allocated to the mapping beam in the depth scan. Nevertheless, the approach may also be used here, to use the stored phase phi_R_CoG at the maximum of the reference measurement with the object measurement as depth location for determining the depth.

The usage of two translation sleds 81—as represented in FIG. 16d—is superfluous, by a doubling of the optical arrangement being made according to FIG. 16e. That is illustrated in FIG. 16f. This arrangement can be with an internal depth scan or even an external scan. Or with depth scan or lateral scan of a moved object with stationary arrangement. The advantage of the two-sided illumination and two-sided detection is that also perpendicular surface regions of a measured object 6 may be measured. With a mapping scale of the projection levels beta_dash_P and the detection levels beta_dash_D respectively of amount one, even in this case the focal planes in the depth scan always remain coupled for all beam paths, as APA1 and APA2, as well as ADA1 and ADA2 are inclined respectively by 15° to the translation axis TA. Even in this case, the confocal condition is maintained, as the displacement paths are optically conjugated, i.e. the phase on the centre of gravity is ideally always the same. However, the BA_O paths do not target the centre of the pupil but are skew, as there is an angle of 15° between the translation axis and TA and the optical axis ADA. Therefore, there must be pixel tracking so that work is done with a virtual pixel, which is allocated to the mapping beam in the depth scan by calculation. For a comparably small field of e.g. 8 mm diameter, a digital aperture NA_P0=0.08 may be achieved. Thus a half-inch camera may be used. The digital aperture of the projection beam path NA_DO may also be NA_DO=0.08.

In another illustrative example (7) on the basis of FIG. 16f without figures, each partial beam path exhibits its own translation sled 81.

In an illustrative example according to FIG. 16g there is an external object transverse movement with focusing. In an illustrative example according to FIG. 16f, the focal planes are crossed. Even in this case, there is the advantage that also perpendicular surface regions can be measured.

In another illustrative example (8) on the basis of FIG. 16g without figures, each partial beam path exhibits its own translation sled 81.

FIGS. 17 and 18 show respectively example triangulation arrangements with an internal depth scan, wherein in the projection beam path, at least two plane mirror surfaces in the form of a 90° angled mirror or pentaprism 4131, 4132 are arranged.

In FIG. 17 the mapping scale factor beta_dash for the projection stage is modulus(beta_dash_P)=0.5. By using a 90° pentaprism 4131, 4132, the deflection angle delta to 90° is produced. So that the images BS_O in the object space of the paths of displacement BS_A with the paths AS_O in the object space coincide, to meet the confocal condition, the relationship for the mapping scale beta_dash and the triangulation angle beta $$\text{modulus}(\text{beta\_dash\_}P) = \tan^2(\text{beta})$$

must be upheld.

Thus, from this relationship, a triangulation angle of 35.3° is produced. So that also the focal planes in the depth scan always remain together, the mapping scale factor must be adapted for the detection stage. In this case it is by 0.6. The digital apertures in the object space are NA_P0=0.5 and NA_DO=0.033. The inclination of the linear grating in this geometry then produces 19.5° from the Scheimpflug condition. The linear gratings 21 and 25 in this case exhibit a grating period of 60 μm and the linear grating 22 and 26 a grating period of 72 μm. By selecting the triangulation angle, deflection with pentaprism and selection of the mapping scales, therefore, it is advantageously achieved that the focal planes in the depth scan always coincide in the depth scan. That is achieved by matching the depth mapping scales from the projection and detection beam path, which are somewhat different here. It is not advantageous if, for profiled objects, the digital aperture NA_D is much greater than the digital aperture P-NA, as then an object point is "washed out". The best thing for the lateral resolution thus produced for the measured object is using a linear grating that is as fine as possible, and selecting the digital aperture NA_PO markedly higher than the digital aperture NA_DO. Then the extent of the wavelet in depth is really limited and the speckle effect is also further reduced. For classic shape objects with few fine profile structures, however, this is rather uncritical. However, the use of finer linear gratings requires a higher mechanical and thermal stability of the structure. If the linear grating is selected too fine and the mechanical and thermal stability of the structure is not there, the phase at the centre of gravity is not constant and a redetermination of the reference phases at the centre of gravity of the envelope must frequently occur. The constancy of the phase at the centre of gravity is independent on the depth position of an object point—as a positive result of maintaining the confocal condition, therefore also a criterion for testing the mechanical and thermal stability of the structure. After a run-in time, no "running away" of the phase must occur over time at the centre of gravity. This may be achieved by a construction, erected under the principles of mechanics and thermodynamics, by using thermal compensations of the material expansion.

The illustrative example according to FIG. 18 is based on the geometric formation of illustrative example 17. This leads to the same mapping scale factor for the projection stage modulus(beta_dash_P)=0.5 and using a 90° pentaprism according to the relationship $$\text{modulus}(\text{beta\_dash\_}P) = \text{square}[\tan(\text{beta})]$$

for the mapping scale beta_dash and the triangulation angle beta for 90° deflection also at an triangulation angle of 35.3°. So that also the focal planes in the depth scan always remain together, the mapping scale factor must also be by 0.6 in this case for the detection stage. A markedly greater aperture than in the illustrative example according to FIG. 17 in the projection beam path of NA_P0=0.075 in this case leads to the sensible usage of only respectively one linear grating in the projection beam path. So, in this case, only the linear grating 21 and the linear grating 26 are used. It occurs about 11.5 periods below the envelope, which must not allow the known 2Pi phase jumps to occur with cooperative, edge-free measured objects. The greater aperture also creates advantages with regard to the quantity of light, enables a comparatively fast measurement, but leads to extensive optical mapping stages with generally a higher distortion and non-perfect telecentricity of the same, so that with considerable distortions the calibration is more expensive.

FIG. 19 illustrates a triangulation arrangement with an external depth scan with two linear gratings. The linear grating 21 exhibits a grating period pd1 of pd1=50 µm and the linear grating 24 is a comparatively coarse linear grating with a grating period of 300 µm. In this case, the main aim is to get to a measured result rapidly. The principle of spectral separation of the channels is used, so that both linear gratings 21 and 24 are projected in the object space at the same time. The cold light sources 110 and 113 are switched on concurrently and so the short and the long wavelet are recorded concurrently. A 2-chip colour camera 74 with a bandpass colour splitter for the transmission of cyan-coloured light and the reflection of light arranged outside the colour cyan and with a chip 741 for the filtered, structured cyan-coloured light and with an RGB chip 742 with Bayer filter for white, rather unstructured light are arranged. If both the structure of the fine linear grating 21 and the structure of the coarse linear grating 24 is applied to a quartz substrate then the adjustment of focus is only done by means of the fine linear grating 21. The contrast function of the coarse linear grating 24 is not evaluated. Only the contrast function of the fine linear grating 21 is evaluated.

FIGS. 20 and 21 illustrate the fine linear grating 21 and the coarse one 24 for the arrangement according to FIG. 19. In this case, both linear gratings are in phase in the centre of the measurement region. By the approach with the spectral separation, the fine linear grating 21 and the coarse one 24 concurrently contribute to the structured illumination of the measured object.

FIGS. 22 and 23 illustrate the wavelets produced for a fine linear grating 21 and a coarse one 24. A situation is shown in the centre of the measurement region. Due to the spectral approach from FIG. 19, each wavelet is extracted from its separate image stack.

FIGS. 24*a* to 24*d* show, analogous to FIGS. 8*a* to 8*e* the ratios for a coarse linear grating with the grating period p_2_g. Even in this case, in the region of the large modulation of wavelet W1, generated by means of the first linear grating, there is only one phase pair of the two linear gratings, which fits the reference measurement. The modulation from the coarse wavelet W2 is not evaluated at all, as the envelope is much too wide.

According to experience, even under extreme conditions, no depositions delta_z_non-coop occur on measured wavelets, which are more than +/−0.16 FW_00. Consequently, generally an unambiguity range EDB of +/−0.2 FW_00 is sufficient in both arrangements shown in FIGS. 2 to 23. With the range of +/−0.2 FW_00, you are already approaching the value of the half-value width of the wavelet. The unambiguity range EDB corresponds to the collection range for determining therefore "collecting" the "correct" phase pair, the phase relation of which has been determined in the reference measurement.

FIG. 25 shows a triangulation arrangement with an internal scan arrangement with a ferro-electrical liquid crystal 54 arranged in the aperture plane that serves as a controllable aperture. The displacement v_BZ of the centre of the aperture generated by means of the same is illustrated in Details 25.1 and 25.2. The mapping scale factor is one. The images BS_O and AS_O of the displacement paths in the array space BS_A and AS_A coincide in the object space and after a single adjustment, the focal planes in the object space are always connected in the depth scan, which forms a good prerequisite to work with the wavelet approach, as then the phase cannot or hardly changes in depth. By means of the ferro-electric liquid crystal 54, the aperture centre is displaced, which affects the triangulation wavelength by variation of the triangulation wave angle and finally also the period pw_1 and pw_2 in the wavelets, as illustrated in FIGS. 26 and 27. FIGS. 26 and 27 show the wavelets W1_SLM and W2_SLM already known from FIGS. 5 and 6, which also arise in the depth scan in this case. The evaluation of the wavelets corresponds to the description for figure group 8 and the representations of figure group 8.

The triangulation arrangement according to FIG. 28 is formed with an internal depth scan, that is conducted "on the fly". The triangulation angle is beta=45°, by which here a deflection angle of delta=beta=45° is produced. This beam deflection about the angle delta is achieved in each case by means of a two-mirror angled-mirror group 44 and 45. The projection beam path is unfolded and is perpendicular to the focal surface F_PD. In so doing, the optical axes APA and ADA1 as well as ADA2 in the array space are parallel lines. The difference between the plane mirror surfaces between the projection and the detection beam path here is equal to two, whereby a further compensation of the transverse guidance error of the translation sled 81 is produced. The measured object 6 is detected on both sides by means of a comparatively large monochrome camera 73. An advantage of the internal depth scan can be recognisable here: Observations can be made with two cameras, wherein the images are not laterally shifted on the camera in the internal depth scan. By means of the liquid crystal display 213, two linear grating structures are switched alternately. With an external depth scan and two cameras for detection with mutually inclined beam axes, there is always a lateral displacement of the image at least on one camera.

The periods of the linear grating shown on the spatial light modulator (SLM) 23 are in beat frequency and exhibit here 12 pixels and 16 pixels for each grating period. The pixel pitch is 6.8 µm. Therefore, p_1=81.6 µm and p_2_f=108.8 µm. The mapping scale factor of the telecentric projection beam path is beta_dash_P=0.25 and the mapping scale factor of the telecentric detection beam path according to equation (2) is beta_dash_P=0.21. In the depth scan, an alternating projection of a first and a second linear grating structure in undertaken. It starts with the position of the linear grating structures according to FIG. 29, where on the reference line Rz respectively the phase is zero, as an intensity maximum of a bright strip. In FIG. 29 the colour black represents the intensity maximum. Between each image recording, the depth position of SLM 23 and camera 73 are respectively offset by ⅛*(p_1+p_2_f) until the strip contrast is against zero. This corresponds here to a depth adjustment between two image recordings of 23.8 µm. For each new image recording of the linear grating 1 or 2, a grating structure is entered, the phase difference of which is Pi/2 (90°) to the same grating structure above. So there are intensity values to determine the phase position for each pixel multiple times and also the contrast is to be determined multiple times, finally to be able to determine the strip order for each pixel as well. To do this, the known 5-phase evaluation algorithm may be used according to Schwider-Hariharan or, for example, a 7-step algorithm according to Peter de Groot advantageously. This is on page 4727 of the specialist article [7] "Derivations of algorithms for phase-shifting interferometry using the concept of a data-sampling window" that is published in the specialist journal Applied Optics 34 (22), 4723-4730 (1995). The 7-step algorithm described there is, as well as the constant phase adjustment errors, also as far as possible insensitive to the effect from the drop of contrast by defocusing, as is the case with the wavelets described here.

On the other hand, a sequence of images may occur in the forward running with depth steps of (p_2_f)/4 corresponding to 27.2 μm here. In this, there is only the projection of the second linear grating structure. This happens respectively with a phase step between the image recordings of respectively Pi/2 for this second linear grating structure, which means a displacement of the linear grating structure by 4 pixels. Then, on the return run with depth steps of (p−1)/4, which corresponds to 20.4 μm here, only the first linear grating structure is projected. This happens respectively with a phase step between the image recordings of respectively Pi/2 for this first linear grating structure, which means a displacement of the linear grating structure by 3 pixels in this case. From the two image stacks, signals can be extracted by pixel which represent the scanning points of a wavelet. The evaluation is then done wavelet-based. Angled-mirror prisms 448 and 458, illustrated in details 28.1 and 28.2 may also be used, wherein the image displacement is to be considered by its glass path lengths in the design of the optical device. To calibrate the arrangement, before the object measurement, a reference measurement is conducted by means of a level, well light-scattering plate at various object depths.

FIG. 29 shows the display of a liquid crystal display 23 (as an example of a spatial light modulator) for usage in an arrangement according to FIG. 28. Illustrated are both—at different times t1 and t2—entered somewhat different linear grating structures at the start of the measurement that are respectively symmetrical to a reference line Rz. On the reference line is the maximum of one strip which illustrates the reference strip for each of the two linear grating structures. This is independent on whether there is also an object at this location. The fine phase for the illuminable pixels is always determined in this position of the linear grating structures. This location therefore corresponds to the 3rd intensity value with the 5-phase evaluation algorithm mentioned above, according to Schwider-Hariharan or the 4th intensity value with the 7-step algorithm [7] mentioned above according to Peter de Groot. Or with a (2n+1) phase shift algorithm with n=1, 2, 3, 4, 5 respectively to the intensity value (n+1).

In another illustrative example (9) without figure, further linear grating structures may also be recorded in the liquid crystal display 23, for example a third linear grating structure in beat frequency to the first and second linear grating structure which advantageously, with an intensity maximum of the linear grating structure are on the reference line Rz, therefore symmetrical to the remaining strip patterns. A third linear grating structure may increase the reliability of the evaluation further, which then, as appropriate, may also come without the information on the strip contrast. However, this approach is markedly more time-consuming than the approach when using the contrast information in the intensity data. Also recording a Gray code structure in the liquid crystal display 23 is feasible, as well as using a first fine linear grating structure.

In FIG. 30 a triangulation arrangement with an internal depth scan is presented, in which the triangulation angle is 45°. In the projection beam path, an angled mirror arrangement 47 with two plane mirrors 471, 472 is arranged, which deflects the beam path by 45°. The detection beam path is unfolded and therefore the optical axis of the projection beam path APA and the optical axis of the detection beam path APO are parallel lines in the array space and the detection beam path is perpendicular to the focal plane F_PD. On the other hand, the axis of the projection beam path is inclined in the object space. The spatial light modulator 23 is also inclined to fulfil the Scheimpflug condition. So the focal surfaces of P and d are always parallel in the object space. By selecting the size of the mapping scales of projection and detection beta_dash_P and beta_dash_D, the focal surfaces coincide after adjustment of the arrangement in the plane F_PD. This applies to the entire depth scan region for which, however, strict telecentricity of the optics must also exist.

The arrangement according to FIG. 31 with an internal depth scan is based partly on arrangement 16a. In FIG. 30, a computer-controlled rotating linear grating 27 with the grating period p=60 μm is used, which can be rotated from the normal position, with 90° arrangement of the grating lines to the triangulation base, by the angle of rotation psi clockwise.

So, for the first linear grating rotational position, an angle of rotation of, for example psi_1 is equal to 40. So, the effective grating period is increased by 1/cos 40° compared with normal position on p_1=60/p cos 40°-78.32 μm. With this computer-controlled rotating linear grating 27, a first depth scan is conducted and a wavelet W1 is recorded (for this see also FIG. 8d). After this depth scan, the linear grating 27 is turned somewhat further by means of a computer-controlled drive 92 for the rotational offset, for example by an angle of size 10°, so that an angle alpha_2 is then set at 50° compared with the normal position. So a different effective period of the linear grating results which then is p_2_f=p/cos 50°=93.34 μm. So, a first fine grating period p_1=78.32 μm and then a second grating period p_2_f=93.34 μm may be illustrated and the method described above may be applied, by only conducting a second depth scan with the position of the computer-controlled rotating linear grating 27 of psi=50°, preferably with the depth scan returning, and a second wavelet W2 is recorded that is then somewhat extended in comparison with the first wavelet W1 in this described case. This means that the first effective grating period p_1 represents the smaller of both grating periods always in this case.

Both positions with the angles of rotation psi 1=40° and psi 2=50° can be achieved highly precisely by mechanical stops 88 and 89 with magnetic force in the direction of a bistable, robust mechanical construction supported such that it can rotate—at least in the partial range of the full circle. This construction supported such that it can rotate includes a computer-controlled drive 92 on which no accuracy requirements must be set, as this only somewhat loosely undertakes the rotation as quickly as possible. Putting into the final position is done by means of magnetic force. Both angle of rotation positions must preferably be secured so they can be reproduced as precisely as possible for at least the time between two calibrations. Advantageous for the wavelet-based evaluation is that the relevant effective triangulation wavelengths do not have to be known exactly, if a calibration is conducted. The reference for measurement is represented by the translation sled 81, which is allocated to a highly-precise stepper motor drive. The crosstalk in the respective other projection beam path is prevented by using various coloured light sources 113a and 114a. A green light source 113a is arranged on the left and a cyan-coloured light source 114a is arranged on the right. Each projection beam path is allocated a bandpass filter 36 or 37, that allows the light from the allocated light source to pass and blocks the light from the channel located opposite. In two forward runs and two return runs with a twisting of the computer-controlled rotating linear grating 27 after the first return run and before the second, two image stacks each are recorded, from which two wavelets W1 and W2 are produced with somewhat different wavelet periods pw_1 and pw_2 for each projection beam path. An adjustment of the computer-controlled rotating linear grating 27 may also be made after each run, so that the recording of the two image stacks is done immediately sequentially and the respective other projection beam path remains unilluminated.

In another illustrative example (10) work is done with a green light source 113a on the left and a cyan-coloured light source 114a on the right and a two-chip colour camera 75 which is equipped with a colour beam splitter arranged in front of it, to measure green and cyan in both spectral channels concurrently, without there being a noticeable crosstalk between the two channels.

In a further illustrative example (11) without figure, based on the arrangement according to FIG. 31, however, without translation sled 81 and drive 91, an external depth scan is conducted, by the entire triangulation arrangement being moved on the sled of a coordinate measuring machine and the length measurement system of the coordinate measuring machine then representing the path reference.

FIGS. 32 and 33 illustrate a rotating grating arrangement in both rotational positions 40° and 50° of the linear grating 27. The magnetic stops 88 and 89 with moderate magnetic force define respectively highly precisely the angular position. The computer-controlled drive 92 for the rotational offset of the linear grating 27 with some looseness or clearance must only be positioned coarsely with clearance, as the magnetic force acts sufficiently attractive, and then the force is applied for resolution, if it is necessary to drive to the other rotational position. For better visibility in the illustration in FIGS. 32 and 33, several lines have been left out in the middle of the linear grating 27.

Other examples relate to an arrangement and a method for depth-scanning strip triangulation with internal or external depth scan, particularly also for the 3D shape measurement in microscopy and mesoscopy. The arrangement and the method make it possible, particularly to increase the robustness of the measurement with wavelet signal generation from the image stack. Furthermore, the occurrence of the known and very undesirable 2Pi phase jumps in the phase map are to be avoided as much as possible. To do this, with a measurement instead of a wavelet at least two wavelets with contrast envelope are generated. This is done by a concurrent—then preferably with spectral separation—or by a sequential projection of two strip images with different triangulation wavelengths onto the measured object.

Furthermore, geometric-optical triangulation arrangements with pairs of mirrors are proposed which exhibit an invariance of the beam deflection in the beam path. By using these pairs of mirrors, the effect of a lateral guidance for a translation system can be reduced with an internal depth scan. At the same time, as a result, the optical path length in the optical beam path can be increased. This extends the focal lengths of telecentric lenses and therefore allows, in the design of the optical device, a good approximation to the case of perfect telecentricity, without expanding the construction space of the arrangement considerably.

List of Formulaic Symbols and Special Terms

| Term or Abbreviation | Definition of Explanation |
|---|---|
| ADA | Optical axis in the detection beam path on the side of the rasterised detector |
| ADO | Optical axis in the detection beam path on the side of the measured object |
| AK | Scanning comb with many support points. Scanning of the wavelet is done markedly finer than the period length of the wavelets, so that the scanning theorem is fulfilled. |
| alpha | Aperture angle of a lens, also edge aperture angle |
| APA | Optical axis in the projection beam path on the side of the array (linear grating), APA1, APA2 |
| APO | Optical axis in the projection beam path on the side of the measured object, APO1, APO2 |
| Array Space | Space where the linear grating or spatial light modulator and camera chip or also several camera chips are located in the optical arrangement. The optical axes ADA and APA are located in the array space. |
| AS_A | Path of shifting of the rasterised detector (camera) in the array space |
| AS_O | Image of the path of shifting of the rasterised detector (camera) in the object space. When meeting the confocal condition with a path BS_O coincides in the object space or is at least parallel to the same |
| AS_Aj | Path of shifting of a pixel j of the rasterised detector (camera) in the array space |
| AS_Oj | Image of the path of shifting of a pixel j of the rasterised detector (camera) in the object space. When meeting the confocal condition with a path BS_Oj, AS_Oj coincides with the shifting in the object space. |
| b_M | Width of the measurement region |
| beta | Total triangulation angle = beta_P + beta_D |
| beta_D | Triangulation angle of the detection beam path, including between the main beam of the detection beam path and the |

| Term or Abbreviation | Definition of Explanation |
| --- | --- |
| | normals of the focal surface to the normals of the plane of the optically-conjugated plane of the detector surface (chip surface). |
| beta_P | Triangulation angle of the projection beam path, including between the main beam of the projection beam path and the normals of the focal surface to the normals of the plane of the optically-conjugated plane of the detector surface (chip surface). |
| beta_dash | Mapping scale in the axially perpendicular surfaces (lateral size, Y-axis)<br>The mapping scale is always determined in the entire document from the quotients Y Array space to Y Object space. |
| beta_dash_P | Mapping scale in the axially perpendicular surfaces (lateral size, Y axis) in the projection, calculated from the array space where the linear grating is situated, in the object space, (Y_Array)/(Y_Object) |
| beta_dash_D | Mapping scale in the axially perpendicular surfaces (lateral size, Y axis) in the detection, calculated from the array space where the camera chip is situated, in the object space, (Y_Array)/(Y_Object) |
| BS_A | Path BS_A of the shifting of the linear grating |
| BS_O | Image of the path BS_A of the linear grating in the object space<br>When meeting the confocal condition with the path BS_O, ASO coincides with the object space. |
| BS_Aj | Path BS_Aj of the shifting of an element j of the linear grating |
| BS_Oj | The image of the path BS Aj of the shifting of an element of the linear grating in the object space<br>When meeting the confocal condition with a path AS_Oj (image of the path of shifting of a pixel j), BS_Oj coincides with the shifting in the object space. |
| BZ_1(t1) | Aperture centre 1 of the detection at time point t1 |
| BZ_2(t2) | Aperture centre 2 of the detection at time point t2 |
| CE | Contrast envelope |
| CE_O | Contrast envelope of an object measurement |
| CE_O_symm_i | Symmetrical contrast envelope of an object measurement for an object point i |
| CE_O_asymm_i | Asymmetrical contrast envelope of an object measurement for an object point i |
| CE_R | Contrast envelope of a reference measurement. This must be at least approximately always symmetrical. |
| CoG | Centre of Gravity (of the contrast envelope) |
| delta | Deflection angle in the beam path and/or the total deflection angle ("kink angle" of the optical axes) |
| delta z_T | Mechanical shifting of the translation sled 80 or 81 |
| delta z_CoG_coop_Ave_i | Deposition of the centre of gravity (CoG) detected from the middle of the wavelet of a cooperating measured point, detected by pixel i |
| delta_z_CoG_non-coop_Ave_i | Deposition of the centre of gravity (CoG) detected from the middle of the wavelet of a non-cooperating measured point, detected by pixel i |
| delta_z_CoG_12_f_i | Difference in the positions of the centres of gravity of both fine wavelets, detected by pixel i<br>That is a quality criterion. Ideally delta_z_CoG_12_f_i = 0.<br>The smaller delta z_CoG_12_f_i is, the better.<br>Meeting the condition:<br>delta_z_CoG_12_f_i < 1/10 p_1 is already deemed to be very good. |
| delta_z_O_i | Distance of the object measurement point i from reference measurement point i, detected by pixel i<br>delta_z_O_i is produced from the scanning path in the z direction according to the reference and object measurement conducted over the calculated depth positions. |
| delta_z_RO_1_CoG_i | Difference in the positions of the centre of gravity of both fine wavelets (W_O_1_i and W_R_1) from the reference measurement and object measurement, detected by pixel i<br>Ideally delta_z_RO_1_CoG_i = delta_z_O_i.<br>Good is:<br>Modulus(delta_z_RO_1_CoG_i − delta_z_O_i) < 1/10p_1,<br>Still acceptable is:<br>Modulus(delta_z_RO_1_CoG_i - delta_z_O_i) < 1/10p_1, |
| delta_z_sc | Scanning increment in the scan [μm] |
| EDB_pw | Unambiguity range in micrometres that is given by the period pw |
| EDB_12 | Unambiguity range in micrometres (generally narrower than FW_00) given by double wavelet with two fine periods<br>EDB_12 is produced from the calculated beat frequency of the periods pw_1 and pw_2, therefore is equal to pw_12. |
| EDB_2_g | Unambiguity range in micrometres (generally narrower than FW_00) given by double wavelet with one fine period and one coarse period<br>(EDB_2_g is produced from the coarse period pw_2g in the case where a coarse linear grating is used, therefore the following applies: EDB_2_g = pw_2g. |

-continued

| Term or Abbreviation | Definition of Explanation |
|---|---|
| F_PD | Common actual focal plane of the projection and detection beam path in the object space that is shifted in depth in the depth scan |
| Confocal Condition | Meeting the confocal condition in the depth scan leads to a permanent coincidence in the object space of an image of a pixel of the rasterised detector with the image of an element of the linear grating, by which the images BS_O and AS_O of all shifting paths (BS_A and AS_A) permanently coincide in the object space. Meeting the confocal condition in the internal depth scan is done by selecting the shifting BS_A and AS_A considering the geometry of the optical arrangement. The advantage of meeting the confocal condition exists in the constancy of the phase — at least approximately independent of the depth position of a measurement point - at the centre of gravity of the contrast envelope of a generated wavelet. This represents a very big advantage in the evaluation of wavelets. |
| NA_DA | Digital aperture in the detection beam path in the array space |
| NA_DO | Digital aperture in the detection beam path in the object space |
| NA_PA | Digital aperture in the projection beam path in the array space, also NA_PA1 and NA_PA2 |
| NA_PO | Digital aperture in the projection beam path in the object space, also NA_PO1 and NA_PO2 |
| n_EDB_12 | Number of fine periods with the period length p 1 (first linear grating 21) in the unambiguity range EDB_12 |
| n_EDB_2_g | Number of fine periods with the period length p 1 (first linear grating 21) in the unambiguity range EDB_2_g |
| Strip Triangulation Measurement Arrangement | Planar measuring triangulation measurement arrangement |
| FW_00 | Full width of the contrast envelope function in micrometres, from the first zero point on the left to the first zero point on the right of the contrast function, see Fig. 5 |
| F-Plane_DO | Focal plane of the detection beam path in the object space |
| F-Plane_PO | Focal plane of the projection beam path in the object space |
| F_PD | Coincident focal plane of the detection beam path and the projection beam path in the object space |
| kappa_D1, kappa_D2, | Amount of the angle between the surface normals of the rasterised detector (731) and the optical axis of the detection beam path (ADA) |
| kappa_P | Size of the angle between the surface normals of the spatial modulator (23) and the optical axis of the projection beam path (APA) |
| Continuous or Quasi-Continuous Scan | Between two image recordings of the measured object by means of rasterised detector there is always one depth movement, or always one depth movement step or always one movement step at least with one depth component. |
| n_FW_00 | Number of periods n over the full range (full width) of the contrast envelope, therefore from zero point to zero point, see Fig. 5
n_FW_00 ≈ 1.2 * [tan(beta_P) + tan(beta_D)] / NA_max |
| Object Space | Space between the measured object and the optical front elements — generally lenses — of projection and detection beam path. The optical axes ADO and APO are located in the object space. |
| p_1 | 1st grating period that is always a fine grating period.
The 1st grating period p_1 is also always the smallest grating period in the arrangement — as fixed assumption in this document, p_1 is therefore smaller than p_2_f or even p_2_g.
p_1 is represented by a fixed linear grating or by a spatial light modulator. |
| p_2 | 2nd grating period which is always larger than p_1 and may preferably be a fine or a coarse grating period.
p_2 is represented by a fixed linear grating or by a spatial light modulator. |
| p_2_f | 2nd grating period that represents a fine grating period.
By definition, p_2_f is always greater than p_1.
p_2_f is represented by a fixed linear grating or by a spatial light modulator. |
| p_2_g | 2nd grating period, which is always represented here as a coarse grating period, therefore in relation to p_1 and p_2_f.
p_2_g is always greater than p_1 and p_2_f.
The coarse grating period p_2_g is, in this case, by definition, always the greatest period in the arrangement, so always greater than p_2_f.
p_2_g is represented by a fixed linear grating or by a spatial light modulator. |
| P1 | External point on fine linear grating 21 |
| P2 | External point on fine linear grating 22 |
| P_i | Pixel i |

-continued

| Term or Abbreviation | Definition of Explanation |
|---|---|
| phi_1_i | Phase curve given by the wavelet W1 (grating period p_1) given in a pixel i |
| phi_2_f_i | Phase curve given by the wavelet W2 (grating period p_2_f, therefore fine period) given in a pixel i |
| phi_2_g_i | Phase curve given by the wavelet W2 (grating period p_2_g, therefore fine period) given in a pixel i |
| phi_O_1_i modulo 2 Pi | Phase value modulo 2 Pi calculated by pixel, generated by means of linear grating 21, for an object measurement point i of the measured object in a pixel i<br>The object measurement point i corresponds to a pixel i of the rasterised detector, as measurement point i and pixel i are optically conjugated. |
| phi_O_2_i modulo 2 Pi | Phase value modulo 2 Pi calculated by pixel, generated by means of grating 22, for an object measurement point i of the measured object in a pixel i<br>The object measurement point i corresponds to a pixel i of the rasterised detector, as measurement point i and pixel i are optically conjugated. |
| phi_R_1_i, modulo 2 Pi | Reference phase value modulo 2 Pi of the wavelet period pw_1, generated by pixel by means of reference measurement preferably by means of a highly level light-scattering plate at a reference measurement point i and is permanently stored |
| phi_R_2_i, modulo 2 Pi | Reference phase value modulo 2 Pi of the wavelet period pw_2, generated by pixel by means of reference measurement preferably by mean of a highly level light-scattering plate at a reference measurement point i and is permanently stored |
| phi_R_1_CoG, modulo 2 Pi | Phase value modulo 2 Pi in the reference measurement, which is given by the wavelet W_1_i at the CoG in a pixel i |
| phi_R_2_g_CoG_i, modulo 2 Pi | Phase value which is given by the coarse period length p_2_g at the CoG of the reference measurement in a pixel i<br>(only if a coarse linear grating is used as linear grating 22) |
| phi_R_1_CoG_i | Phase value of the reference measurement, which is given by the period length p_1 at the CoG in a pixel i |
| phi_O_1_CoG_i | Phase value of the object measurement, which is given by the period length p_1 at the CoG in a pixel i |
| P_T | Interface point of the optical axes OADA and OAPO of the triangulation arrangement |
| pw_1 | Fine wavelet period, corresponding to the grating period p_1 of the linear grating 21<br>The wavelet period pw_1 is always a fine period and also always the smallest wavelet period used in the method. |
| pw_2_f | Fine wavelet period, corresponding to the grating period p_2_f of the linear grating 22 |
| pw_2_g | Coarse wavelet period |
| pw_12 | Period of the beat frequency wavelet, resulting from the beat frequency of the two fine wavelet periods pw_1 and pw_2_f [μm] |
| PZ_D | Pupil centre of detection as image of the aperture centre of detection BZ_D, is at infinity with telecentricity in the object space |
| PZ_P | Pupil centre of projection as image of the aperture centre of projection BZ_P, is at infinity with telecentricity in the object space |
| R_i | Reference measurement point i generated by pixel i |
| R_Tb | Direction of the translation base determined by the position of the aperture centres of the projection beam path and detection beam path |
| Rz | Reference line on a spatial light modulator |
| S_R | Measured/recorded image stack in a reference measurement |
| S_O | Measured/recorded image stack in an object measurement |
| S_R_i | Signal from a modulated pixel i from a reference measurement |
| S_O_i | Signal from a modulated pixel i from an object measurement |
| S_R_out_i | Signal from a badly-modulated pixel i, which is no longer used. |
| S_R_i | Signal from a modulated pixel i from a reference measurement |
| S_O_i | Signal from a modulated pixel i from an object measurement |
| S_R_out_i | Signal from a badly-modulated pixel i from a reference measurement, which is no longer used.<br>So there must not be a signal at a cooperating reference measurement object. This may only occur if there is contamination. |
| S_R_i | Signal from a modulated pixel i from a reference measurement |
| S_Scheimpflug | Point of intersection of Scheimpflug straight lines.<br>In so doing, the effects of glass path lengths in the beam paths are made negligible in the illustrative drawing. |
| v | Direction of feed of the moved solder bump 63, perpendicular to the optical axis ADO |
| VP | A virtual pixel is determined by a fixed beam of a detection system and the relevant pixel on the detector is defined in the depth scan. In terms of time, a virtual pixel is identical to a real one until it is "moved onwards" on the rasterised detector to the next real pixel. |

-continued

| Term or Abbreviation | Definition of Explanation |
|---|---|
| | A virtual pixel is determined also by a beam fixed in the depth scan of the mapping stage of a detection system, and defines in the depth scan the relevant actual pixel on the detector — but only for a mostly small sub-region of the depth scan. |
| Wavelet | Here, a wavelet represents intensity values and is obtained from the pixel of an image stack that may be a real or a virtual pixel. |
| v_BZ | Shifting of the aperture centre |
| W1 | Fine first wavelet generated by means of fine linear grating 21 |
| W2 | Fine second wavelet generated by means of fine linear grating 22 |
| W12 | Synthetic wavelet, is generated by calculation as a beat frequency wavelet from the fine periods pw_1 and pw_2_f, defines over its period the unambiguity range EDB_12 |
| WO_i | Object wavelet generated by pixel i |
| WO_coop_i | Object wavelet of a cooperating object point i generated by means of pixel i. The wavelet is symmetrical. |
| WO_non-coop_i | Object wavelet of a non-cooperating object The wavelet is then asymmetrical. |
| WR_1_i | First reference wavelet generated by means of the first linear grating (21) and by means of pixel i |
| WR_2_f_i | Second fine reference wavelet generated by means of the second linear grating (22) and by means of pixel i |
| WR_2_g_i | Second reference wavelet generated by means of the second coarse linear grating (24) and by means of pixel i |
| z | Depth coordinate in the object space |
| z_M | Depth of the measurement range |
| z_CoG_i | Depth position of the centre of gravity of the contrast envelope generated by means of pixel i |
| z_CoG_1_i | Depth position of the centre of gravity of the contrast envelope of the first linear grating 21 with the period length p_1 generated by means of pixel i |
| z_CoG_2_f_i | Depth position of the centre of gravity of the contrast envelope of the second linear grating 22 with the period length p_2_f generated by means of pixel i |
| z_O_i = z_1_O_i | Depth position of measurement point i. This is preferably determined from the first wavelet W1. |
| z_S | Scan path |

REFERENCE LIST WITH EXPLANATIONS

| Reference Number | Name |
|---|---|
| 101 | Computer-controlled, pulsed, green-coloured light source, illuminated alternately with 102 or 108 |
| 102 | Computer-controlled, pulsed, green-coloured cold light source, illuminated alternately with 101 |
| 103 | Cold light source in the colours red and blue, constantly switched on in the depth scan |
| 104 | Green-coloured cold light source that is permanently switched on |
| 107 | Computer-controlled, pulsed, green-coloured light source, illuminated alternately with 108 |
| 108 | Computer-controlled, pulsed, green-coloured light source, illuminated alternately with 107 or 101 |
| 110 | White light source, permanently switched on |
| 111 | Light source with heavy spectral part at 580nm and red part, is flashed alternately with light source 112 |
| 112 | Light source with heavy spectral part at 520nm and blue part, is flashed alternately with light source 111 |
| 113 | Green-coloured cold light source that is permanently switched on |
| 113a | Green-coloured cold light that is permanently switched on when the depth scan is running forwards. |
| 114 | Cyan-coloured cold light source that is permanently switched on |
| 114a | Cyan-coloured cold light source that is permanently switched on when the depth scan is returning. |
| 2 | Linear grating with cosine-square shaped transparency in the grating period p |
| 21 | Linear grating 1 with cosine-square shaped transparency in the grating period p_1 |
| 22 | Linear grating 2 with cosine-square shaped transparency in the grating period p_2_f |
| 23 | Spatial light modulator (SLM) formed as a micro-mirror array (digital micro mirror device or liquid crystal display 231), in which fine linear grating structures or coarse linear grating structures or even Gray code sequences may be entered for determining coarse 3D information on an object |
| 231 | Liquid display |
| 24 | Coarse linear grating 2 with cosine-square shaped transparency in the grating period p_2_g |
| 25 | Linear grating 1 with cosine-square shaped transparency in the grating period p_1 |
| 26 | Linear grating 1 with cosine-square shaped transparency in the grating period p_2_f |
| 27 | Computer-controlled rotating linear grating |
| 31 | Neutral beam splitter cube, with green light, splits in the ratio 50:50 |
| 32 | Bandpass colour splitter for green light |
| 321 | Bandpass colour splitter layer system in bandpass colour splitter 32, lets through at least 90% of green light and reflects at least 90% of blue and red light |

-continued

| Reference Number | Name |
|---|---|
| 33 | Edge colour splitter from wavelength 550 nm in transmission |
| 331 | Edge colour splitter layer system from wavelength 550 nm in transmission |
| 34 | Bandpass colour splitter for transmission from wavelengths 520 nm to 580 nm |
| 341 | Bandpass colour splitter layer system for transmission from wavelengths 520 nm to 580 nm |
| 35 | Bandpass colour splitter for transmission of cyan-coloured light and reflection of light apart from cyan-coloured in the projection beam path |
| 351 | Bandpass colour splitter layer system for transmission of cyan-coloured light and reflection of light apart from cyan-coloured in the projection beam path |
| 352 | Bandpass colour splitter layer system for transmission of cyan-coloured light and reflection of light apart from cyan-coloured in the detection beam path for camera 74 |
| 36 | Bandpass filter for cyan-coloured light |
| 37 | Bandpass filter for green light |
| 41 | Double-sided telecentric mapping stage for projection, therefore for mapping one or more linear gratings |
| F41 | Common focal point of lenses 411 and 412 of the telecentric, afocal mapping stage to projection 41 |
| F411 | Common focal point of lenses 4111 and 4121 for projection |
| F412 | Common focal point of lenses 4112 and 4122 of the telecentric, afocal mapping stage for projection |
| 411 | Projection front lens, allocated to the linear grating 21, forming part of mapping stage 41 |
| 4111 | Projection front lens, allocated to the linear grating 21, left beam path |
| 4112 | Projection front lens, allocated to the linear grating 21, right beam path |
| 412 | Projection grating lens, allocated to measured object 6, forming part of mapping stage 41 |
| 4121 | Projection grating lens, allocated to measured object 6, left beam path |
| 4122 | Projection grating lens, allocated to measured object 6, right beam path |
| 413 | Pentaprism in the projection beam path |
| 4131 | Pentaprisma in the projection beam path, left beam path |
| 4132 | Pentaprisma in the projection beam path, rightbeam path |
| 414 | Deflection mirror in the projection beam path |
| 415 | Prism module with beam splitter layer 416 and mirror layer 417 in the projection beam path, |
| 416 | Beam splitter layer in the prism module 415 in the projection beam path |
| 417 | Deflection mirror in the prism module 415 in the projection beam path |
| 418 | Beam splitter cube in the projection beam path |
| 419 | Beam splitter layer of the beam splitter cube 418 in the projection beam path |
| 42 | Double-sided telecentric mapping stage for detection, therefore for mapping the measured object |
| F42 | Common focal point of lenses 421 and 422 of the telecentric, afocal mapping stage for detection 41 |
| 421 | Detection front lens, allocated to measured object 6, forming part of mapping stage 42 |
| 4211 | Detection front lens, allocated to the measured object 6, left beam path |
| 4212 | Detection front lens, allocated to the measured object 6, right beam path |
| 422 | Detector lens, allocated to the rasterised detector (73), belonging to mapping stage 42 |
| 4221 | Detector lens, allocated to the rasterised detector (e.g. camera 73), left beam path |
| 4222 | Detector lens, allocated to the rasterised detector (e.g. camera 73), right beam path |
| 423 | Pentaprism in the detection beam path |
| 424 | Deflection mirror in the detection beam path |
| 431 | Projection front lens, allocated to the linear grating |
| 432 | Projection front lens, allocated to the linear grating |
| 433 | Pentaprism in the projection beam path |
| 4331 | Pentaprism in the projection beam path, left beam path |
| 4332 | Pentaprism in the projection beam path, right beam path |
| 435 | Prism module with beam splitter layer 436 and mirror layer 437 in the projection beam path, |
| 436 | Beam splitter layer in the prism module 435 |
| 437 | Deflection mirror in the prism module 435 |
| 44 | Two-mirror angled mirror group |
| 441 | Plane mirror of the angled mirror module 44 |
| 442 | Plane mirror of the angled mirror module 44 |
| 448 | Angled mirror prism with two mirrored surfaces of athermal glas in a thermally-stable holder |
| 45 | Two-mirror angled mirror group |
| 451 | Plane mirror of the angled mirror module 45 |
| 452 | Plane mirror of the angled mirror module 45 |
| 47 | Angled mirror arrangement with two plane mirrors |
| 471 | Plane mirror in the angled mirror arrangement 47 |
| 472 | Plane mirror in the angled mirror arrangement 47 |
| 481 | Beam splitter |
| 458 | Angled mirror prism with two mirrored surfaces of athermal glass in a thermally-stable holder |
| 482 | Beam splitter |
| 49 | Angled mirror arrangement |
| 491 | Highly mechanically stable angled mirror arrangement with baseplate resistant to bending stiffness of an iron-nickel alloy (Invar) and quartz mirrors, left |
| 492 | Highly mechanically stable angled mirror arrangement with baseplate resistant to bending stiffness of an iron-nickel alloy (Invar) and quartz mirrors, right |
| 51 | Telecentric aperture in telecentric mapping stage 41 for projection |
| 511 | Telecentric aperture in telecentric mapping level 41 for projection, left beam path |
| 512 | Telecentric aperture in telecentric mapping stage 41 for projection, right beam path |
| 52 | Telecentric aperture in telecentric mapping stage 42 for detection |
| 54 | Spatial light modulator formed as a ferro-electric liquid display and representing a controllable telecentric aperture in a mapping stage 41 for projection |
| 541 | Left passband of the controllable telecentric aperture 54 in the mapping stage for projection |
| 542 | Right passband of the controllable telecentric aperture 54 in the mapping stage for projection |
| 6 | Measured object |

-continued

| Reference Number | Name |
|---|---|
| 61 | Measured object with cooperating measurement point |
| 62 | Measured object with non-cooperating measurement point |
| 63 | Solder bump |
| 71 | 1-chip colour camera, here with Bayer mosaic, green pixels detect the strips, red and blue are detected for the object colour |
| 711 | 1-chip colour camera 71, here with Bayer mosaic, green pixels detect the strips, red and blue are recorded for the object colour |
| 72 | Colour camera with 2 camera chips and a bandpass colour splitter for transmission in the range of 520nm and 580nm and synchronised with the light sources 111 and 112. So there is one channel (1) with bandpass for transmission from 520 nm to 580 nm and one channel (2) with band-stop filter for the range of 520 nm to 580 nm and pass in the remaining VIS range. |
| 721 | First monochrome chip of the 2-chip camera, see Det. 12.2 |
| 722 | Second monochrome chip of the 2-chip camera, see Det. 12.2 |
| 73 | Monochrome camera |
| 731 | Chip of the monochrome camera 73 |
| 74 | 2-chip colour camera with one channel with bandpass colour splitter for transmission of cyan-coloured light and reflection of light apart from cyan-coloured, see Fig. 19 |
| 741 | Chip for structured, cyan-coloured light |
| 742 | RGB chip with Bayer filter for white, rather unstructured light |
| 75 | 2-chip colour camera for the narrow spectral bands around green and cyan with a bandpass colour splitter for transmission of cyan-coloured light and reflection of green light (without figure) |
| 8 | Continuously moving translation sled, controlled by the control and data processing system 17, for an external scan which is allocated to a linear drive 9 controlled with translation measuring system 10 The translation sled represents a torsionally-secure prismatic precision positioning 81. In the measurement system 10 a highly-precise starting point emitter 11 is integrated which is not represented here. |
| 81 | Continuously moving translation sled, controlled by the control and data processing system 17, for an internal scan which is allocated to a linear drive 9 controlled with translation measuring system 10 The translation sled represents a torsionally-secure prismatic precision positioning 81. In the measurement system 10 a highly-precise starting point emitter 11 is integrated which is not represented here. Translation sled may also be a comparably precise feed unit of a robot arm, for example, in a measuring cell. |
| 88 | Magnetic stop left |
| 89 | Magnetic stop right |
| 9 | Controlled linear drive, allocated to the translation sled 8 or 81 |
| 91 | Precision stepper-motor with precision spindle, allocated to the translation sled 8 or 81 |
| 92 | Computer-controlled drive for rotational offset of the linear grating 27 |
| 10 | Translation measurement system allocated to the controlled linear drive 9 |
| 11 | Highly-precise starting point emitter for starting point $z\_0$ |
| 12 | Rigid holder for linear gratings 21, 22, 24 or spatial light modulator 23 and camera 73 |
| 13 | Pentaprism in the detection beam path, always fixed |
| 14 | Glass window in optical quality |
| 15 | Bandpass filter for green range |
| 16 | Beam splitter group with beam splitter layer and mirrored layer |
| 161 | Beam splitter layer splits neutrally in the ratio 50:50 in beam splitter group 16 |
| 162 | Mirrored layer in the beam splitter group 16 |
| 17 | Computer system for controlling components such as light sources, cameras, spatial light modulator 23, controlled linear drive 9 and also for data processing, including calculation of 3D point clouds |
| 171 | Display of the computer system s17 with measured 3D point cloud of measured object 6 |
| 181 | Control connection to the computer system 17 for synchronisation of the computer-controlled pulsed green-coloured light source 101 |
| 182 | Control connection to the computer system 17 for synchronisation of the computer-controlled pulsed green-coloured light source 102 |
| 183 | Control connection of the computer system 17 for sychronisation of the controlled linear drive 9 |
| 183a | Control connection of the computer system 17 for the translation measurement system 10 |
| 184 | Control and data processing between the computer system and the monochrome camera 73 for synchronisation and reading out the image data |
| 185 | Control and data processing between the computer system and the colour camera 71 for synchronisation and reading out the image data |
| 186 | Control connection to the computer system 17 for synchronisation of the computer-controlled pulsed light source 102 |

The invention claimed is:
1. A method for depth-scanning strip triangulation with wavelet signal generation with a strip triangulation arrangement for structured illumination of at least one measured object, wherein the strip triangulation arrangement comprises:
- a projection beam path,
- a detection beam path separated from the projection beam path,
- at least one rasterised light detector with pixels,
- at least one computer system, and
- a computer-controlled scanning device for the depth scan of the at least one measured object; and wherein the method comprises:
(i) running a depth scan of the at least one measured object, the depth scan comprising:
generating concurrently or sequentially at least two grating patterns with differing grating periods p_1 and p_2, wherein the at least two grating periods fulfill the relationships $$p\_2 \geq 1.01*p\_1 \text{ and } p\_2 \leq 100*p\_1,$$

projecting through the projection beam path onto the at least one measured object, so that a measured object illuminated in a structured manner exists, and
recording with the rasterised light detector and by using the detection beam path of at least two sets of images, that respectively correspond to the at least two grating patterns, wherein each of the at least two sets of images comprises a sequence of images of the at least one measured object illuminated in a structured manner with a certain grating pattern,
or
(ii) producing a grating pattern with a period p and projecting the grating pattern with the period p onto the at least one measured object-through the projection beam path, so that a measured object illuminated in a structured manner exists;
altering a triangulation angle of the strip triangulation arrangement so that at least two different effective triangulation angles beta_1 and beta_2 sequentially exist in the strip triangulation arrangement, which fulfil the relationships $$beta\_2 \geq 1.01*beta\_1 \text{ and } beta\_2 \leq 1.25*beta\_1, \text{ and}$$

recording with the rasterised light detector and by using the detection beam path at least two sets of images, that respectively correspond to the triangulation angles, wherein each of the at least two sets of images comprises a sequence of images of the measured object illuminated in a structured manner at a corresponding given triangulation angle;
producing at least two wavelets W1 and W2 with respectively different wavelet periods pw_1 and pw_2 from the at least two sets of images, wherein the at least two wavelets W1 and W2 respectively exhibit a contrast envelope (CE_1, CE_2);
determining, using the computer system, a depth position of a measured measurement point i of the at least one measured object from the at least two wavelets W1 and W2 considering reference phase values specified by pixel (phi_R_1, phi_R_2) of the at least two wavelet periods pw_1 and pw_2, comprising:
by pixel evaluations of a center of gravity of at least one of the contrast envelopes (CE_1, CE_2);
by pixel phase evaluations of both the wavelet period pw_1, which provides a phase value phi_1 modulo 2 Pi, and the wavelet period pw_2, which provides a phase value phi_2 modulo 2 Pi,
calculating a phase value phi_O_1_i and phi_O_2_i modulo 2 Pi for a pixel i, which in the pixel i both the reference phase value phi_R_1_i modulo 2 Pi of the wavelet period pw_1 and the phase value phi_R_2_i modulo 2 Pi of the wavelet period pw_2 in the surroundings of the calculated center of gravity (CoG_W_1) correspond to the contrast envelope of the first wavelet W1 and/or the calculated center of gravity (CoG_w_2) of the contrast envelope of the second wavelet W2 at least approximately; and
calculating the depth position for the measurement point i of the measured object from the calculated phase values phi_O_1_i and phi_O_2_i modulo 2 Pi for the pixel i.

2. The method for depth-scanning strip triangulation according to claim 1, wherein
the grating periods p_1 and p_2 may, for example, meet the condition p_2<2*p, and the at least two wavelets W1 and W2 exhibit a mutual beat frequency with at least one beat frequency period pw_12, which is twice as large as the wavelet period pw_1 of the wavelet W1; or
the grating periods p_1 and p_2 meet the condition p_2>2*p and the wavelet period pw_2 of the second wavelet W2 is at least twice as large as wavelet period pw_1 of the first wavelet W1.

3. The method for depth-scanning strip triangulation according to claim 1, further comprising:
telecentrically illuminating the at least one measured object using a telecentric aperture in the projection beam path; and/or
telecentrically mapping the at least one a measured object using a telecentric apertures in the detection beam path.

4. The method according to claim 1, wherein the depth scan is a continuous depth scan that is conducted by:
a continuous relative movement between the at least one measured object and the strip triangulation arrangement, or
a continuous relative movement between the at least one measured object and a focal plane of at least one grating image in an object space, or
a continuous variation of a refraction power in the projection beam path.

5. The method according to claim 1, wherein in the depth scan:
at least two static linear gratings with different grating periods are illuminated alternating in time or the at least two static linear gratings are self-illuminating and illuminate alternating in time; or
a spatial light modulator is illuminated and in time sequentially the at least two grating patterns with respective different grating periods p_1 and p_2 are switched; or a switchable structured light emitter in time sequentially switches the at least two grating patterns with respectively different grating periods (p_1, p_2); or
at least two static linear gratings are illuminated with light concurrently with respectively different color spectrums or the at least two linear gratings are self-illuminating with respectively differing color spectrums and are projected concurrently onto the at least one measured object by the same projection beam path and so a structured and color-illuminated measured object exists and this measured object is detected using the detection beam path of the rasterised light detector with at least two color channels; or a static, rotating linear grating, which is illuminated with at least one light source or is self-illuminating, is rotated between at least two different rotational positions, wherein by the rotation of the static, rotating linear gratings in time sequentially at least two grating patterns with differing effective grating periods p_eff_1 and p_eff_2 are generated.

6. The method according to claim 1, wherein:

a static linear grating with a period p with at least one light source is illuminated or is self-illuminating; and in relation to an optical axis of a relevant mapping beam path laterally different regions of an aperture opening of a controllable aperture are released in a preset controlled manner for light transmission or light reflection, which is arranged in an aperture plane of the projection beam path and/or the detection beam path, so that the effective triangulation angle of the strip triangulation arrangement changes in a preset controlled manner and thus sequentially at least two different effective triangulation angles beta_1 and beta_2 exist in the strip triangulation arrangement.

7. An arrangement for depth-scanning strip triangulation with structured illumination and wavelet signal generation for structured illumination of at least one measured object, the arrangement comprising a projection beam path, a detection beam path separated from the projection beam path, at least one rasterised light detector with pixels, at least one computer system;

a computer-controlled scanning device useable for performing a depth scan of the at least one measured object;

wherein:

the arrangement is designed, concurrently or sequentially to generate at least two grating patterns with different grating periods p_1 and p_2 and to project onto the at least one measured object by the projection beam path, wherein the grating periods p_1 and p_2 comply with the relationships:

$p\_2 \geq 1.01*p\_1$ and $p\_2 \leq 100*p\_1$, or to generate a grating pattern with a grating period p and to project through the projection beam path onto the at least one measured object, and to vary a triangulation angle beta of the strip triangulation arrangement so that sequentially at least two different triangulation angles beta_1 and beta_2 exist in the strip triangulation arrangement, which comply with the relationships $beta\_2 \geq 1.01*beta\_1$ and $beta\_2 \leq 1.25*beta\_1$, with the rasterised light detector and by using the detector beam path to record at least two sets of images, that respectively correspond to the grating patterns or the different triangulation angles, wherein each of the at least two sets of images comprises a sequence of images of the at least one measured object illuminated in a structured manner with a given grating pattern or comprises images of the at least one measured object illuminated in a structured manner at a given triangulation angle; and wherein the computer system furthermore comprises:

a memory for storing the at least two sets of images.

8. The arrangement for depth-scanning strip triangulation according to claim 7, wherein the computer system comprises an evaluation module that is set up:

to produce at least two wavelets W1 and W2 with respectively different wavelet periods pw_1 and pw_2 from the at least two sets of images, wherein the at least two wavelets W1 and W2 respectively exhibit a contrast envelope (CE_1, CE_2);

to determine position of a measured measurement point i of the at least one measured object from the at least two wavelets W1 and W2 and considering reference phase values specified by pixel (phi_R_1, phi_R_2) of the at least two wavelet periods pw_1 and pw_2, wherein determining the depth position comprises:

by-pixel evaluation of a center of gravity of at least one of the contrast envelopes (CE_1, CE_2) and by-pixel phase evaluations of both the wavelet period pw_1, which provides a phase value phi_1 modulo 2 Pi, and the wavelet period pw_2, which provides a phase value phi_2 modulo 2 Pi, calculating the phase value phi_O_1_i and phi_O_2_i modulo 2 Pi for a pixel i, which in the pixel i both the reference phase value phi_R_1_i modulo 2 Pi of the wavelet period pw_1 and the phase value phi_R_2_i modulo 2 Pi of the wavelet period pw_2 in the surroundings of the calculated center of gravity (CoG_W_1) correspond to the contrast envelope of the wavelet W1 and/or the calculated center of gravity (CoG_W_2) of the contrast envelope of the wavelet W2 at least approximately; and calculating the depth position for the measurement point i of the at least one measured object from the calculated phase values phi_O_1_i and phi_O_2_i modulo 2 Pi for a pixel i.

9. The arrangement for depth-scanning strip triangulation according to claim 7, further comprising:

two spatially-separate static linear gratings, that are either illuminated with at least one light source or are self-illuminating, wherein light from the linear gratings passes an aperture arranged in the projection beam path, or one spatial light modulator or a switchable structured light emitter that is set up, either to generate concurrent different (e.g. spatially or spectrally separated) grating patterns with respectively differing grating periods p_1, p_2 or sequential switchable grating periods p_1, p_2; or a static, rotating linear grating, which is illuminated with at least one light source or is self-illuminating, wherein by the rotation of the static, rotating linear grating in time sequentially at least two grating patterns with differing effective grating periods p_eff_1 and p_eff_2 are generated.

10. The arrangement for depth-scanning strip triangulation according to claim 7, further comprising:

a static linear grating with a period p, that is either illuminated with at least one light source or that is self-illuminating;

a controllable aperture with an aperture opening, wherein the controllable aperture is arranged in an aperture plane of the projection beam path and/or the detection beam path, an aperture control device which is set up, in relation to an optical axis of a relevant mapping beam path to release laterally different regions of the aperture opening in a preset controlled manner for light transmission or light reflection alternately, so that the effective triangulation angle of the strip triangulation arrangement changes in a preset controlled manner and thus sequentially at least two different effective triangulation angles beta_1 and beta_2 exist in the strip triangulation arrangement.

11. The arrangement for depth-scanning strip triangulation according to claim 7, wherein:
an optical axis (APA) of the projection beam path on a side of at least one component or components generating a grating pattern and the optical axis (ADA) of the detection beam path on a side of the rasterised detector are arranged mutually inclined; and/or
an optical axis of the detection beam path is arranged on a side of the at least one measured object (ADO) parallel to a translation axis (TA) of the computer-controlled scanning device.

12. The arrangement for depth-scanning strip triangulation according to claim 7, wherein
in the projection beam path, a first mapping level and/or a first aperture is arranged; and/or
in the detection beam path, a second mapping level and/or a second aperture is arranged.

13. The arrangement for depth-scanning strip triangulation according to claim 12, wherein:
the first mapping level and/or the second mapping level is a one-sided or double-sided telecentric mapping level; and/or the first aperture and/or the second aperture is a telecentric aperture; and/or
the first aperture and/or the second aperture is a telecentric aperture.

14. The arrangement for depth-scanning strip triangulation according to claim 7, wherein:
the projection beam path and/or the detection beam path respectively exhibits a mapping scale factor of one or not equal to one; and/or
the projection beam path and/or the detection beam path is folded or unfolded.

15. The arrangement for depth-scanning strip triangulation according to claim 7, wherein in the projection beam path, at least two plane mirror surfaces are arranged on an optical path of a pattern-generating component of the arrangement for depth-scanning strip triangulation of the at least one measured object; and/or
in the detection beam path, at least two plane mirror surfaces are arranged on an optical path of the at least one measured object to the rasterised detector.

16. The arrangement for depth-scanning strip triangulation according to claim 15, wherein:
a difference in a number of reflections on the at least two plane mirror surfaces in the projection and in the detection beam path is zero or even-numbered; and/or
the at least two plane mirror surfaces are arranged in the form of an angled mirror or an angled mirror prism in the projection beam path.

17. The arrangement for depth-scanning strip triangulation according to claim 15 or 16, wherein:
the at least two plane mirror surfaces are arranged in the form of an angled mirror arrangement in the projection beam path, a total deflection angle of the angled mirror arrangement in the projection beam path exhibits an angle of double the size of a triangulation angle beta, and the projection beam path and the detection beam path exhibit a mapping scale factor of one; or
the at least two plane mirror surfaces are arranged in the form of a 90° angled mirror or pentaprism in the projection beam path and a mapping scale of an object space in an array space is selected equal to a square of a tangent of a triangulation angle (beta_P); or
the at least two plane mirror surfaces are arranged in the form of an angled mirror arrangement in the projection beam path, a total deflection angle of the angled mirror arrangement in the projection beam path exhibits double the angle amount of the triangulation angle beta, a translation axis (TA) represents the angle bisector to an optical axis of the projection beam path (APA) and an optical axis of the detection beam path (ADA), and the projection beam path and the detection beam path exhibit the mapping scale factor of one.

18. The arrangement for depth-scanning strip triangulation according to claim 7, wherein the computer-controlled scanning device comprises a computer-controlled translation system, wherein the computer-controlled translation system is arranged rigidly to both the rasterised light detector and at least one pattern-generating component of the arrangement for depth-scanning strip triangulation, so that the translation system, the rasterised light detector and the at least one pattern-generating component are rigidly connected.

19. The arrangement for depth-scanning strip triangulation according to claim 7, wherein the arrangement
comprises two projection beam paths, wherein both of the two projection beam paths are arranged symmetrical to an optical axis of the detection beam path; or
comprises two detection beam paths, wherein both of the two detection beam paths are arranged symmetrical to an optical axis of the projection beam path.

* * * * *